United States Patent [19]
Tex et al.
[11] 3,827,628
[45] Aug. 6, 1974

[54] PNEUMATICALLY CONTROLLED DOCUMENT CARD PUNCH

[75] Inventors: Karel Den Tex, Rochester, Minn.; Donald F. Jensen, Endicott, N.Y.; Merlin J. Ricklefs, Rochester, Minn.; Fred Saltz, Binghamton, N.Y.; Jon J. Schmidt, Stewartville; Phillip S. Stacy, Rochester, both of Minn.

[73] Assignee: International Business Machines Corporation, Armonk, N.Y.

[22] Filed: July 17, 1972

[21] Appl. No.: 272,507

[52] U.S. Cl. ................................ 234/18, 234/64
[51] Int. Cl. .......................................... G06k 1/16
[58] Field of Search ................ 234/64, 18, 124, 125

[56] References Cited
UNITED STATES PATENTS 3,198,427 8/1965 Locke et al. ...................... 234/64 X
3,596,831 8/1971 Parmer ............................. 234/64 X

*Primary Examiner*—J. M. Meister
*Attorney, Agent, or Firm*—Keith T. Bleuer

[57] ABSTRACT

A key operated punch for document cards which utilizes pneumatic logic for controlling the punching, reading and printing of document cards as they pass through the transport of the machine. The document cards include three tiers of punched information, and the machine automatically duplicates the punched information in the second tier of a card passing through a read station in the machine into the second tier of a card then in a punch station of the machine. The third tier of the card in the read station includes program data which, according to the punchings in this tier, indicate an end of field, a skip command, a dup command, or an ALPHA shift command effective for data being entered into the first tier of a card in the punch station.

14 Claims, 62 Drawing Figures

PATENTED AUG 6 1974 3,827,628

SHEET 01 OF 37

PNEUMATICALLY CONTROLLED DOCUMENT CARD PUNCH

BACKGROUND OF THE INVENTION

The invention relates to keypunches for document cards and more particularly to a machine of this type utilizing pneumatic logic for controlling the machine.

A keypunch has previously been proposed in Bean et al., U.S. Pat. No. 3,642,197 for document cards each of which includes three tiers of punched information. Tier 1 of a card includes columns 1–32; tier 2 includes columns 33–64; and tier 3 includes columns 65–96 of punched information. The machine is constructed so as to read information from a previously punched card of this type into an internal memory and is constructed so as to punch all three tiers of a card of this type simultaneously with information contained in the memory. The machine utilizes electrical logic, and the memory is of the acoustic delay line type. The delay line memory is adapted to contain program information causing skipping, duping, etc.

SUMMARY OF THE INVENTION

It is an object of the present invention to provide an improved keypunch for document cards, particularly of the three tier type, which is of simpler construction than the keypunch previously referred to and disclosed in the Bean et al. U.S. Pat. No. 3,642,197, and particularly a punch which utilizes pneumatic logic for controlling its action.

It is a more particular object of the invention to provide an improved keypunch of this type which includes no internal memory but rather relies on punched information in a previous punched document card for controlling the punching of information into a subsequent document card, the previous document card passing through a read station of the machine at the same time as the subsequent document card is passing through a punch station of the machine.

It is still another object of the invention to provide an improved keypunch of this type which reads information from a previous card in a read station, particularly from tier 2 of the previous card, and duplicates this information into tier 2 of the following document card in the punch station. It is also an object to provide an improved keypunch of this type which utilizes program information punched into tier 3 of a card in the read station for controlling the entry of information into tier 1 of a following card which is in the punch station.

DESCRIPTION OF THE PREFERRED EMBODIMENT

Figure 1:
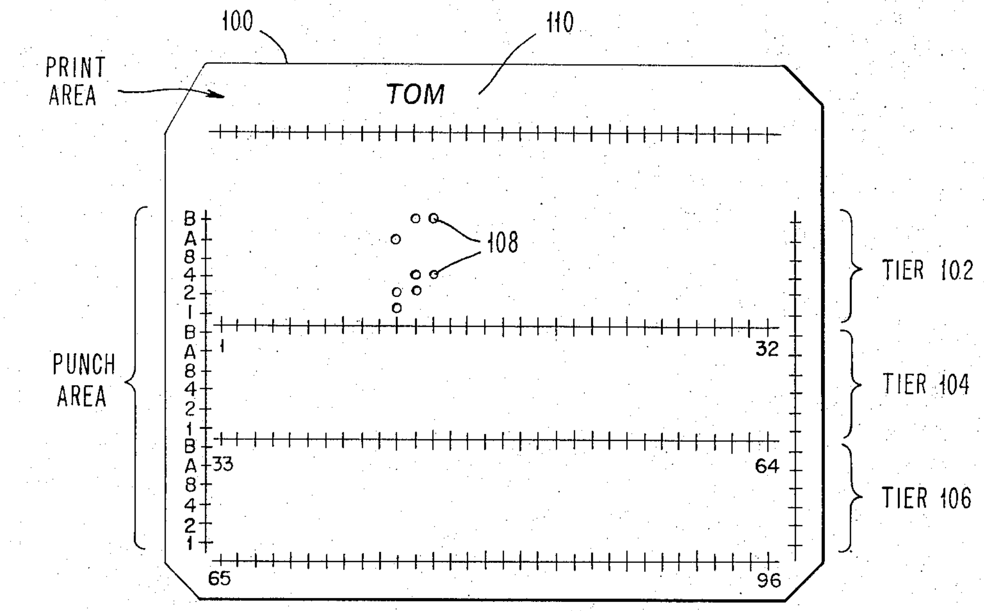
FIG. 1 is a face view of a document card that may be used with the keypunch of the invention.

Referring now to FIG. 1, the document card 100, with which the data recorder or keypunch is adapted to be used, may be seen to have in its lower region a punch area having three tiers 102, 104 and 106 into which holes 108 may be punched. It will be noted that the first tier 102 contains columns 1–32 for receiving holes; the second tier 104 contains columns 33–64; and the third tier 106 contains columns 65–96. Each of the tiers 102, 104 and 106 has six horizontal rows 1, 2, 4, 8, A and B; and therefore, as many as six holes 108 may be punched into each of the columns of each of the tiers 102, 104 and 106.

The upper part of the document card 100 constitutes a print area having a print line 110. Print line 110 contains print positions 1–32, and these print positions correspond to columns 1–32 in tier 1. In the particular card 100 illustrated, the letters TOM in print positions 11, 12 and 13 correspond to the punched holes 108 in columns 11, 12 and 13 in tier 1.

Figure 2:
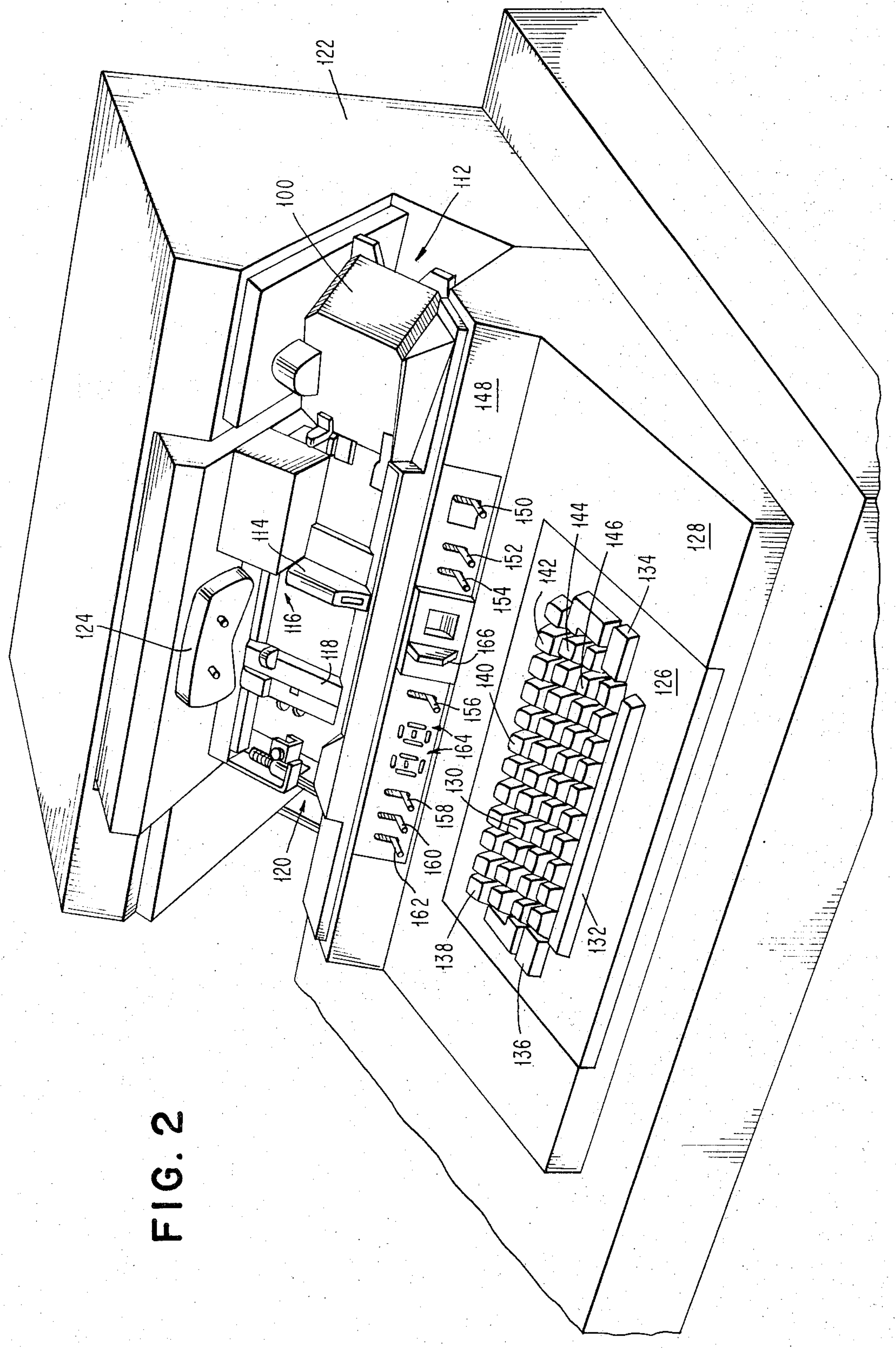
FIG. 2 is a perspective view of the keypunch.

Referring to FIG. 2, the data recorder or keypunch of the invention may seem to comprise a hopper 112 for a stack of the cards 100, a punch station 114, a printer 116, a read station 118, and a stacker 120. The circuit elements and mechanisms associated with these parts are housed in a cabinet 122. A print ribbon cartridge 124 is mounted generally above the printer 116.

The machine includes a keyboard 126 on an inclined panel 128 at the front of the machine. The keyboard 126 includes a plurality of data keys 130 corresponding generally to those found on the conventional typewriter, a space key or bar 132, an alpha or lower shift key 134, a numeric or upper shift key 136, a backspace key 138, a dup key 140, a release key 142, a feed key 144 and a skip key 146.

A plurality of function switches and other parts that desirably are within reach or vision of the operator are located on an inclined intermediate panel 148. The function switches include a power switch 150, a print ON switch 152, an auto feed switch 154, a program 1–2 switch 156, an auto skip/dup switch 158, a program ON switch 160, and a three position entry mode switch 162. A column indicator 164 and a chip tray 166 for punchings from the punch station 114 are also disposed on the panel 148.

Figure 24:
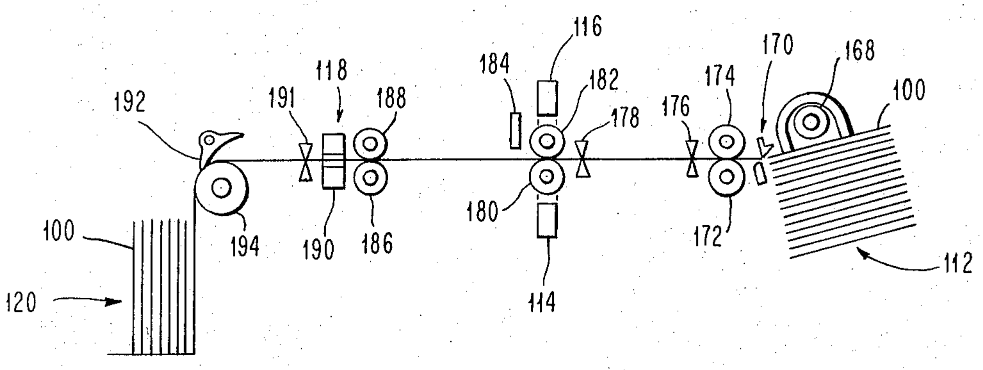
FIG. 24 is a schematic view of the transport for the document cards passing through the machine.

Referring to FIG. 24, the transport for the cards 100 through the machine may be seen to include a pick roll 168, a card throat 170, feed rolls 172 and 174, a card sensor 176, another card sensor 178, an incrementer roll 180 and a pressure roll 182 thereabove, a second incrementer roll 186 and a pressure roll 188 thereabove, a read head 190 which is part of the read station 118, a third card sensor 191, a card shoe 192 and a stacker roll 194.

Figure 23:
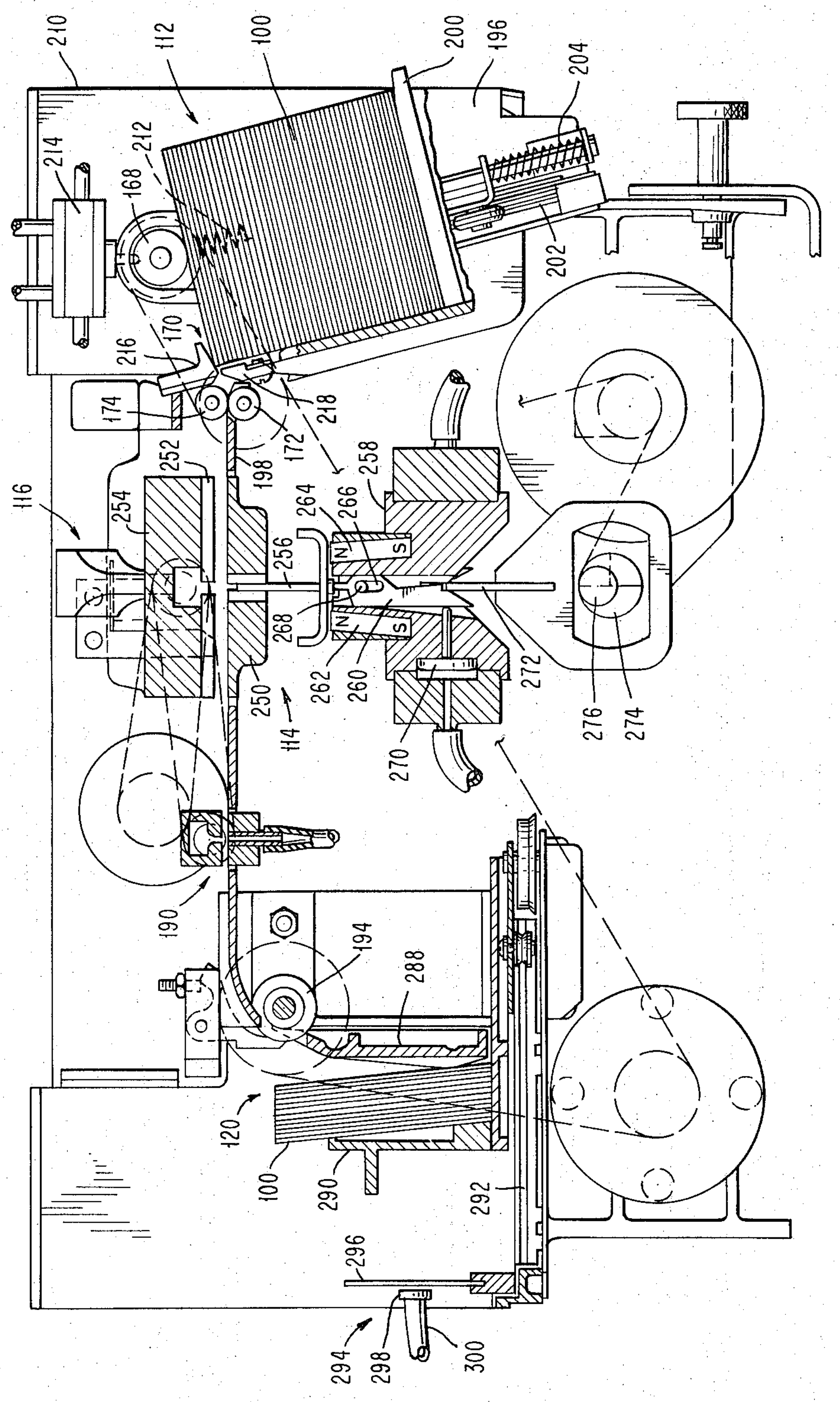
FIG. 23 is a side elevational view, partially in section, of the machine.

The hopper 112 comprises a front plate 196 (see FIG. 23) on which a stack of the cards 100 rests; and the plate 196 extends downwardly at approximately 35 with respect to horizontal. The cards 100 are adapted to be discharged from the hopper 112 onto a bed or deck 198. The hopper comprises also a bed plate 200 for supporting the stack of cards 100, and the bed plate extends at an angle of about 15° with respect to the deck 198 so that the cards 100 discharge downwardly from the top of the stack onto the bed or deck 198. The bed plate 200 is supported by suitable guide mechanism 202 for upward movement as the stack of cards decreases in height, and a spring 204 is provided for forcing the plate 200 upwardly.

The pick roll 168 is rotatably mounted above the stack of cards 100 supported by the bed plate 200 and is carried by a lever 206 pivoted about a point 208 that is fixed with respect to the machine frame 210. A spring 212 is disposed between the arm 206 and a part of the frame 210 urging the arm 206 and pick roll 168 upwardly, and a pneumatic actuator 214 is provided for moving the pick roll 168 downwardly into contact with the top card 100 of the stack. The pick roll 168 is driven at a constant speed by any suitable driving mechanism.

The throat 170 is provided for assuring that only a single card 100 is moved at a time by the pick roll 168 off of the stack of cards 100. The throat 170 comprises an upper throat blade 216 and a lower throat blade 218 which are positioned closely together for a separation exceeding only slightly the thickness of a card 100. The feed rolls 174 and 172 are positioned adjacent the blades 216 and 218. These rolls grip a card 100 between them, and one of the rolls is continuously driven by any suitable drive mechanism for propelling a card 100 out of the hopper 112 along the transport path through the machine.

Figure 25:
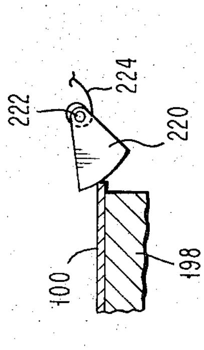
FIG. 25 is a sectional view taken on line 25—25 of FIG. 21.

A cam 220 (see FIG. 25) is pivoted at 222 and has a coiled spring 224 acting on it so as to fall behind a card 100 as it is fed onto the deck 198.

Figure 22:
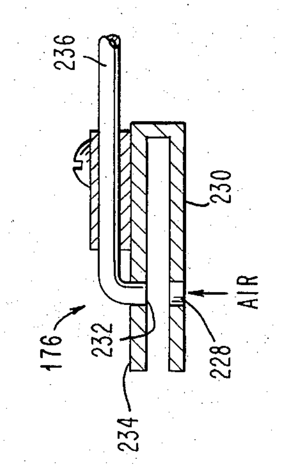
FIG. 22 is a sectional view taken on line 22—22 of FIG. 21.

The card sensor 176 is positioned at the card output end of the hopper 112. The sensor 176 comprises simply an opening 228 (see FIG. 22) in a lower plate 230 and supplied with air under pressure and an opposite opening 232 in an upper plate 234 and connected with an output tube 236. The card sensor 178 is of the same type as the sensor 176 and is positioned immediately ahead of the incrementer rolls 180 and 182.

Figure 27:
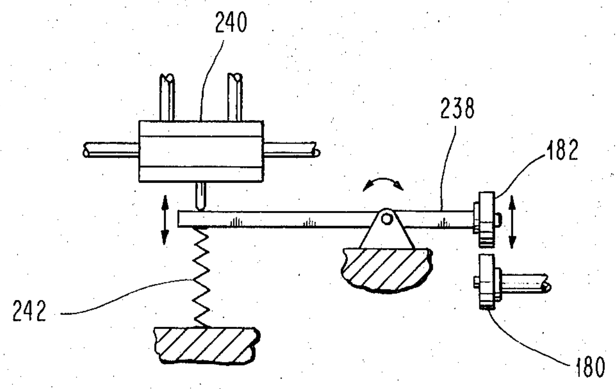
FIG. 27 is a diagrammatic view of a document card incrementer roll and the movable pressure roll disposed thereabove.

The pressure roll 182 is rotatably disposed on the end of a pivotally mounted lever 238 (see FIG. 27). A pneumatic actuator 240 is effective on one end of the lever 238 for raising the roll 182, and a spring 242 acts against the actuator 240.

Figure 26:
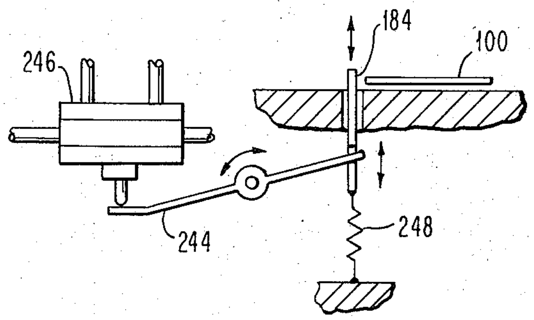
FIG. 26 is a diagrammatic view of a gate for the document cards traveling through the transport.

The gate 184 is reciprocately mounted to extend through the card bed 198 and is actuated on by a pivotally mounted lever 244 (see FIG. 26). A pneumatic actuator 246 acts on one end of the lever 244, and a return spring 248 acts through the lever 244 against the actuator 246.

The punch station 114 is approximately aligned with the incrementer wheels 180 and 182 and comprises (see FIG. 23) a stripper 250, a die 252, and a die stiffener and support 254 with respect to which the die 252 is fixed. There is a gap between the die 252 and the stripper 250 through which the document cards 100 move. A plurality of punches 256 extend in a row through the stripper 250. A guide block 258 contains a plurality of interposers 260 slideably disposed therein, and a pair of permanent magnets 262 and 264 are disposed in the block 258 adjacent the interposers 260. Each of the interposers is provided with a longitudinal slot 266 therein, and a rod 268 extends through the slots 266 for holding the interposers in position. A pneumatically actuated piston 270 is provided for each of the interposers 260 for moving the interposer to operative position against the action of the adjacent magnet 262 or magnet 264. There may be 18 of the punches 256 disposed in the row, one for each hole that may be punched through the card 100 in three aligned columns in tiers 1, 2 and 3; and there are therefore 18 of the pistons 270.

The interposers 260 and the punches 256 are reciprocated upwardly by means of a bail 272. The bail 272 is actuated from an eccentric 274 provided on a drive shaft 276. The bail 272 and interposers 260 are provided with contact edges which are in abutting relationship when the pistons 270 move the interposers into operative position so that the bail 272 reciprocates the corresponding interposers 260 and punches 256 upwardly. The magnets 262 and 264 without such actuation of the pistons 270 hold the interposers 260 in inoperative position. For further details of the punching mechanism, the description in the co-pending application of John W. Berkman et al., Ser. No. 22,961, filed Mar. 26, 1970, may be referred to.

Figure 3:
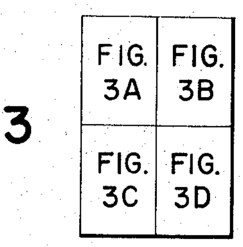
FIG. 3 is a diagramatic illustration of the control portion of the pneumatic logic for the keypunch, the complete FIG. 3 being formed by the component figure parts as indicated on the drawing.
Figure 3A:
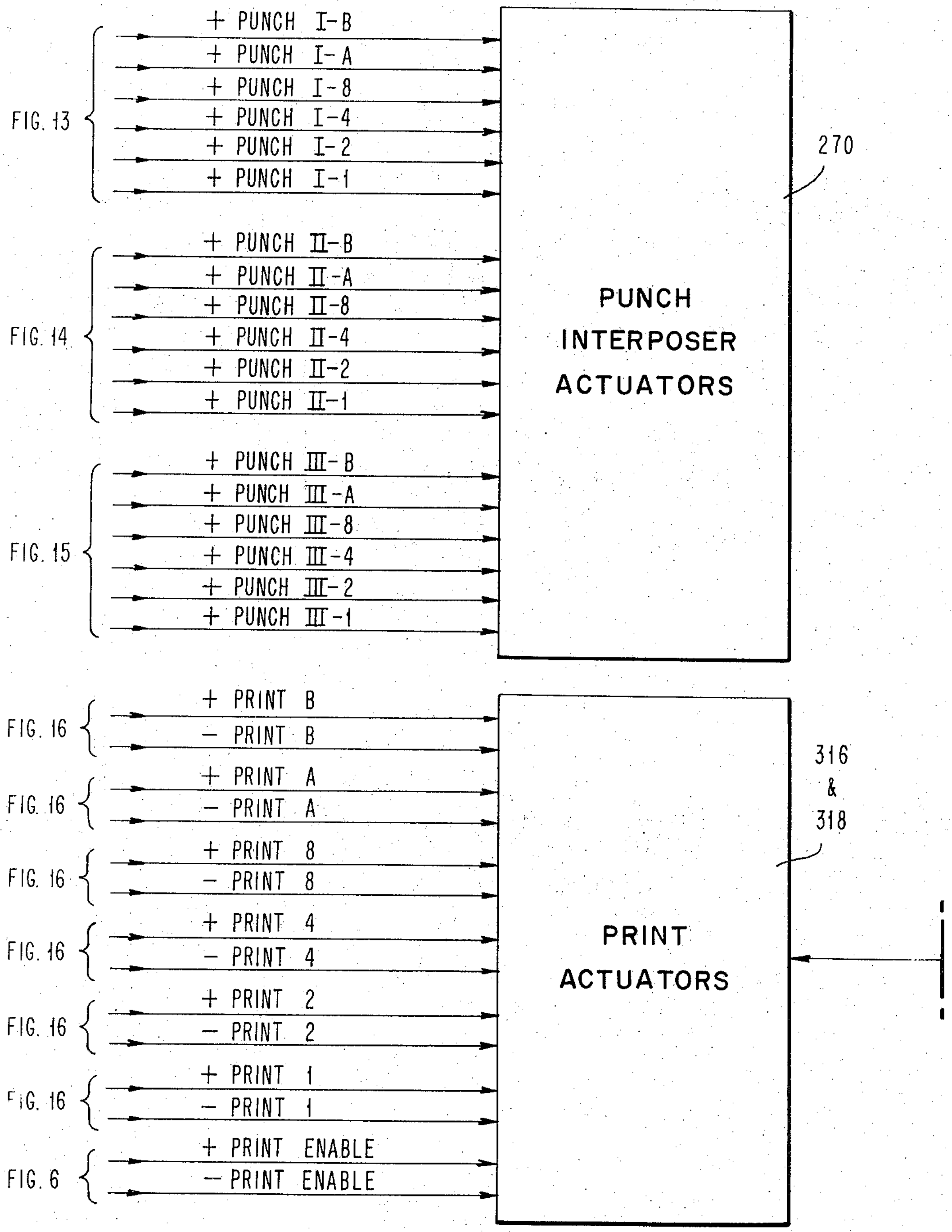
Figure 3B:
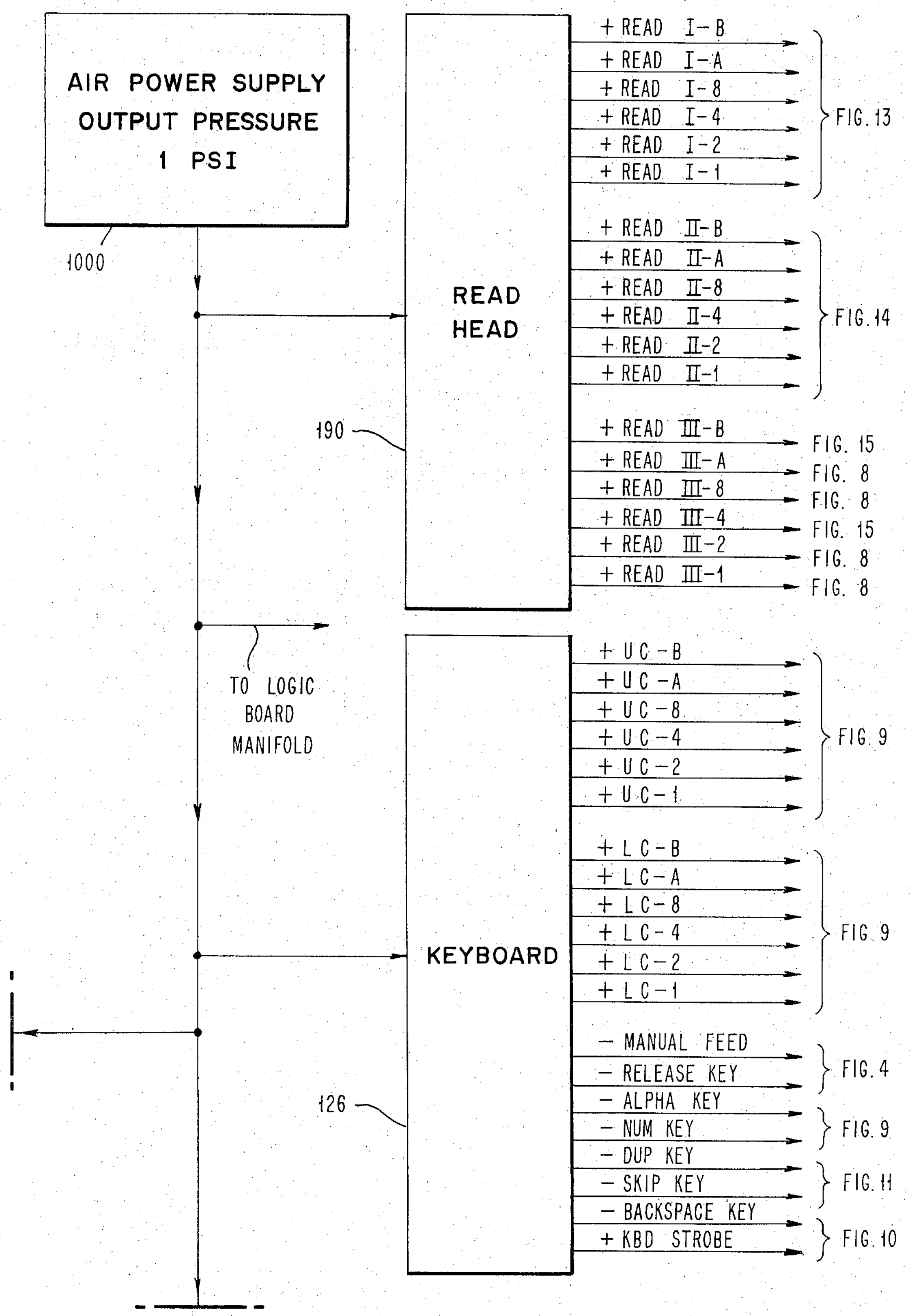
Figure 3C:
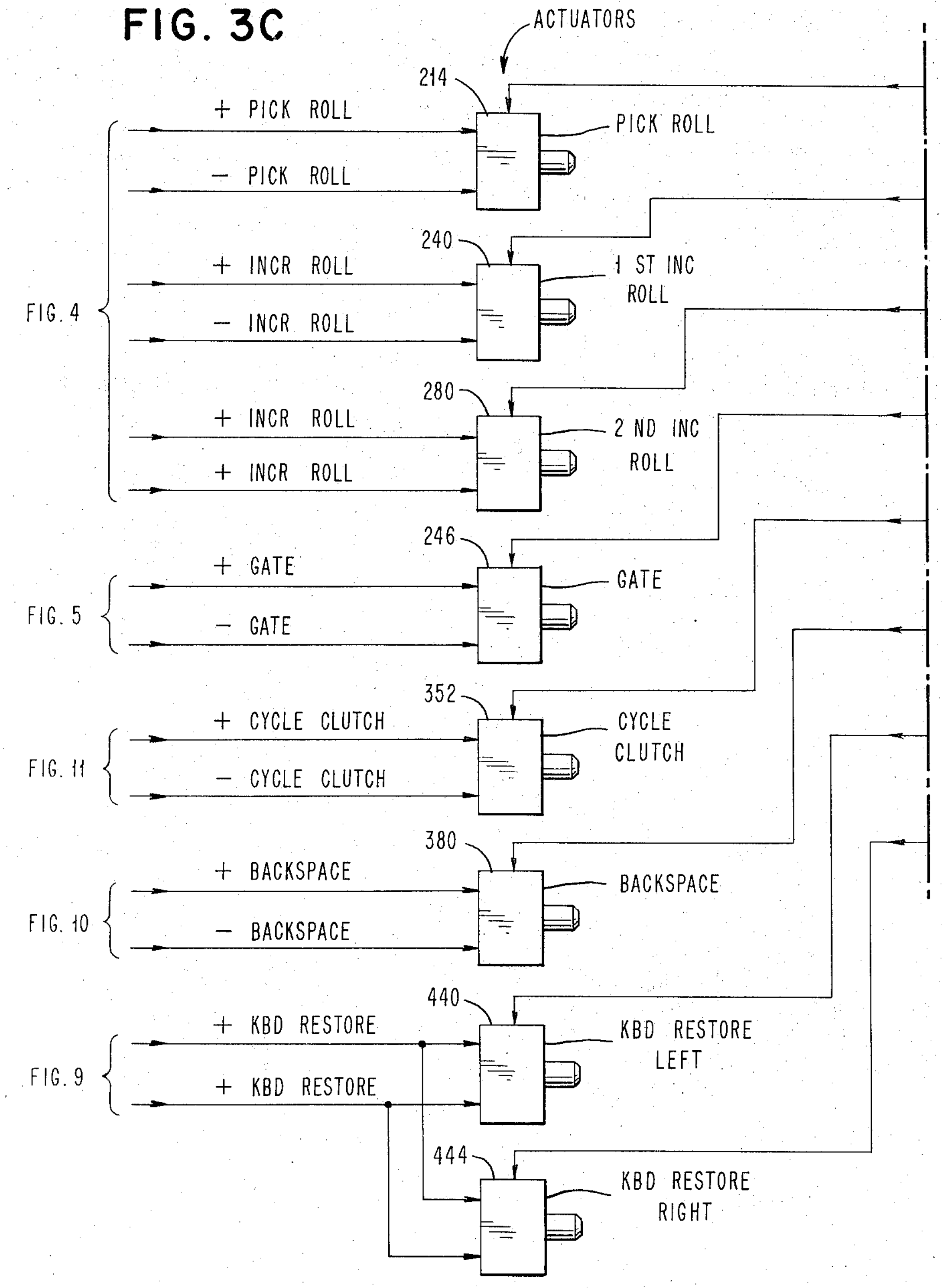
Figure 3D:
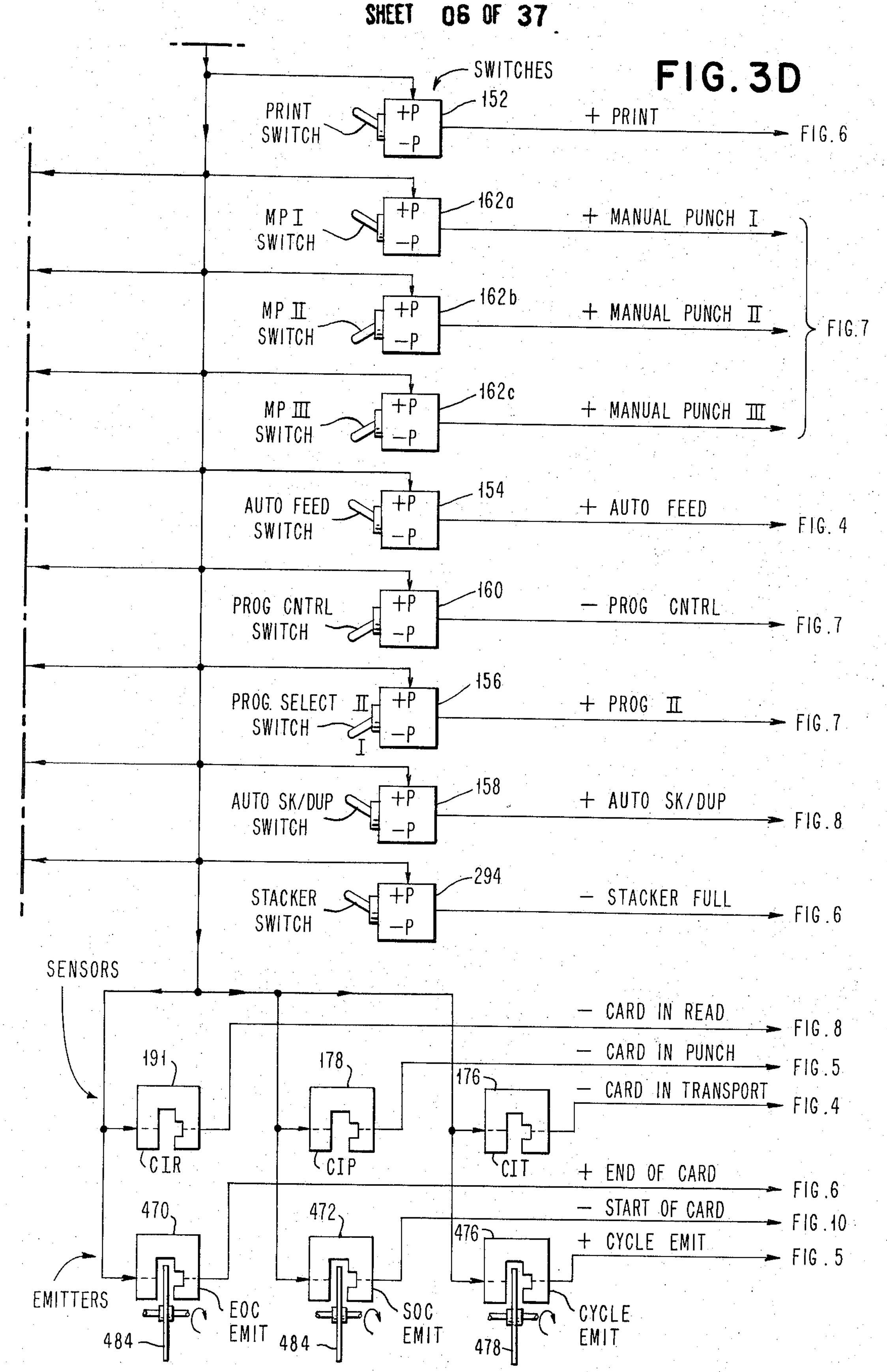

The incrementer wheel 188 is supported and moved by the same type of mechanism as that for roll 182 and shown in FIG. 27, but its actuator is designated as actuator 280 which is shown in FIG. 3.

Figure 28:
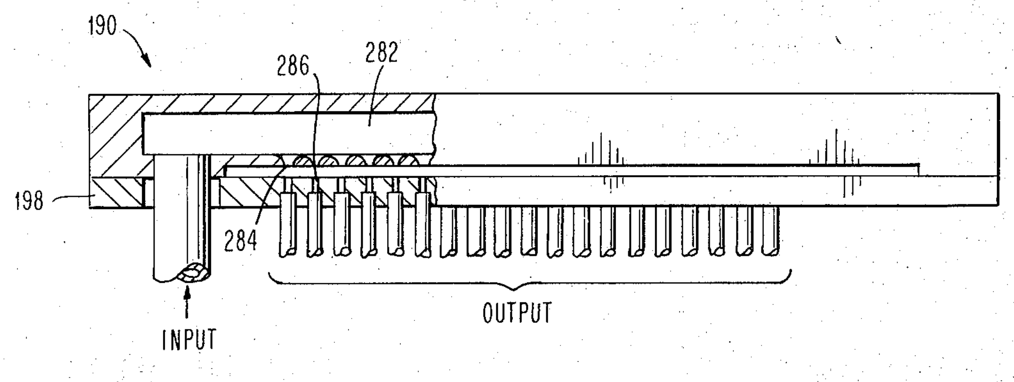
FIG. 28 is a sectional view, on an enlarged scale, taken on line 28—28 of FIG. 21.

The read station 118 is just downstream of the incrementer rolls 186 and 188 and includes an air pressure supply plenum 282 (see FIG. 28) having a row of air ourput ports 284 that have the same spacing as the openings in aligned columns of the three tiers in a card 100. Air reception ports 286 are provided in the bed 198 to form the read head 190, and parts 286 are in alignment with the ports 284. The plenum 282 is spaced with respect to the bed 198 to permit the cards 100 to pass across the ports 284 and 286. The card in read sensor 191 simply includes two ports 284 and 286 in alignment with the other ports 284 and 286, constituting a 19th position in the read station 118 to indicate that a card 100 is in the read station 118.

The stacker roll 194 and shoe 192 are positioned opposite each other at the card entrance end of the stacker 120. The stacker 120 comprises a support plate portion 288 (see FIG. 23) and a tray back 290 adapted to move toward and away from the plate portion 288 for receiving cards 100 therebetween. A spring 292 is effective on the back 290 tending to hold it in a position adjacent the plate portion 288. A stacker full switch 294 is provided which is actuated by the back 290 when the cards 100 stacked in the stacker 120 reach a substantial height. The switch 294 comprises simply a flexible leaf 296 fixedly anchored at its bottom and closing the padded end 298 of a conduit 300.

Figure 30:
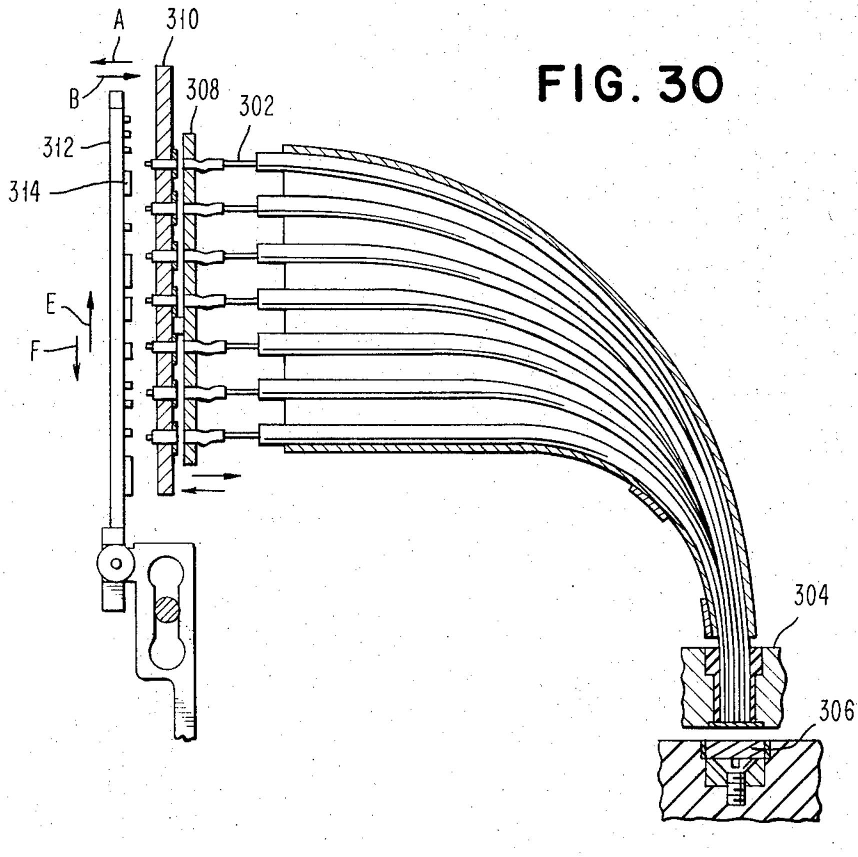
FIG. 30 is a side elevational view, partially in section, of the printer of the machine.
Figure 31:
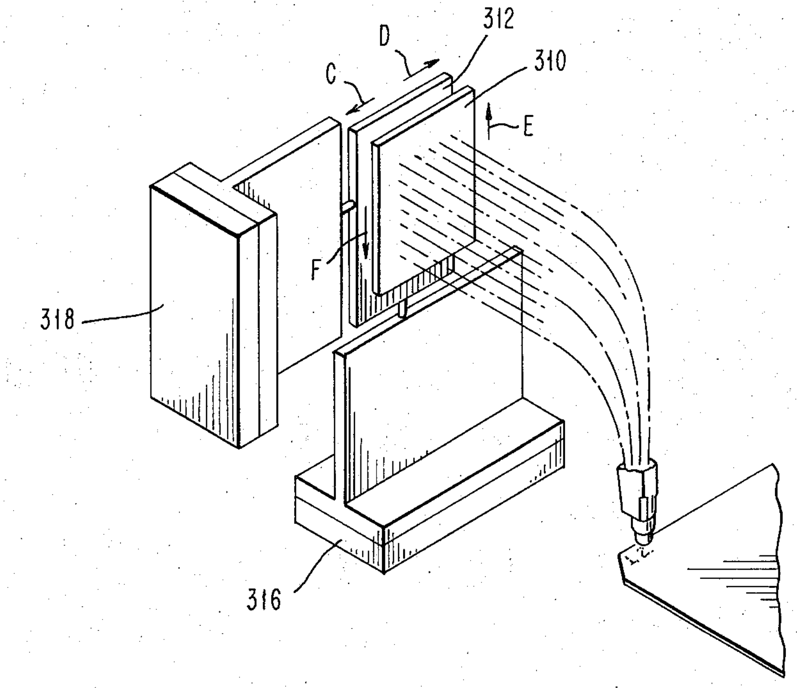
FIG. 31 is a schematic perspective view of the printer.

The printer 116 is disposed immediately above the punch station 114 and comprises a plurality of wires 302 (see FIGS. 30 and 31) which extend through a die or head 304. A platen 306 is disposed beneath the die 304, and the wires 302 as they extend through the die 304 are so disposed in such a close proximity and arrangement that they are capable of printing the various numerical and alphabetic characters which it is desired to print on the print line 110. The wires 302 are spread farther apart at their upper ends and extend through and are slidably disposed within a return plate 308. The return plate 308 is movable in the direction of the wires 302, and the wires also extend through a stationary guide plate 310. A code plate 312 is disposed behind the guide plate 310. A code plate 312 is disposed behind the guide plate 310 and has a plurality of projections 314 on its face adjacent the plate 310. The plate 312 is reciprocable by any suitable drive mechanism in the directions A and B, which are the same directions in which the wires 302 extend through the guide plate 310; and the return plate 308 is reciprocated by suitable drive mechanism in the same directions.

The code plate 312 is also reciprocable in directions C and D and in directions E and F (see FIG. 31) so that the proper projections 314 are brought into alignment with the wires 302 extending through the guide plate 310 for printing the desired characters. The code plate 312 is reciprocated in the directions C, D, E, and F by means of packaged differential linkages or actuators 316 and 318.

Figure 32:
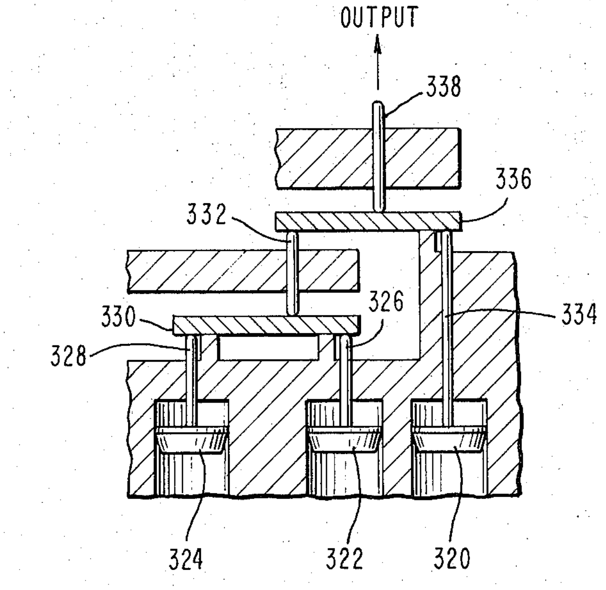
FIG. 32 is a schematic illustration of one of the two air pressure responsive actuators in the printer.

The linkages 316 and 318 are identical and each includes three pistons 320, 322 and 324 (see FIG. 32). The pistons 322 and 320 are located closer together than the pistons 322 and 324, as shown. The pistons 322 and 324, respectively, are provided with relatively short piston rods 326 and 328; and a link or cross bar 330 bridges the piston rods 326 and 328. A rod 332 abuts the link 330 at a point closer to the rod 326 than to the rod 328. The piston 320 is provided with a rod 334, and a link or cross bar 336 is in abutting relationship with the ends of the rods 334 and 332. A rod 338 is in abutting contact with the cross bar 336 at a point thereon closer to the rod 334 than to the rod 332, and the rod 338 constitutes the output member of the differential linkage or actuator 316 or 318 and is in contact with an edge of the code plate 312. Each of the pistons 320, 322 and 324 may have air pressure applied to them; and, depending on which ones of the pistons have such pressure applied to them, the output rod 338 may take eight different positions.

The actuator 316 is effective for moving the plate 312 vertically while the actuator 318 is effective for moving the plate 312 horizontally and actuators 316 and 318 function to put the plate 312 into eight different positions vertically and eight different positions horizontally, so that the proper wires 302 may be actuated by the bosses 314 on the surface of plate 312. The use of such a code plate 312 in connection with wires for printing has been previously used in the IBM 29 Card Punch, for example; and a description of this punch and its printer is given in the manual "IBM Field Engineering Theory of Operation 29 Card Punch" copyrighted 1965 and 1966. Therefore, further details of the printer and particularly the code plate 312 and wires 302 are not deemed necessary herein.

Figure 29:
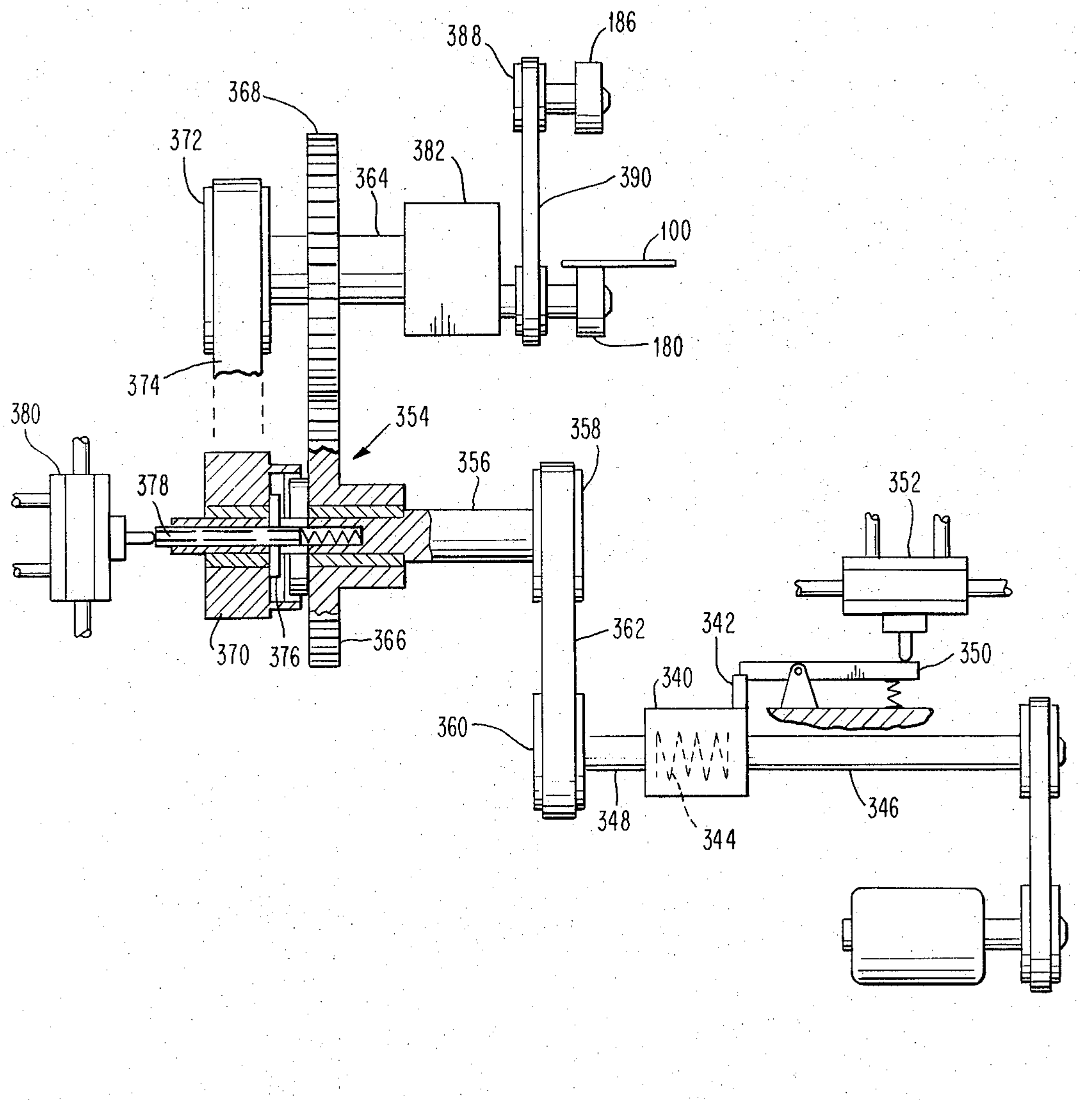
FIG. 29 is a schematic view of reversing mechanism for document card incrementing rolls in the card transport.

The mechanism for driving the incrementer wheels 180 and 186 includes a clutch 340 (see FIG. 29) having an outwardly extending tang 342 on its periphery. The tang 342 is connected to an internal spring 344 which engages an adjacent shaft portion for making a connection from a drive shaft 346 to a driven shaft 348 when the tang portion 342 is not braked or held from rotation. A lever 350 is provided for selectively holding the tang 342 from rotation or disengaging the clutch mechanism 340, and the lever 350 is actuated by means of a pneumatic actuator 352. Such a clutch mechanism has previously been used, for example, in the IBM 29 Card Punch; and the same manual above referred to in connection with the printer 116 may also be referred to details of such a clutch. Therefore, no further details of the clutch 340 will be disclosed herein.

Drive reversal mechanism 354 (see FIG. 29) is provided between the clutch 340 and the incrementer wheels 180 and 186. The drive reversal mechanism 354 includes an input shaft 356 which is driven from shaft 348 by means of pulleys 358 and 360 and a belt 362. The drive reversal mechanism includes an output shaft 364, and gears 366 and 368 are provided for drivingly connecting the shafts 356 and 364 for driving the shaft 364 in a direction opposite to that in which the shaft 356 is driven. Sprockets 370 and 372 and a belt 374 are provided for drivingly connecting the shafts 356 and 364 to provide a drive of the shaft 364 in the same direction as the shaft 356 is driven. A pin 376 mounted on a longitudinally movably actuator rod 378 is provided to act as clutching means for either causing the sprockets 370 and 372 or the gears 366 and 368 to be effective. Further details of the reversing mechanism 354 is given in the publication "Drive Reversal Mechanism" by W. P. Bakken and D. J. Wanek in the IBM *Technical Disclosure Bulletin*, Vol. 12, No. 7, December, 1969, page 940; and hence, no further details will be given herein.

A pneumatic actuator 380 is provided for shifting the rod 378 and hence for causing a change from forward drive to reverse drive and vice versa of the shaft 364. An incrementer mechanism 382 is driven by the shaft 364, and the output shaft 384 drives the incrementer rolls 180 and 186. The incrementer roll 186, for example, may be driven from the shaft 384 by means of sprockets 386 and 388 and belt 390. The incrementer mechanism 382 may, for example, be that shown in the IBM *Technical Disclosure Bulletin* entry entitled "Incrementer Device and Locking Means" by R. W. Luoma, Vol. 13, No. 8, January, 1971, page 2,236.

Figure 36:
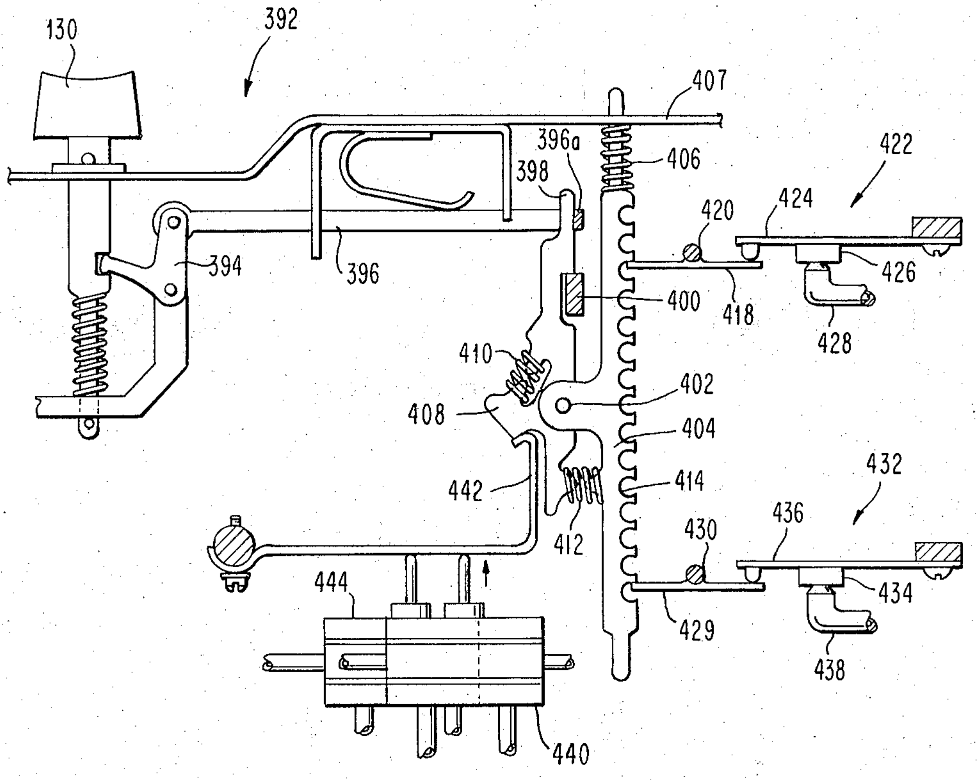
FIG. 36 is a diagrammatic side elevational view of key operated mechanism for controlling the pneumatic logic.

Each of the data keys 130 and also the space bar 132 drives key responsive mechanism 392 (see FIG. 36). A key 130 is connected by means of a bell crank 394 with a latch pull bar 396 that has a part 396 overlying a latch release lever 398. A stationary latch bail 400 is in latching relationship with respect to the lever 398, and lever 398 is pivoted at 402 with respect to a permutation bar 404. A spring 406 acts between a stationary part 407 and the bar 404 for yieldably moving the bar 404 downwardly. Another lever 408 is pivotally mounted at 402 along side of the lever 398. A spring 410 transmits rotary movement from the lever 398 to the lever 408, and a return spring 412 is disposed between the lever 408 and the permutation bar 404. The bar 404 is provided with a series of a slots 414 for receiving and actuating various control devices. The mechanism 392 as so far described is in use in the IBM 29 Card Punch, and the publication above referred to on this punch also may be referred to for greater detail of the mechanism; and, hence, further details will not be set forth herein.

A lever 418 is pivotally mounted at 420 and extends into one of the slots 414 in the permutation bar 404. The lever 418 is effective on a pneumatic switch 422 which includes a flexure spring 424 carrying a pad 426 that closes a conduit 428. Another lever 429 pivoted at 430 is effective on a pneumatic switch 432. The switch 432 comprises a pad 434 fixed on a flexure spring 436 and closing a conduit 438. A restore actuator 440 acts on a restore bail 442 that underlies the lever 408, and another restore actuator 444, identical with the actuator 440, also acts on the bail 442 but is positioned at the other end of the bail 442 with respect to the actuator 440.

The permutation bars 404 (one for each of the keys 130 and the bar 132) are positioned side by side in a row behind the keys 130, and there are one or more of the levers 418 positioned in slots 414 of each of the bars 404. There is a lever 418 for each of the uppermost slots 414 (those slots 414 above the lowermost slot 414) in the illustrated permutation bar 404, and the levers 418 extend into only certain ones of each of the bars 404 in accordance with a predetermined code.

When a key 130 is depressed, the corresponding latch pull bar 396 is effective to pull the lever 398 off of the stationary latch bail 400 so that the spring 406 moves the bar 404 downwardly to open any pneumatic switches 422 that have their lever 418 in engagement with the particular bar 404. Thus, different signals are provided, opening various of the conduits 428 and allowing the other conduits 428 to remain closed, depending on which of the keys 130 is depressed.

The lever 429 is disposed within the lowermost slot 414 of all of the permutation bars 404; and, therefore, the conduit 438 is opened to produce an "any data key" or "keyboard strobe" signal, whenever any of the keys 130 or bar 132 is depressed.

The permutation bars 404, that drop under the action of the respective springs 406 when a key 130 or bar 132 is depressed, are returned to their uppermost positions in which the lever 398 again engages the bail 400 by the action of the actuators 440 and 444 acting through the restore bail 442.

Figure 33:
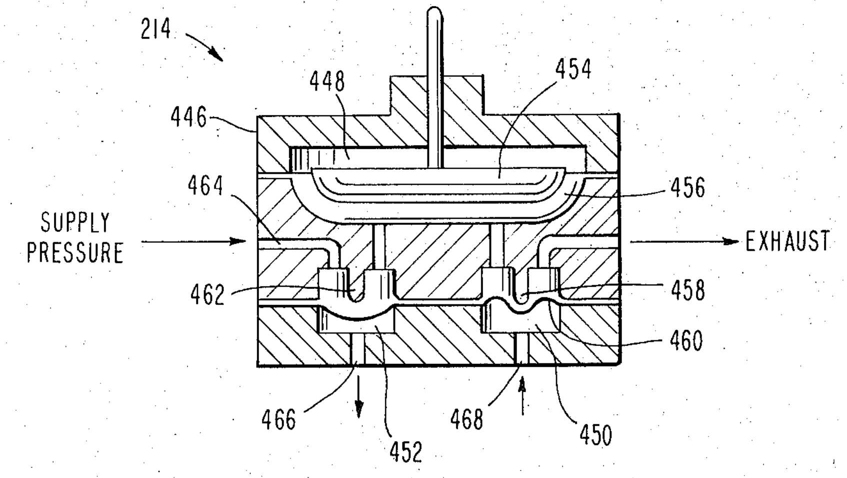
FIG. 33 is a sectional view of one of a plurality of air pressure responsive actuators used in the pneumatic logic.

Each of the pneumatic actuators 214, 240, 280, 246, 352, 380, 440 and 444 comprises a casing 446 (see FIG. 33) having cavities 448, 450 and 452 therein. A piston 454 is slideably disposed within the cavity 448, and a diaphragm 456 extends across the cavity 448 and is adapted to rest on the piston 454. The cavity 450 is provided with a ridge 458 therein and contains a flexible diaphragm 460 which is adapted to seal on the ridge. The cavity 452 contains a ridge 462, and the same diaphragm 460 extends across the cavity 452 and is adapted to seal on the ridge 462. The casing 446 has three air supply ports 464, 466 and 468 for controlling the movement of the piston 454. The port 464 is continuously supplied with air under pressure, and the ports 466 and 468 act as control ports. The air pressure supplied to each of the ports 466 and 468 is always the inverse of the other; for instance, if air under pressure is supplied to the port 466 sealing the diaphgram 460 on the ridge 462, there will be no pressure supplied to the port 468 so that the diaphragm 460 will not seal on the ridge 458.

The column indicator 164 may be of any suitable type and may, for example, be of the type illustrated and described in the publication by W. P. Bakken entitled "Pneumatic Column Indicator Apparatus", IBM *Technical Disclosure Bulletin*, Vol. 13, No. 1, June, 1970, page 78. The code disk illustrated in this publication would be driven along with the incrementer roll 180 for indicating the postion of a card 100 in the card transport.

Figures 34A, 34B:
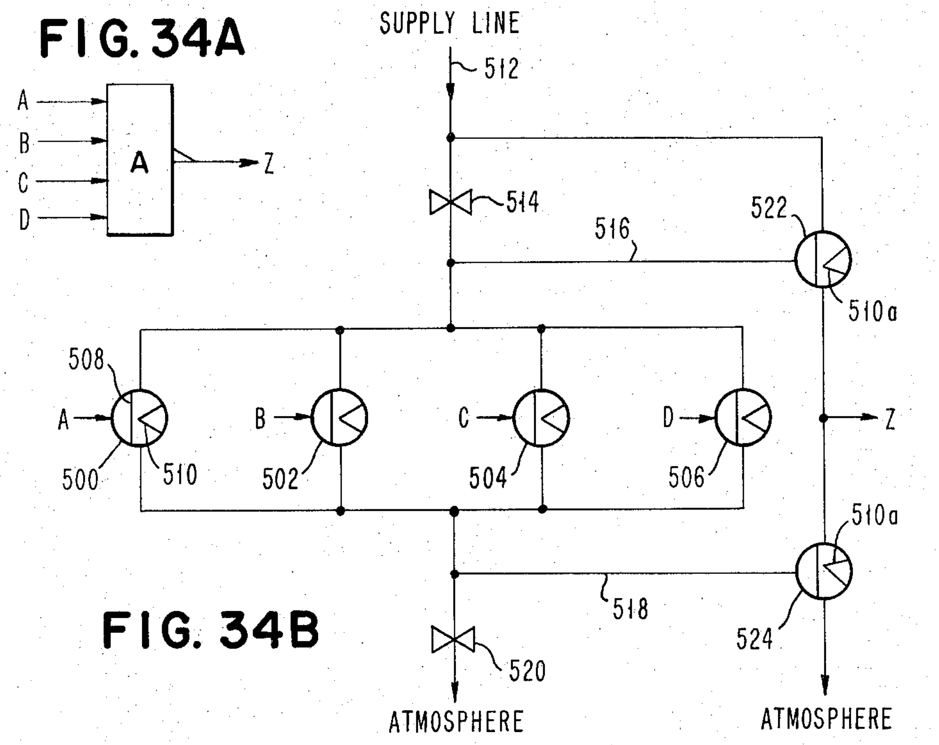
FIGS. 34A and 34B are schematic illustrations of one of the pneumatic AND circuits used in the pneumatic logic.

Various pneumatic AND and OR circuits are utilized in the pneumatic logic shown in FIGS. 3–16 and about to be described. These AND and OR circuits may have any suitable constructions; however, for the purpose of example, a suitable AND circuit is shown in FIGS. 34A and 34B. Referring to these figures, the AND circuit may be seen to comprise four pneumatic valves 500, 502, 504 and 506. The four input lines A, B, C and D, each adapted to have a pneumatic pressure applied to it, are applied respectively to the valves 500, 502, 504 and 506. Each of the valves comprises a flexible diaphragm 508 adapted to seal on a sharp ridge 510 when air under pressure is applied from the respective input lines A, B, C or D. The AND circuit has a supply line 512 to which air under pressure is supplied, and line 512 is connected through a restriction 514 with one side of each of the pneumatic valves connected to a line 516. The other sides of the valves 500, 502, 504 and 506 are connected together and to a line 518, and line 518 is connected to atmosphere through a restriction 520.

The AND circuit also includes two additional valves 522 and 524 connected together by the output line Z of the AND circuit. The valves 522 and 524 are each identical with the valves 500, 502, 504 and 506 except that the ridge 510 is off center and is closer to the side of the valve connected to the line Z than to the opposite side of the valve. The lines 516 and 518 are applied to the valves 522 and 524 as illustrated. One side of the valve 524 is connected to atmosphere, and one side of the valve 522 is connected to line 512, as shown.

The AND circuit provides a low output on the line Z when the input lines A, B, C and D are all supplied with air under pressure (the small flag on the output line Z in FIG. 34A indicates that the pressure on the line Z is inverse or opposite with respect to the pressures on lines A, B, C and D not having such flags). When all of the lines A, B, C and D have air under pressure supplied to them, all of the diaphragms 508 seal on the ridges 510 in the valves 500, 502, 504 and 506. Therefore, there is no pressure drop within the restriction 514, and air under full or high pressure is applied to the diaphragm of the valve 522, sealing this diaphragm on its ridge 510. Therefore, no air pressure is supplied at this time to the output line Z. On the other hand, if one or more of the input lines A, B, C and D is not provided with air under pressure, the corresponding valve 500, 502, 504 and 506 is open. Air then flows from the input line 512, through the restriction 514, through the open one of the valves 500, 502, 504 and 506 and through the restriction 520 to atmosphere. Due to the restrictions 514 and 520, the air within the lines 516 and 518 has a pressure of about one-half the pressure of the air supplied to the input line 512. Full line pressure (P) applied to one side of the valve 522 and ½P applied through line 116 to the diaphragm 508 of the valve 522 allow the valve 522 to remain open, since the ridge 510 is off center; and full line pressure (P) is applied to the output line Z. The pressure of ½P applied to the diaphgram 508 of the valve 524 causes a sealing of the diaphgram 508 on the ridge 510*a*, of this valve, even through full line pressure exists in the line Z, since the ridge 510 of the valve 524 is off center.

Figures 35A, 35B:
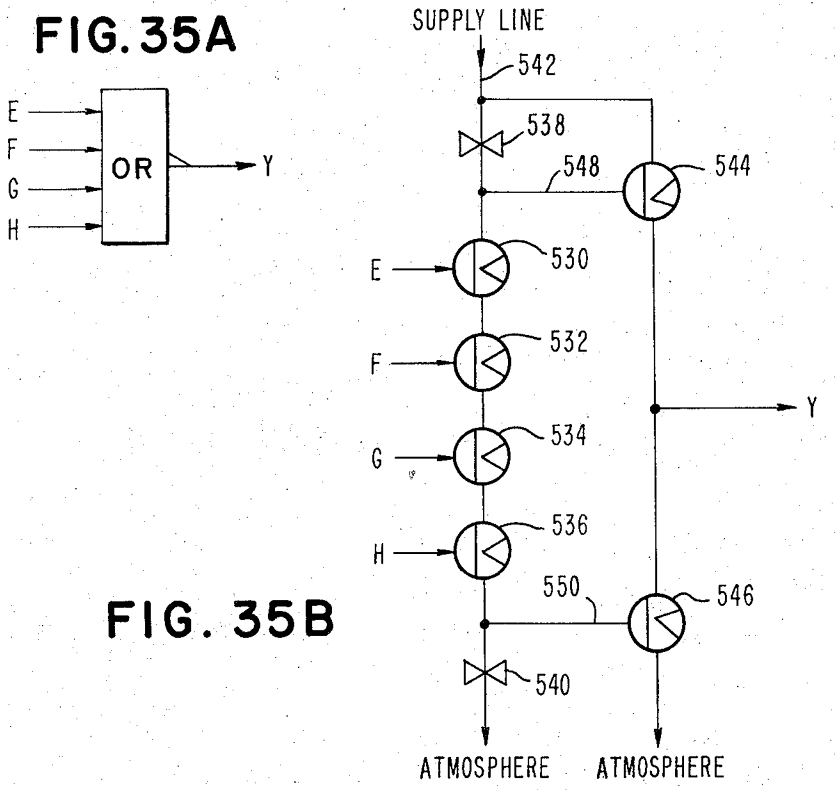
FIGS. 35A and 35B are schematic illustrations of one of the pneumatic OR circuits used in the pneumatic logic.

An exemplary pneumatic OR circuit is shown in FIG. 35A and FIG. 35B and comprises pneumatic valves 530, 532, 534 and 536 respectively connected to input lines E, F, G, and H. These valves are similar to the valve 500 and are connected in series between restrictions 538 and 540. An air pressure supply line 542 is connected to the restriction 538, and the restriction 540 is connected to atmosphere as shown. The OR circuit includes two additional valves 544 and 546, and these valves are respectively similar to the valves 522 and 524. One side of valve 544 is connected to the air supply line 542, and the other side of valve 544 is connected to the output line Y. A control line 548 connects the junction of the restriction 538 and valve 530 with the valve 534. The valve 546 is connected on one side with the output line Y and is connected on the other side with atmosphere. A control line 550 connects the junction of the valve 536 and restriction 540 with the valve 546.

The OR circuit illustrated in FIG. 35A and FIG. 35B provides a low output on the output line Y whenever a high output is supplied to any of the input lines E, F, G and H and provides a high output on the line Y when no pressure is applied to any of the input lines E, F, G and H. Since the valves 530, 532, 534, and 536 are in series, the closure of a single one of these valves has the same effect as a closure of one or more of the others of these valves and prevents air flow from the line 548 to the line 550. There is, therefore, no drop in air pressure through the restriction 538; and full fluid pressure is therefore applied to the valve 544 both from the line 542 and through the line 548. The diaphragm 508 of the valve 544 thus rests on the ridge 510 of this valve and closes the valve. The output line Y, therefore, provides a zero output pressure at this time. When all of the valves 530, 532, 534 and 536 are open, air may flow from the restriction 538 to the restriction 540, and the air pressure in the lines 548 and 550 is ½P, assuming that the full air pressure applied to line 542 is considered to be (P). With ½P being applied to the diaphgram 508 of the valve 544 and with full pressure (P) being applied to the side of the valve 544 connected to the line 542, the diaphragm 508 of this valve is off the ridge 510, due to the off center location of ridge 510; and this fluid pressure is applied to the output line Y. The pressure of ½P applied to the diaphgram 508 of the valve 546 closes the valve 546, due to the off center location of the ridge 510 of this valve, maintaining the full pressure of (P) within the output line Y.

Figure 17:
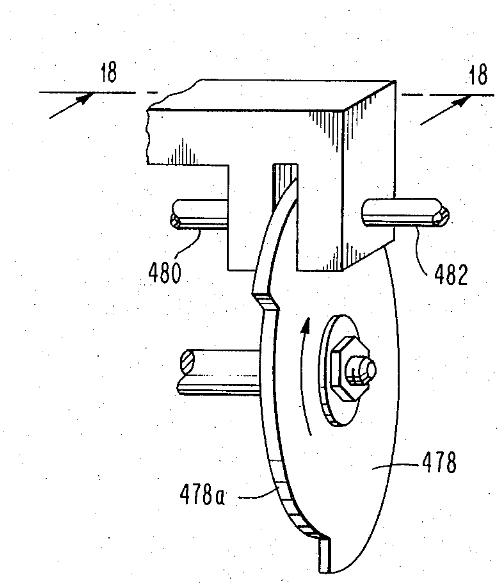
FIG. 17 is a perspective view of a pneumatic emitter included in the pneumatic logic.
Figure 18:
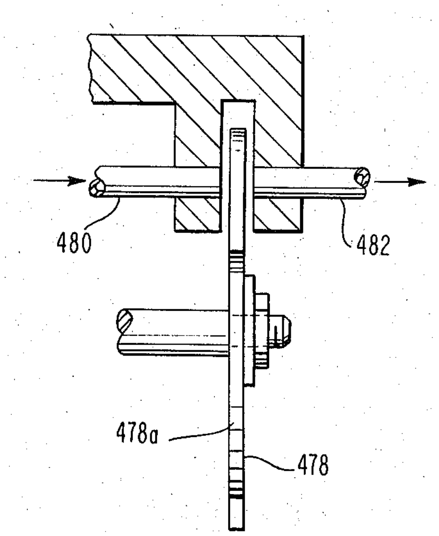
FIG. 18 is a sectional view taken on line 18—18 of FIG. 17.
Figure 19:
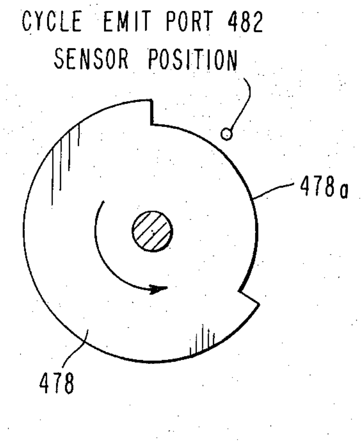
FIGS. 19 and 20 are elevational views of emitter disks used in the pneumatic emitters of the pneumatic logic.

Various parts of the keypunch are under the control of an End of Card emitter 470, a Start of Card emitter 472 and a Cycle emitter 476. Referring to FIGS. 17, 18 and 19, the emitter 476 may be seen to comprise a disk 478 having an arcuate slot 478 cut into its periphery. The disk 478 is positioned between an air nozzle 480 and an air reception port 482, with the arrangement being such that the periphery of the disk 478 will either allow air to flow from the nozzle 480 to the port 482 or will prevent this flow depending on whether or not the slot 478 is positioned between the nozzle 480 and port 482. The disk 478 is affixed to the punch shaft 276 and therefore makes one revolution for every revolution of the shaft 276.

Figure 20:
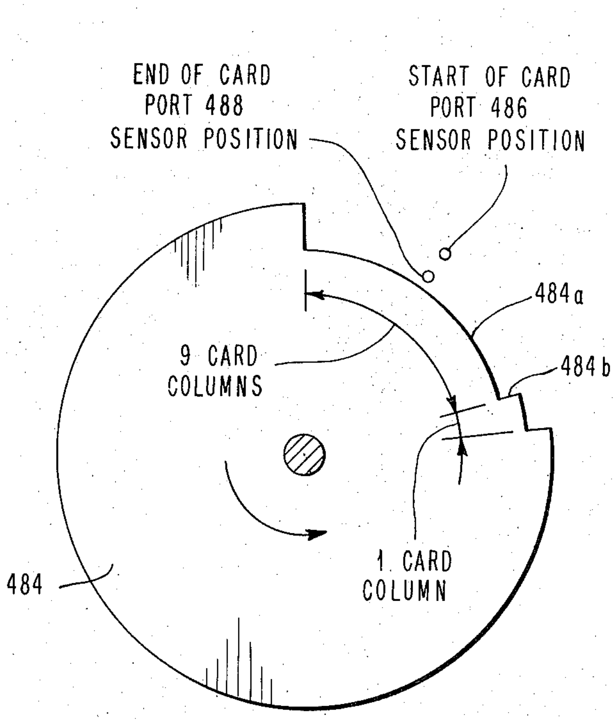
Figure 21:
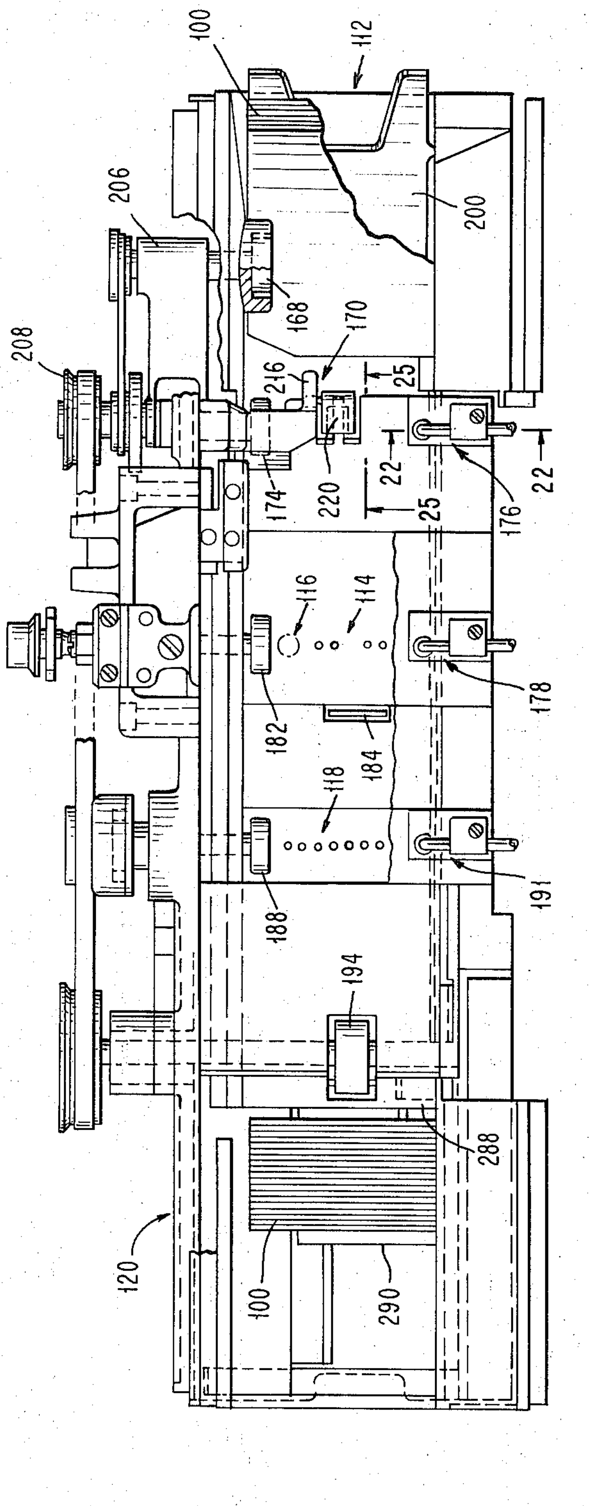
FIG. 21 is a top plan view of the machine.

The emitters 470 and 472 have basically the same construction as the emitter 476 but are combined into a single assembly. The emitters 470 and 472 comprise the emitter disk 484 (see FIG. 20) which has the slot 484 cut in its periphery. The slot 484 includes a step 484 making the slot shorter arcuately on its inside than along the radius of the disk 484. The emitter 472 includes the output port 486, and the emitter 470 includes the output port 488. These ports correspond to the port 482 for the emitter 476, and there are nozzles (not shown), corresponding to the nozzle 480, axially located with respect to the ports 486 and 488 so that when a solid part of the disk 484 covers one or both of the ports 486 and 488, there is no air pressure transmitted to these ports. The disk 484 is connected to the second incrementer roll 186 to rotate therewith, and the disk 484 rotates 9.23° per revolution of the punch shaft 276. As will be observed from FIG. 20, the wider outer portion of the slot 484*a* covers 10 card columns, while the relatively short inner portion of the slot 484*a* covers nine card columns, that is, as a card 100 is incremented between the rolls 186 and 188, the outer and inner portions of the slot 484*a* correspond with ten and nine columns of movement of the card 100, respectively.

The control portion of the pneumatic control system for the keypunch is shown in FIG. 3; and, as will be observed, an air power supply 1000 supplies air under pressure to the punch interposer actuators 270, the print actuators 316 and 318, the read head 190, the keyboard 126, the switches 152, 154, 160, etc., the pneumatic actuators 214, 240, 280, etc., the sensors 191, 178 and 176, and the emitters 470, 472 and 476. The supply 1000 may be of any suitable type and may, for example, have an output pressure of one pound per square inch. The read head 190, the keyboard 126, the switches 152, 154, etc., the sensors 191, etc., and the emitters 470, etc. provide, according to the manner in which they are actuated, the various pneumatic signals shown on the right edge of FIG. 3 and which include + READ I-B, + READ II-B, + READ III-B, + UC-B, + LC-B, − MANUAL FEED, − RELEASE KEY, + AUTO FEED, − STACKER FULL, − CARD IN READ, + END OF CARD, etc. These lines and signals are applied to corresponding lines in the rest of the pneumatic circuitry which is shown in FIGS. 4 to 16. For easy reference, the corresponding lines to which these signals are applied, may be found in the figures indicated in FIG. 3 for the various signals. For example, the signal + READ I-B is applied to the line labeled + READ I-B found on FIG. 13, particularly on the left edge of FIG. 13. In this connection it may be noted that the output lines and signals from the pneumatic circuitry in each of FIGS. 3 to 16 are located along the right edge of the figure and the input lines and signals are located along the left edge of each figure.

Input lines and signals applied onto the punch interposer actuators 270, the print actuators 316 and 318 and the actuators 214, 242, 280, etc. are listed on the left edge of FIG. 3 and include + PUNCH I-B, + PUNCH II-B, + PUNCH III-B, + PRINT B, + PRINT ENABLE, + PICK ROLL, + INCREMENTER ROLL,, + GATE, + CYCLE CLUTCH, − BACKSPACE, and + KEYBOARD RESTORE, etc. The figure numbers listed opposite each of these lines and signals indicate the figure showing the same line and signal as an output line and signal (on the right edge of the figure).

Figures 4, 4A:
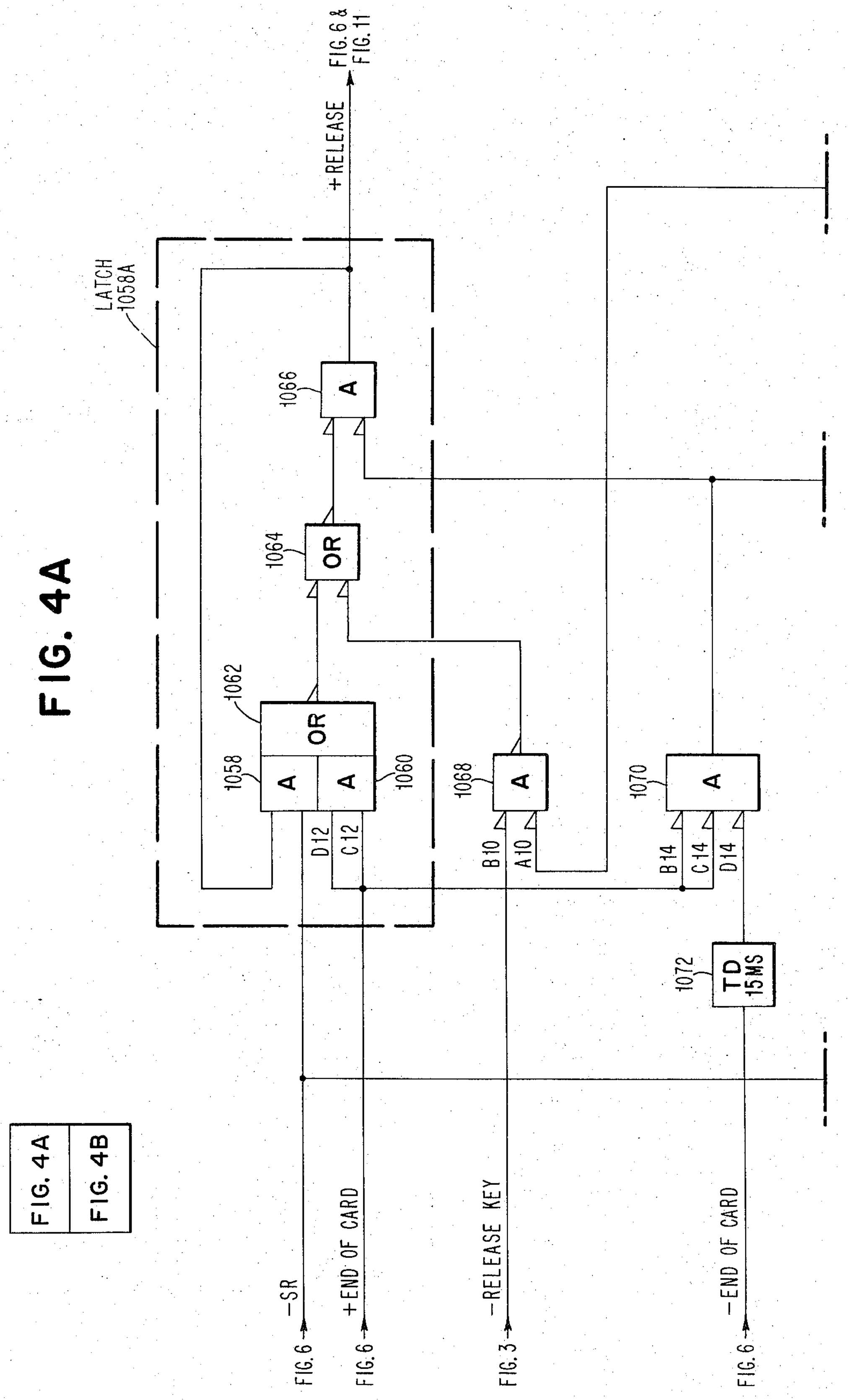
FIGS. 4 to 16 are illustrations, which are of the same type as FIG. 3, of other portions of the pneumatic control logic, FIG. 4 showing release and feed logic, FIG. 5 showing gate and column indicator logic, FIG. 6 showing interlock logic, FIG. 7 showing punch mode control logic, FIG. 8 showing program control logic, FIG. 9 showing keyboard control logic, FIG. 10 showing backspace control logic, FIG. 11 showing clutch control logic, FIG. 12 showing punch timing logic, FIGS. 13, 14 and 15 showing punch latch logic for tiers 1, 2 and 3 respectively, and FIG. 16 showing print logic.
Figure 4B:
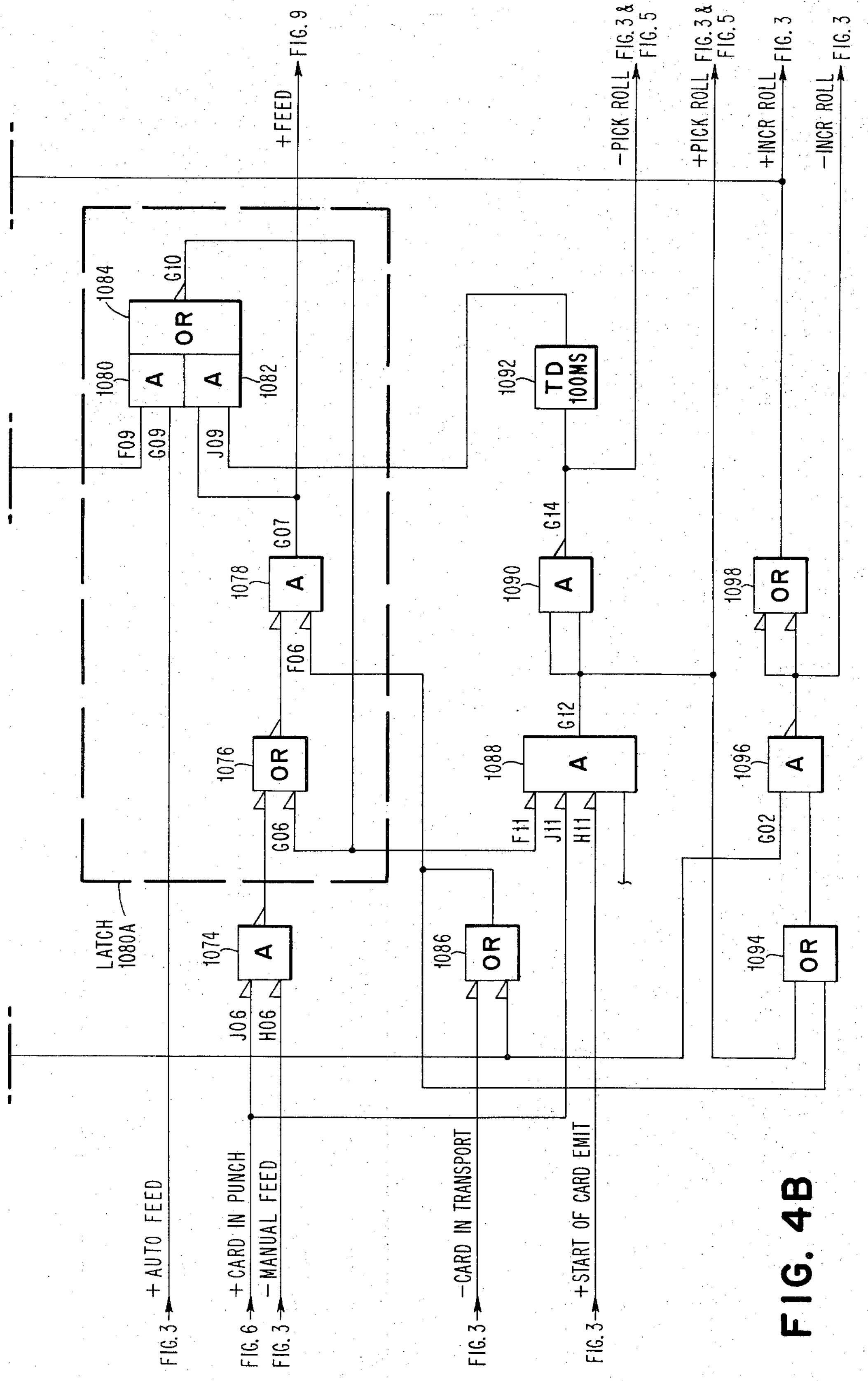

FIG. 4 shows the card release and feed pneumatic logic of the machine. The input lines and signals (on the left edge of FIG. 4) are − SR (from FIG. 6), + END OF CARD (from FIG. 6), − RELEASE KEY (from FIG. 3), − END OF CARD (from FIG. 6), etc.; and the output signals and lines are + RELEASE (applied to the logic of FIGS. 6 and 11), + FEED (applied to the logic of FIG. 9), − PICK ROLL (applied to the logic of FIG. 3 and 5), etc. AND circuits 1058 and 1060, OR circuit 1062, OR circuit 1064, and AND circuit 1066 have the signals − SR and + END OF CARD applied to them, and these circuits together form a latch 1058A. An AND circuit 1068 has the − RELEASE KEY signal applied to it and is connected with OR circuit 1064 as shown. An AND circuit 1070 has the + END OF CARD signal applied to it as an input, and a time delay circuit 1072 having the − END OF CARD signal applied to it also supplies an input to the AND circuit 1070 as shown. An AND circuit 1074 has the + CARD IN PUNCH and − MANUAL FEED signals applied to it and is connected with an OR circuit 1076, and AND circuit 1078 AND circuits 1080 and 1082, and an OR circuit 1084 as shown. The circuits 1076, 1078, 1080, 1082 and 1084 together make up a latch 1080A. An OR circuit 1086 having the signal − CARD IN TRANSPORT applied to it as an input is connected to supply and output to AND circuit 1078, and AND circuits 1088 and 1090 are connected with the + START OF CARD EMIT signal and drive a time delay circuit 1092 (which may have a time delay of 100 milliseconds, for example). An OR circuit 1094 has the output of OR circuit 1086 applied to it, and OR circuit 1094 drives AND circuit 1096 which in turn drives OR circuit 1098 so as to provide the signals + INCREMENTER ROLL and − INCREMENTER ROLL, the connections of the various circuits being as illustrated in FIG. 4.

Figure 5:
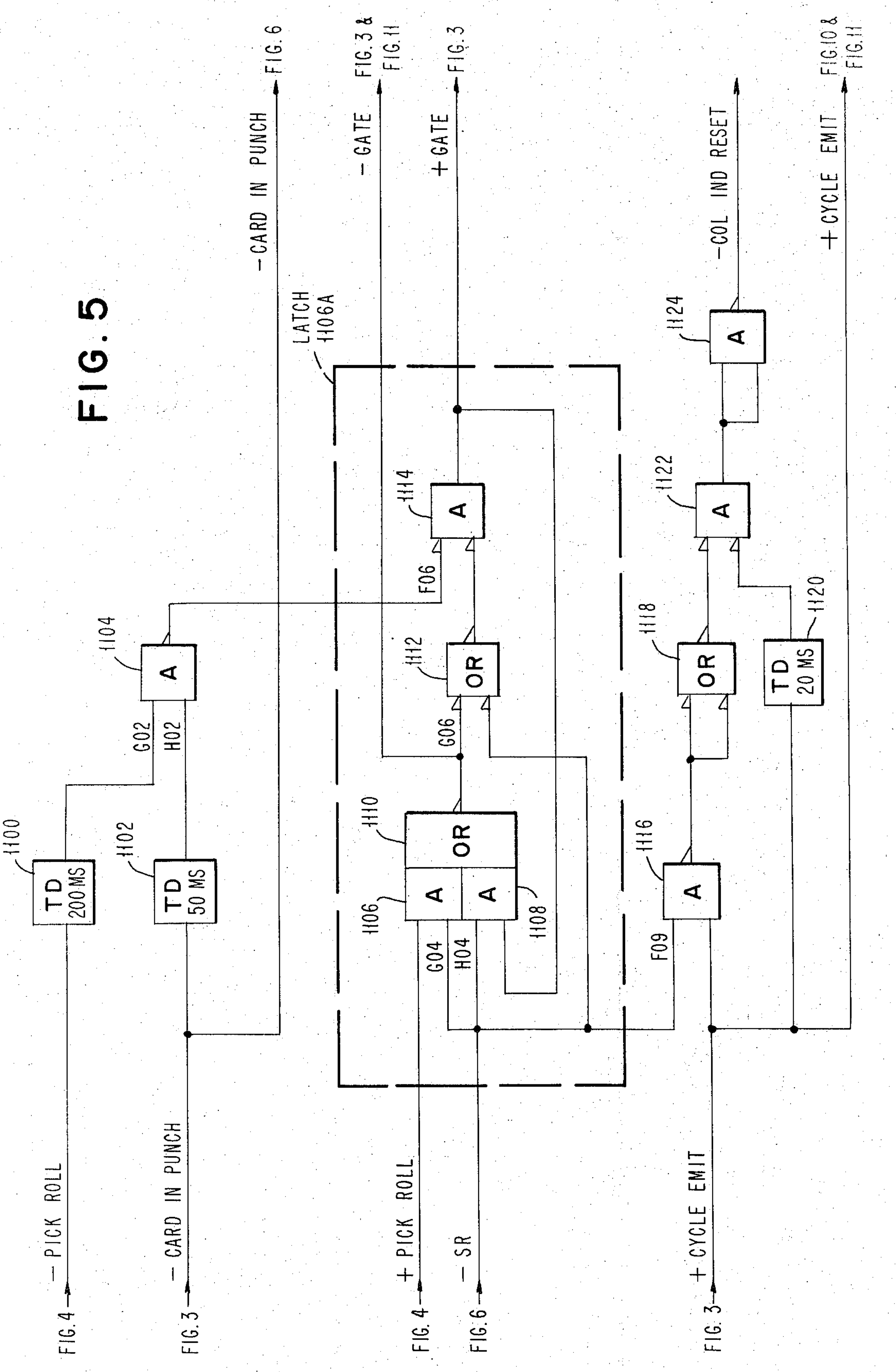

FIG. 5 discloses the gate and column indicator logic of the controls. As shown, the − PICK ROLL signal is applied as an input to the time delay circuit 1100, and the − CARD IN PUNCH signal is applied to the time delay circuit 1102. These delay circuits may respectively have delays of 200 milliseconds and 50 milliseconds, respectively, for example. The outputs of circuits 1100 and 1102 are applied to the AND circuit 1104. AND circuits 1106 and 1108 have the signals + PICK ROLL and − SR applied as inputs, and these AND circuits are applied as inputs to an circuit 1110. OR circuit 1110 is connected to supply an input to OR circuit 1112 which in turn provides an input to AND circuit 1114. The circuits 1106, 1108, 1110, 1112, and 1114 together constitute a latch 1106A. The signal + CYCLE EMIT is applied as an input to AND circuit 1116 which acts as an input to OR circuit 1118. A time delay circuit 1120 also has the − CYCLE EMIT signal as an input, and the outputs of circuits 1118 and 1120 drive AND circuit 1122 and 1124.

Figure 6:
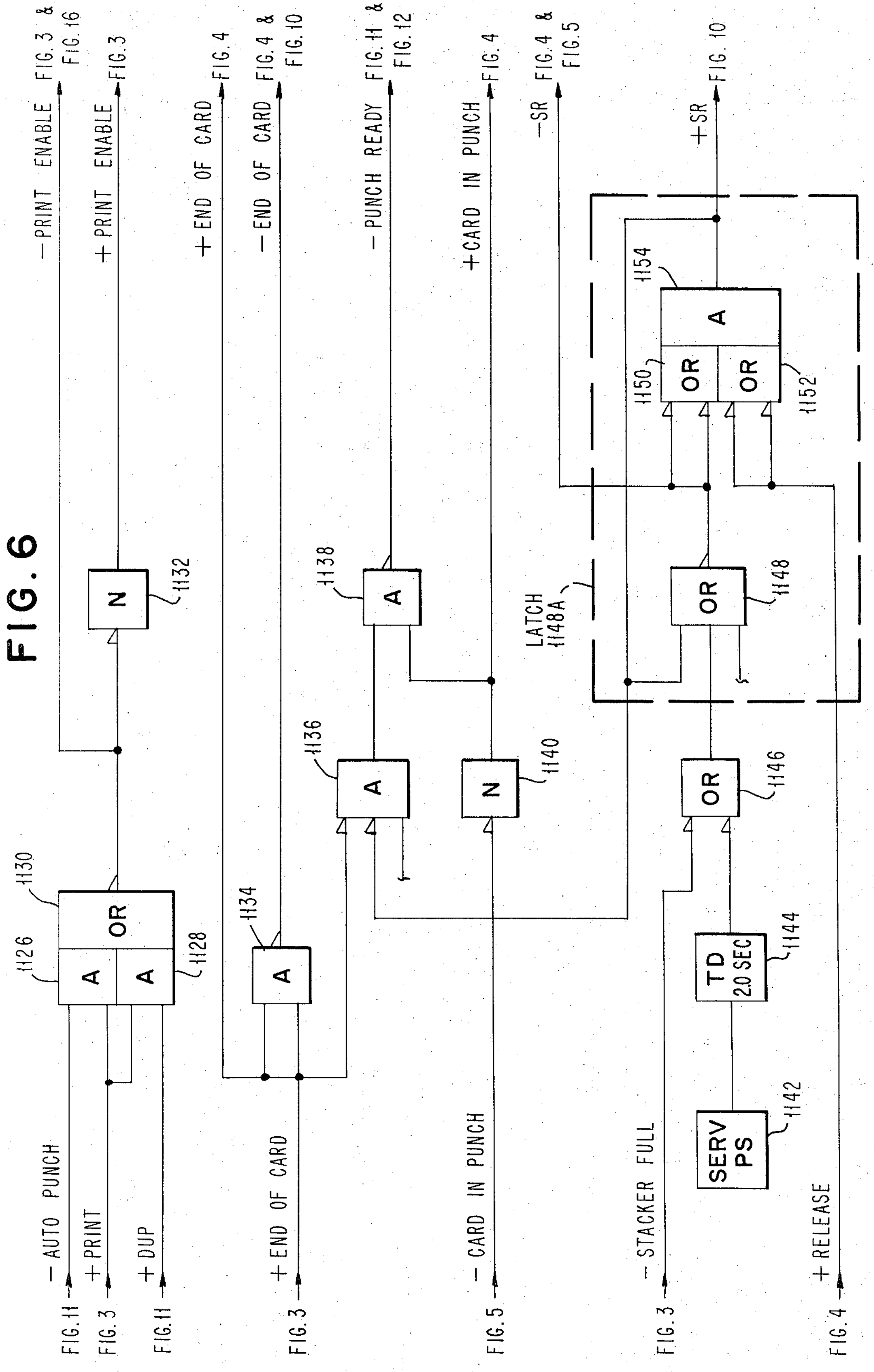

FIG. 6 discloses the interlock circuitry of the pneumatic controls. AND circuit 1126 has the signals − AUTO PUNCH and + PRINT SW applied to it as inputs, and AND circuit 1128 has the signal + DUP applied to it as an input. The two circuits 1126 and 1128 constitute inputs to OR circuit 1130 which in turn drives inverter circuit 1132. The signal + END OF CARD is applied to AND circuits 1134 and 1136, and AND circuit 1136 drives AND circuit 1138. Inverter 1140 has the signal − CARD IN PUNCH as an input and has its output applied to AND circuit 1138. The circuit 1142, which constitute a switched source of air under pressure, drives a time delay circuit 1144 which may, for example, provide a time delay of 2 seconds, and circuit 1144 provides an input to OR circuit 1146. OR circuit 1146 provides an input to OR circuit 1148 which provides an input to OR circuit 1150. OR circuit 1152 has the signal + RELEASE applied to it as an input, and circuits 1150 and 1152 constitute inputs to AND circuit 1154. The circuits 1148, 1150, 1152 and 1154 make up a latch 1148A.

Figures 7, 7A:
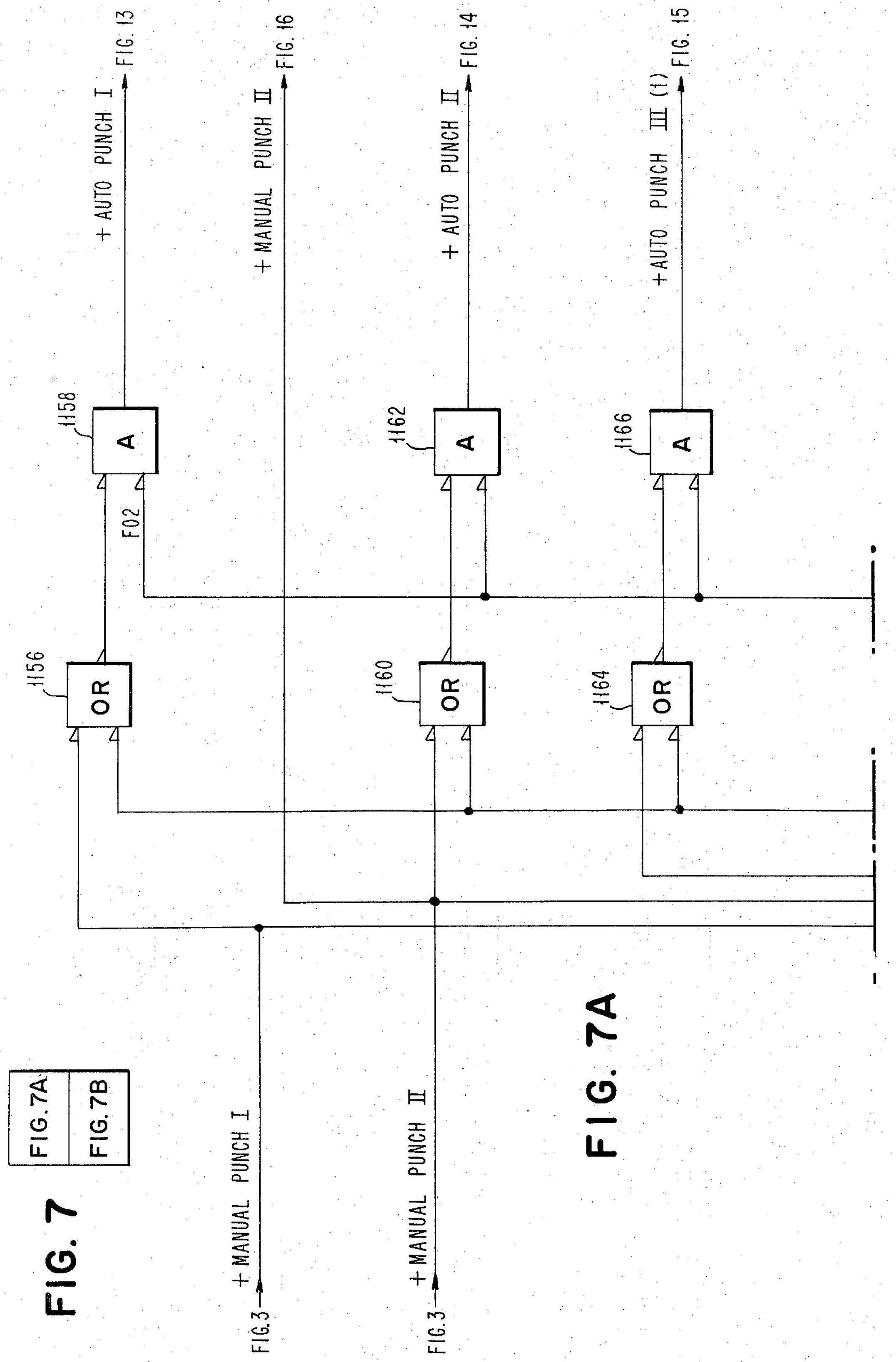
Figure 7B:
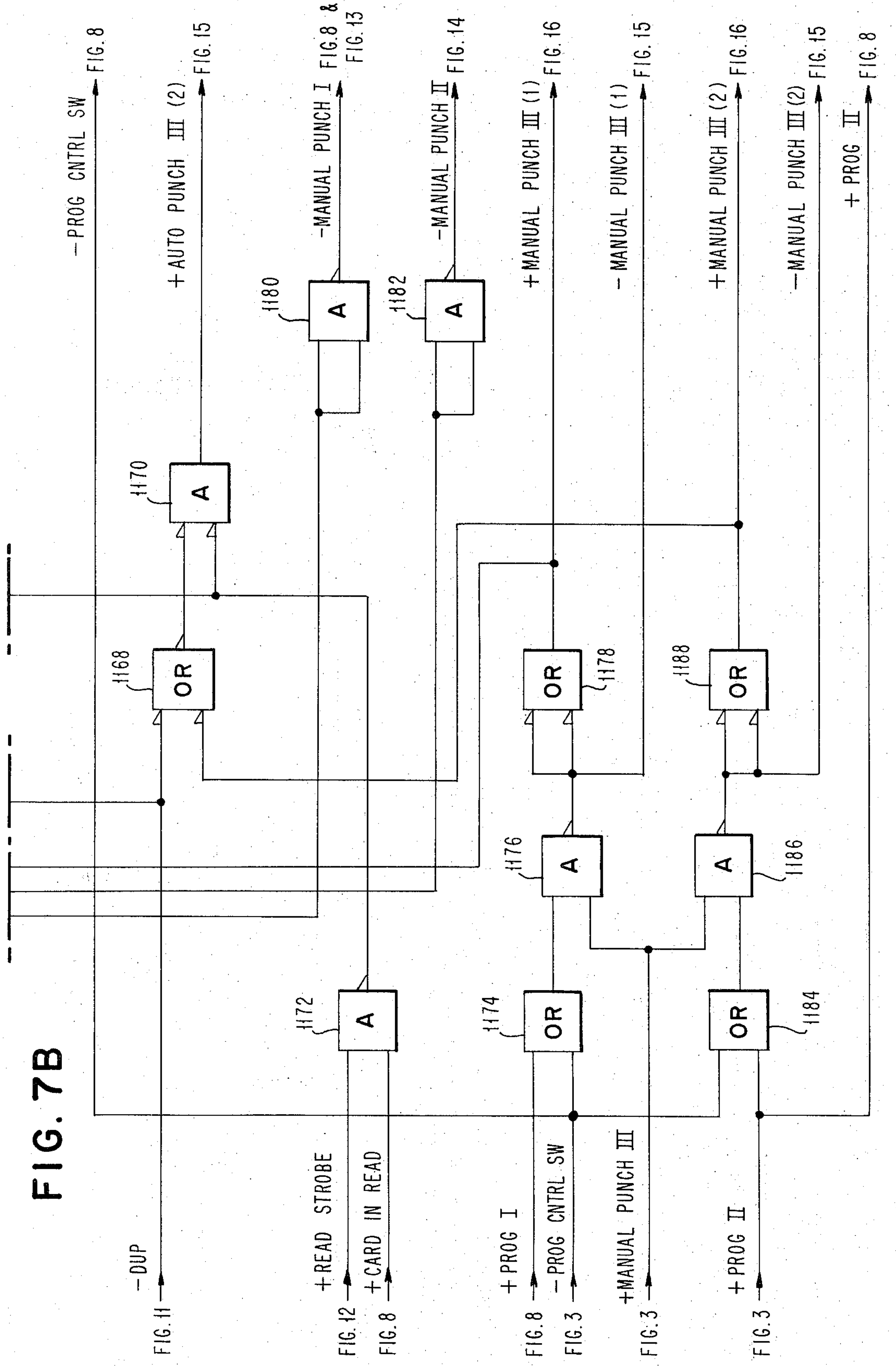

FIG. 7 discloses the punch mode control pneumatic circuitry of the keypunch controls; and, in this figure, OR circuit 1156 has the signal + MANUAL PUNCH I applied to it as an input and provides an output to AND circuit 1158. OR circuit 1160 has the signal + MANUAL PUNCH II applied to it as an input and provides its output to AND circuit 1162. OR circuit 1164 has the input signal − CUP applied to it as an input and provides its output to AND circuit 1166. OR circuit 1168 has the input signal − DUP applied to it and has its output applied to AND circuit 1170. AND circuit 1172 has the input signals + READ STROBE and + CARD IN READ applied to its as inputs. OR circuit 1174 has the input signals + PROGRAM I and − PROGRAM CONTROL SW applied to it as inputs and has its output applied to AND circuit 1176 which in turn drives OR circuit 1178. AND circuit 1180 has the input signal + MANUAL PUNCH I applied to it, and AND circuit 1182 has the input signal + MANUAL PUNCH II applied to it. OR circuit 1184 has the input signal + PROGRAM II applied to it and drives AND circuit 1186 and OR circuit 1188.

Figures 8, 8A:
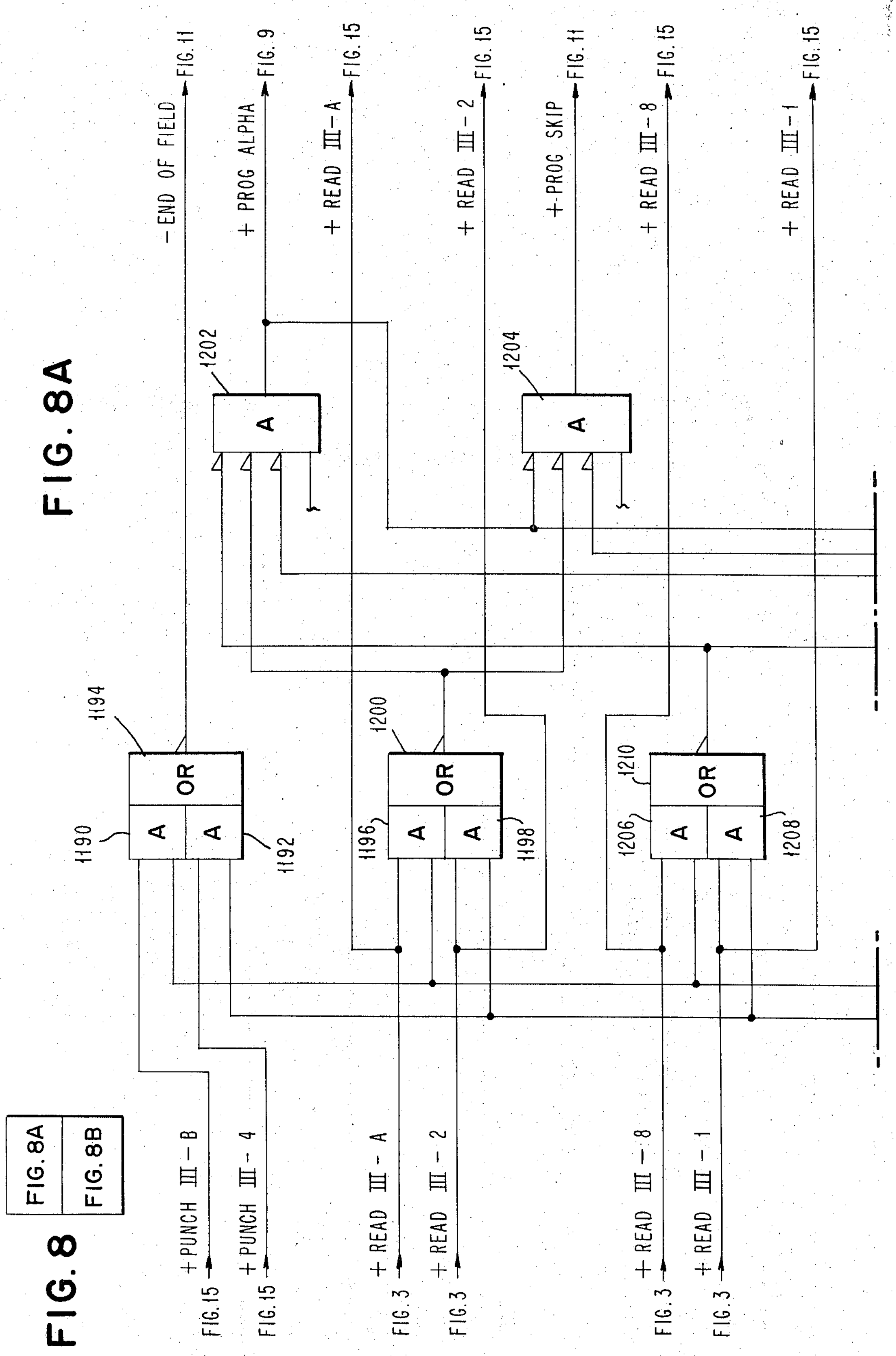
Figure 8B:
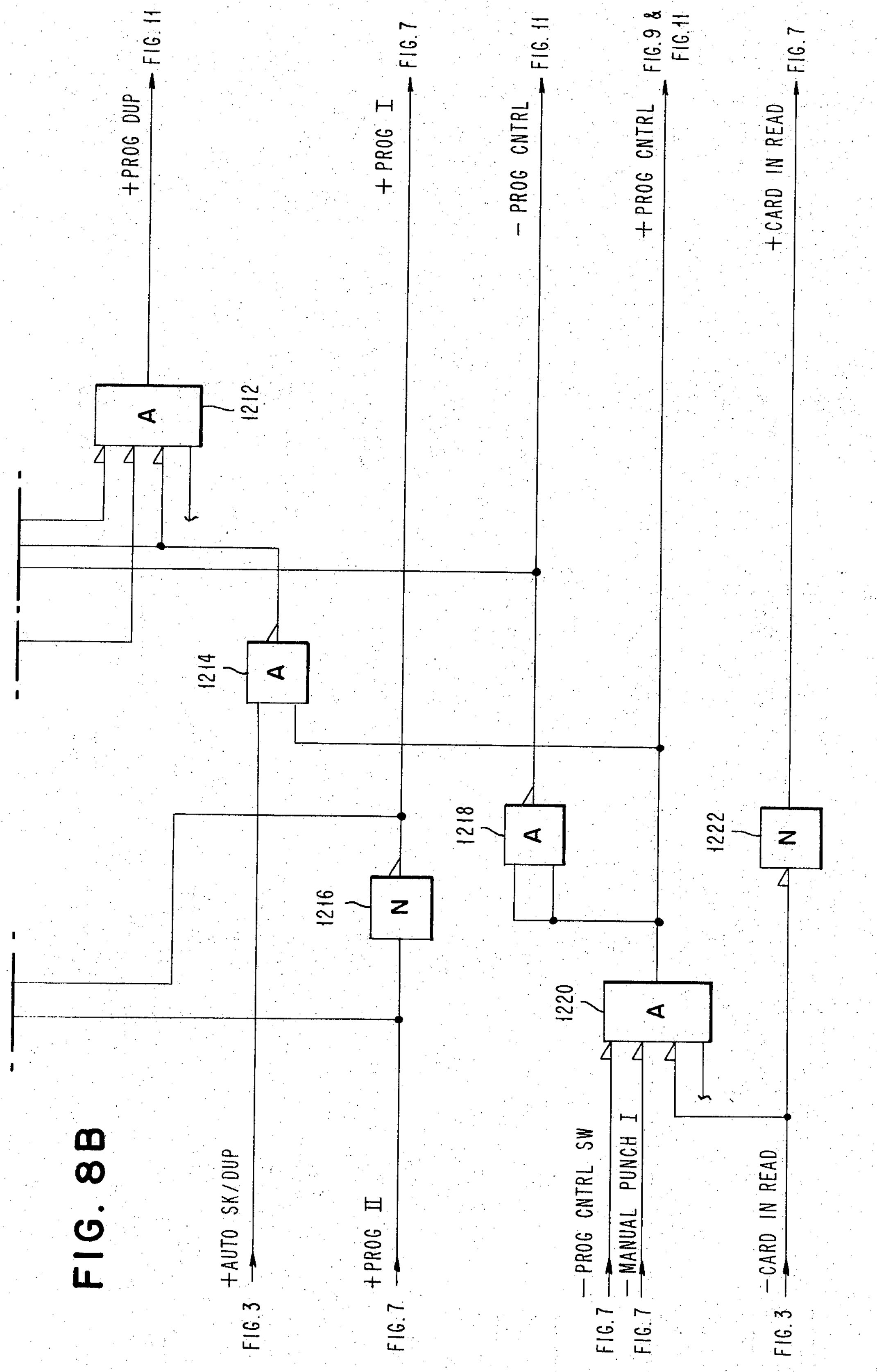

FIG. 8 discloses the program control logic of the keypunch controls. AND circuits 1190 and 1192 in this logic have input signals + PUNCH III-B and + PUNCH III-4, respectively applied to them. AND circuits 1190 and 1192 provide input to OR circuit 1194. AND circuits 1196 and 1198, respectively, have the input signals + READ III-A and + READ III-2 as inputs and are appended onto OR circuit 1200. AND circuit 1202 has the output of OR circuit 1200 as an input, and OR circuit 1200 also provides an input to AND circuit 1204. AND circuits 1206 and 1208, respectively, have input signals + READ III-8 and + READ III-1 applied to them and are appended onto circuit 1210. OR circuit 1201 drives AND circuit 1212, and AND circuit 1214 having the input signal + AUTO SKIP DUP applied to it also drives AND circuit 1212. Inverter circuit 1216 has the input signal + PROGRAM II applied to it; and AND circuit 1218 has, as inputs, the output of AND circuit 1220, which has the input signals − PROGRAM CONTROL SW and − MANUAL PUNCH I applied to it as inputs. Inverter circuit 1222 has the input signal − CARD IN READ applied to it.

Figures 9, 9A:
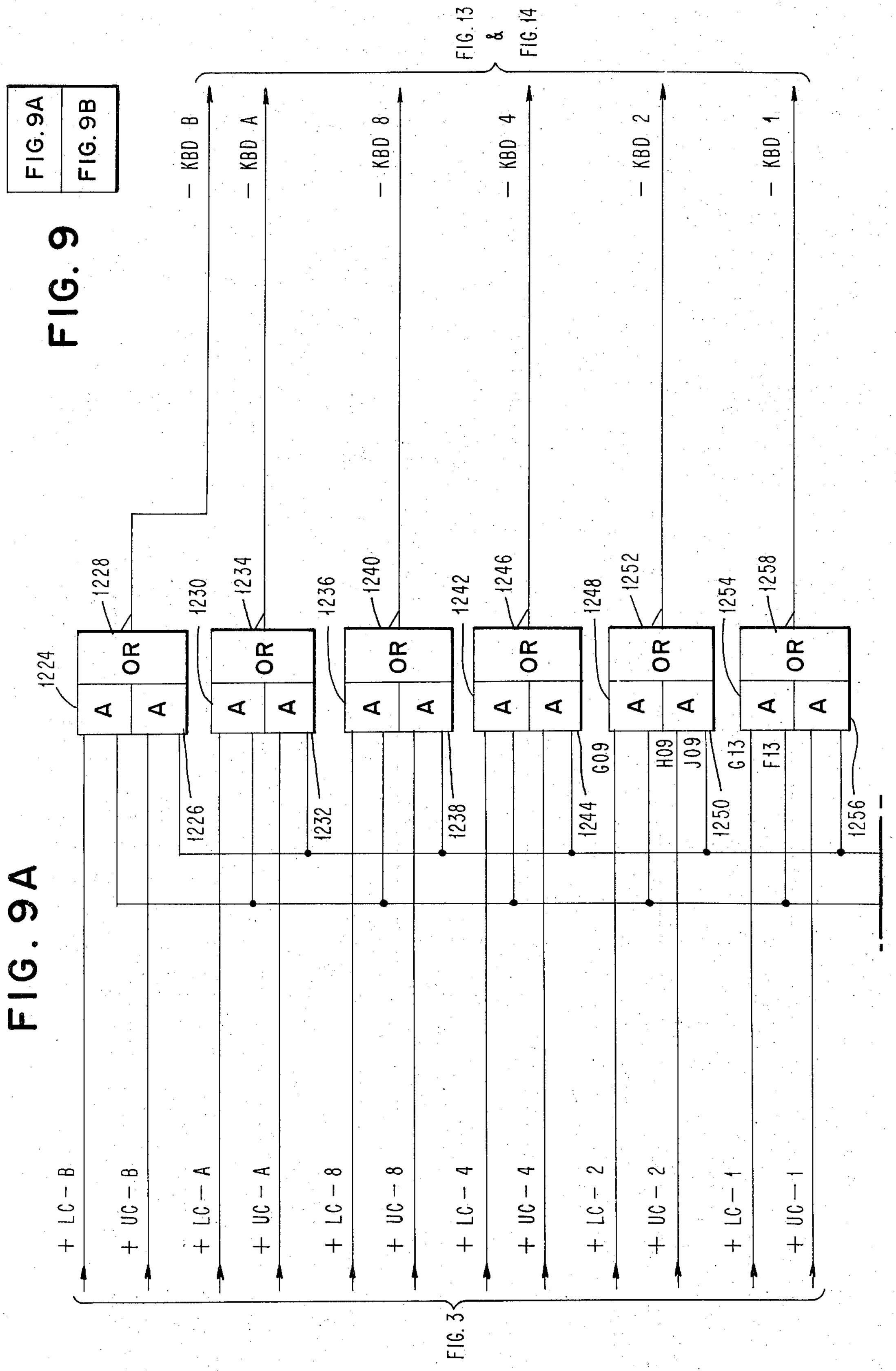
Figure 9B:
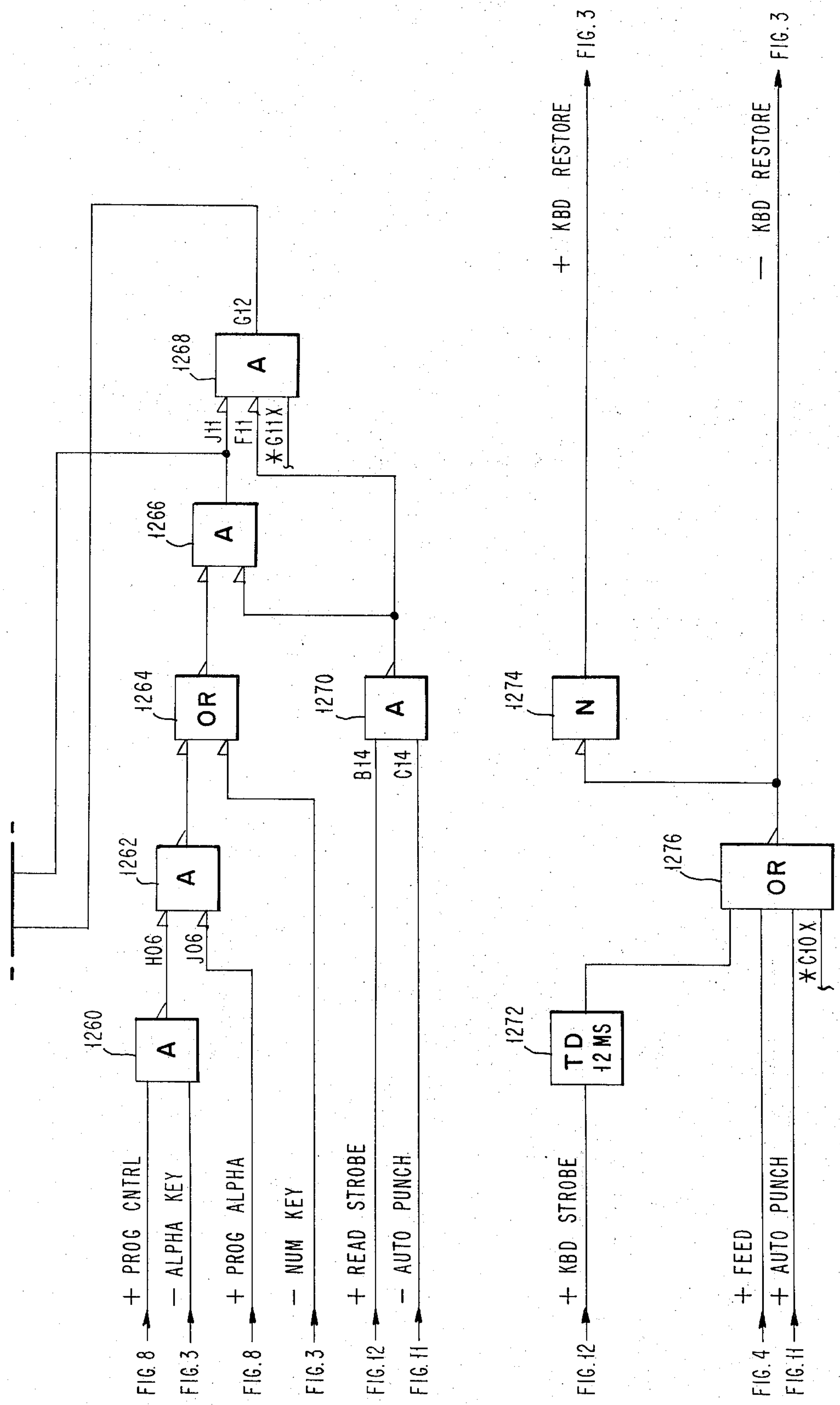

The keyboard control pneumatic logic of the keypunch controls is shown in FIG. 9 and includes AND circuits 1224 and 1226 having the input signals + LC-B and + UC-B applied to them, respectively; and circuits 1224 and 1226 are appended onto OR circuit 1228. A similar arrangement of AND and OR circuits (AND circuits 1230 and 1232 and OR circuit 1234) are provided for the lower level signals + LC-A and + UC-A as shown. For still lower level input signals of the same type, the following similar circuits are provided: AND circuits 1236 and 1238 and OR circuit 1240 for the input signals + LC-8 and + UC-8, AND circuits 1242 and 1244 and OR circuit 1246 for input signals + LC-4 and + UC-4, AND circuits 1248 and 1250 and OR circuit 1252 for input signals + LC-2 and + UC-2, and AND circuits 1254 and 1256 and OR circuit 1258 for input signals + LC-1 and + UC-1. AND circuits 1260 and 1262, OR circuit 1264 and AND circuits 1266 and 1268 are connected in series as shown and are controlled by the input signals + PROGRAM CONTROL and − ALPHA KEY. AND circuit 1270 has the input signals + READ STROBE and − AUTO PUNCH applied to it and drives AND circuits 1266 and 1268. Time delay circuit 1272 (which may have a delay of 12 milliseconds, for example) has the input signal + KEYBOARD STROBE applied to it and drives OR circuit 1276 and inverter circuit 1274.

Figure 10:
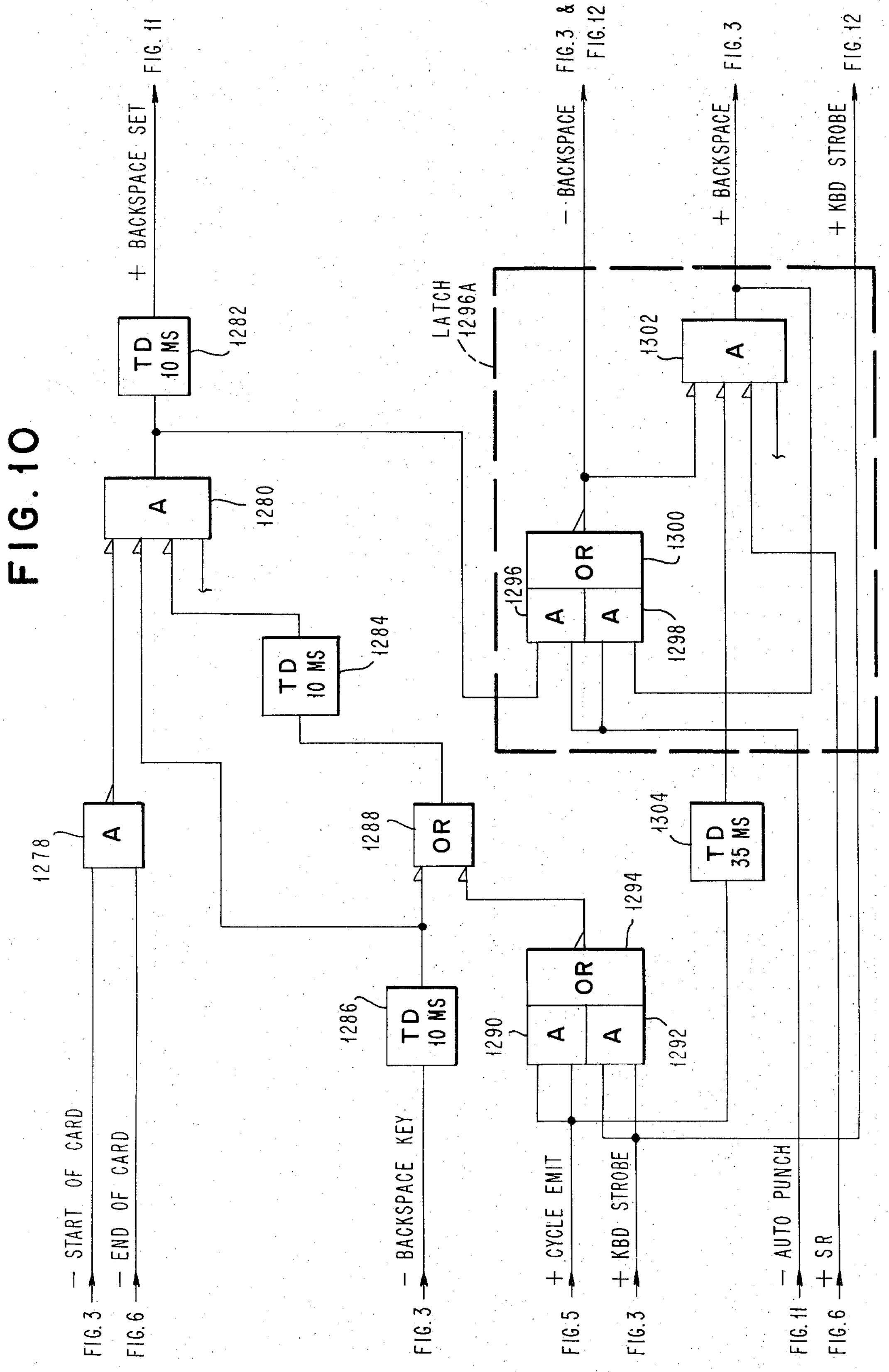

FIG. 10 discloses the pneumatic backspace logic of the keypunch controls. This logic includes AND circuits 1278 and 1280 driving time delay circuit 1282 which, for example, ay provide a time delay of 10 milliseconds. The AND circuit 1278 has the input signals − START OF CARD and − END OF CARD applied to it. Time delay circuit 1284 drives AND circuit 1280. Time delay circuit 1286 has the input signal − BACKSPACE KEY applied to it and may provide a time delay of 10 milliseconds. Circuit 1286 drives Or circuit 1288. AND circuits 1290 and 1292, respectively, have the input signals + CYCLE EMIT and + KEYBOARD STROBE applied to them, and these circuits are appended onto OR circuit 1294 which drives OR circuit 1288. AND circuits 1296 and 1298 have the input signal − AUTO PUNCH applied to them and are appended onto OR circuit 1300. AND circuit 1302 is driven from OR circuit 1300; and the circuits 1296, 1298, 1300, and 1302 together form a latch 1296A. A time delay circuit 1304 which may, for example, provide a time delay of 35 milliseconds, has the input signal + CYCLE EMIT applied to it and drives AND circuit 1302.

Figure 11A:
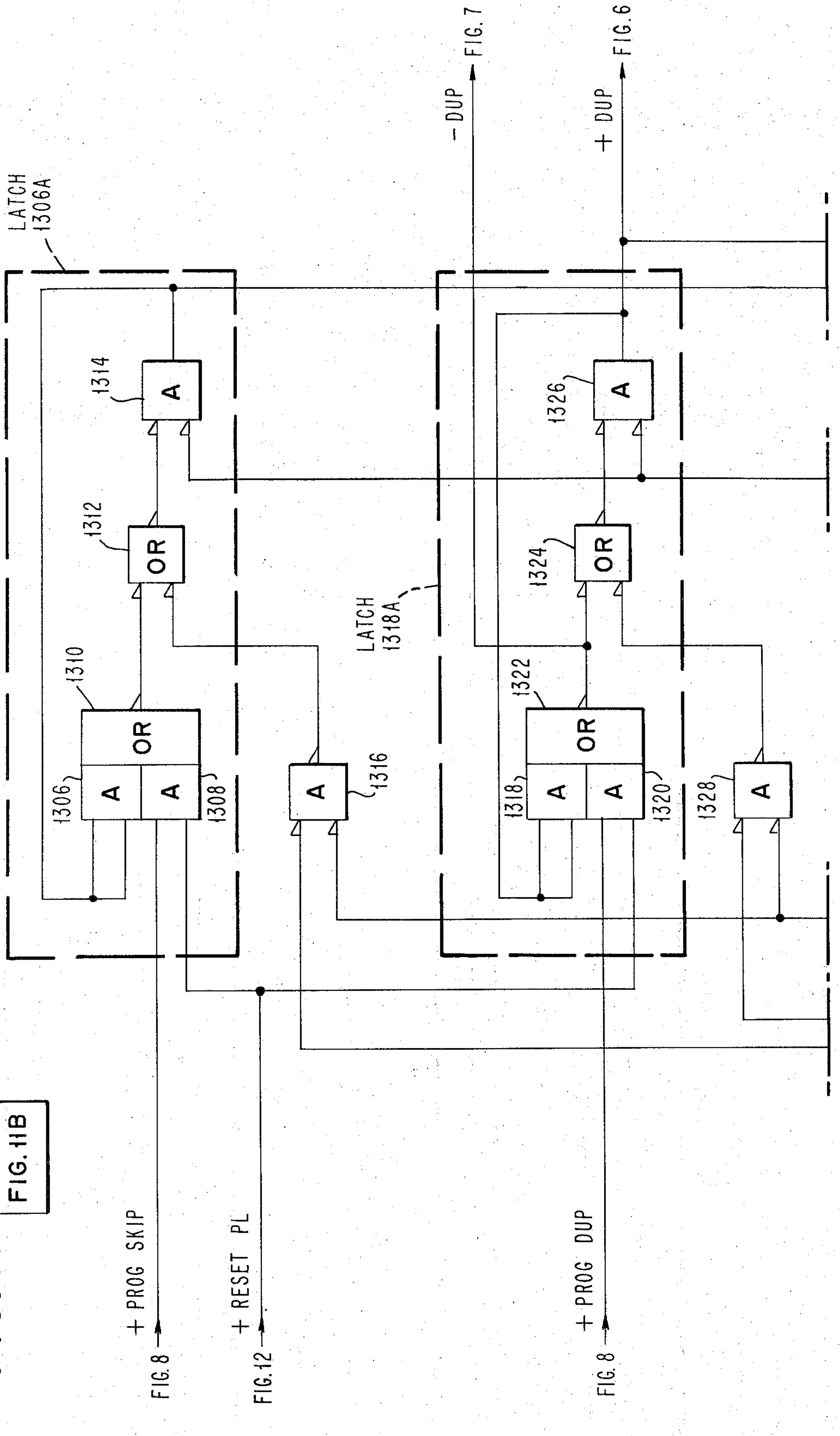
Figure 11:
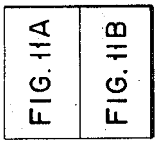
Figure 11B:
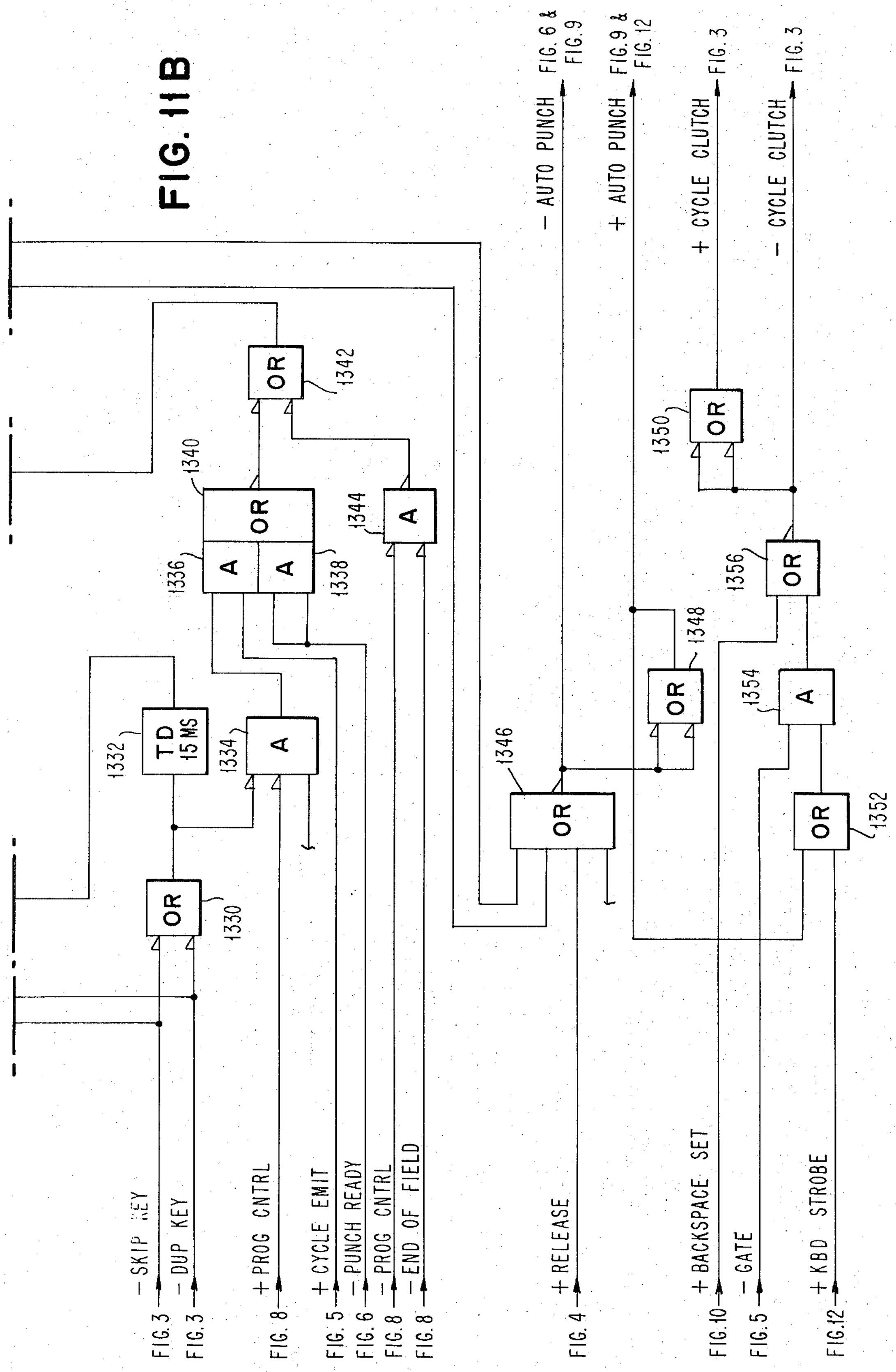

FIG. 11 discloses the clutch control portion of the pneumatic control logic for the machine. This includes AND circuits 1306 and 1308 applied onto OR circuit 1310 which, in turn, produces an output signal effective on OR circuit 1312. OR circuit 1312 provides an input to AND circuit 1314. AND circuit 1308 has the input signal + PROGRAM SKIP applied to it; and the circuits 1306, 1308, 1310, 1312 and 1314 together constitute a latch 1306A. AND circuit 1316, which has the input signal − SKIP KEY applied to it, provides an output signal that is effective as an input on OR circuit 1312. AND circuits 1318 and 1320, OR circuit 1322, OR circuit 1324, and AND circuit 1326 together provide the latch 1318A of the same type as the latch 1306A. AND circuit 1320 has the input signal + PROGRAM DUP applied to it. AND circuit 1328, which has the input signal − DUP KEY applied to it, has its output connected to OR circuit 1324. OR circuit 1330 has the inputs − SKIP and − DUP KEY and has its output connected to the time delay circuit 1332 which, for example, may provide a delay of 15 milliseconds. The output of OR circuit 1330 is also connected to provide an input to AND circuit 1334 which also has the input signal + PROGRAM CONTROL applied to it. AND circuit 1334 has its output applied to AND circuit 1336. AND circuit 1338 has the input signal − PUNCH READY applied to it, and the two AND circuits 1336 and 1338 are appended onto OR circuit 1340. The output of OR circuit 1340 is applied to OR circuit 1342. AND circuit 1344 has the input signals − PROGRAM CONTROL and − END OF FIELD applied to it and has its output applied to OR circuit 1342. OR circuit 1346 has the input signal + RELEASE applied to it and has its output connected to OR circuit 1348. OR circuit 1350 has the outputs of OR circuit 1352, AND circuit 1354 and OR circuit 1356 applied to it, and OR circuit 1352 has the input signal + KEYBOARD STROBE applied to it.

Figures 12, 12A:
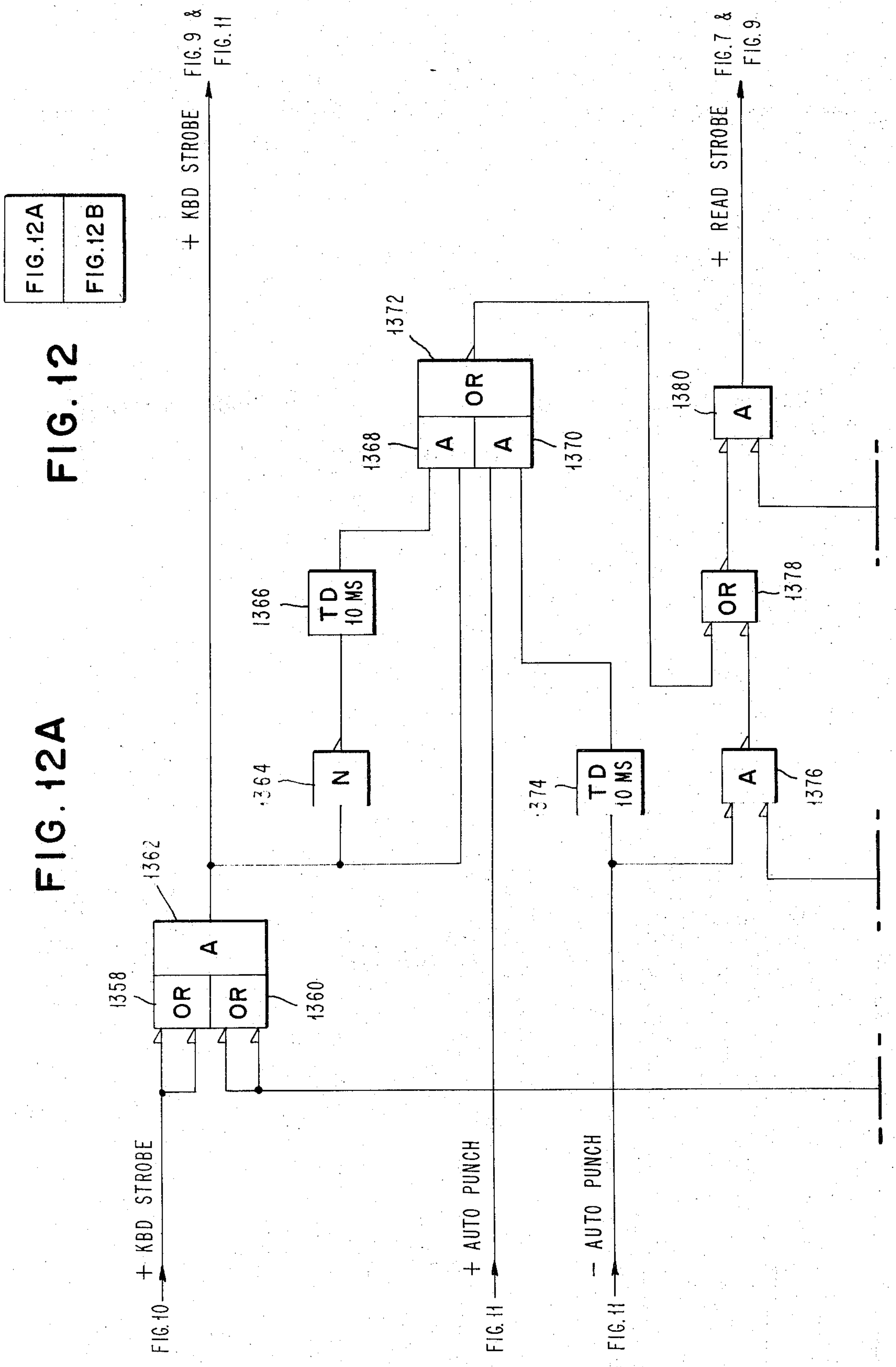
Figure 12B:
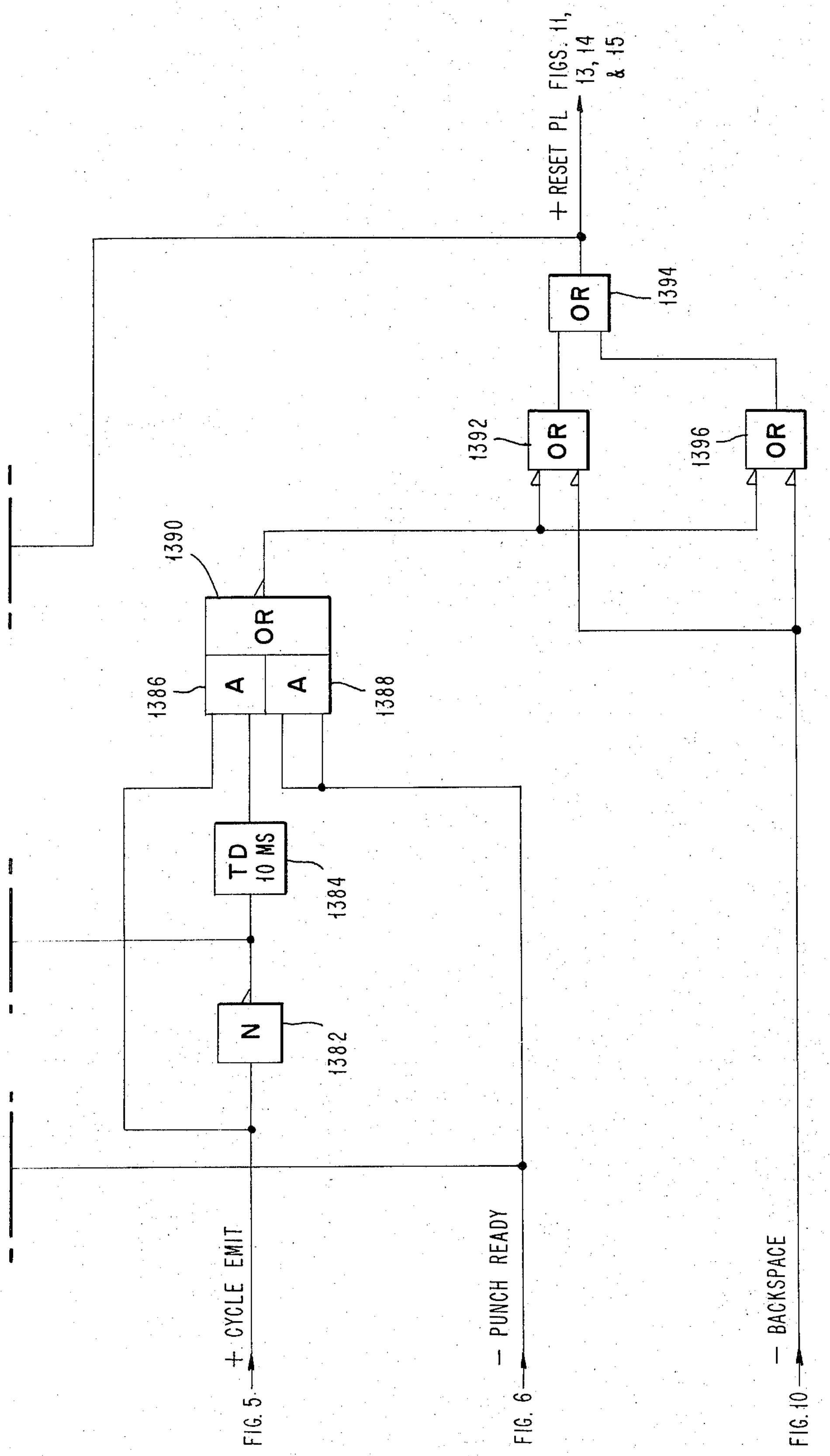

The punch timing portion of the pneumatic logic is shown in FIG. 12. This portion of the pneumatic logic includes OR circuits 1358 and 1360 appended onto ANd circuit 1362. OR circuits 1358 and 1360, respectively, have the input signals + KEYBOARD STROBE and − PUNCH READY applied to them. AND circuit 1362 provides an output signal which is applied onto inverter circuit 1364, and the output of circuit 1364 is applied to time delay circuit 1366. Circuit 1366 may, for example, provide a delay of 10 milliseconds. The output of delay circuit 1366 is applied onto AND circuit 1368 which, together with AND circuit 1370, is appended onto OR circuit 1372. AND circuit 1370 has the input signal + AUTO PUNCH applied to it. Time delay circuit 1374, having the signal − AUTO PUNCH applied to it, is connected to provide its output signal to AND circuit 1370. The signal − AUTO PUNCH is also applied onto AND circuit 1376 which, in turn, drives OR circuit 1378 and AND circuit 1380. Inverter circuit 1382, having the signal + CYCLE EMIT applied to it, has its output applied to time delay circuit 1384 which, for example, may provide a delay of 10 milliseconds. The output of delay circuit 1384 is applied onto AND circuit 1386 which, together with AND circuit 1388, is appended onto OR circuit 1390. AND circuit 1388 has the input signal − PUNCH READY applied to it. The output or OR circuit 1390 is applied onto OR circuit 1392, and the output of OR circuit 1392 is applied onto OR circuit 1394. OR circuit 1396, having the input signal −BACKSPACE, has its output applied onto OR circuit 1394.

Figures 13, 13A:
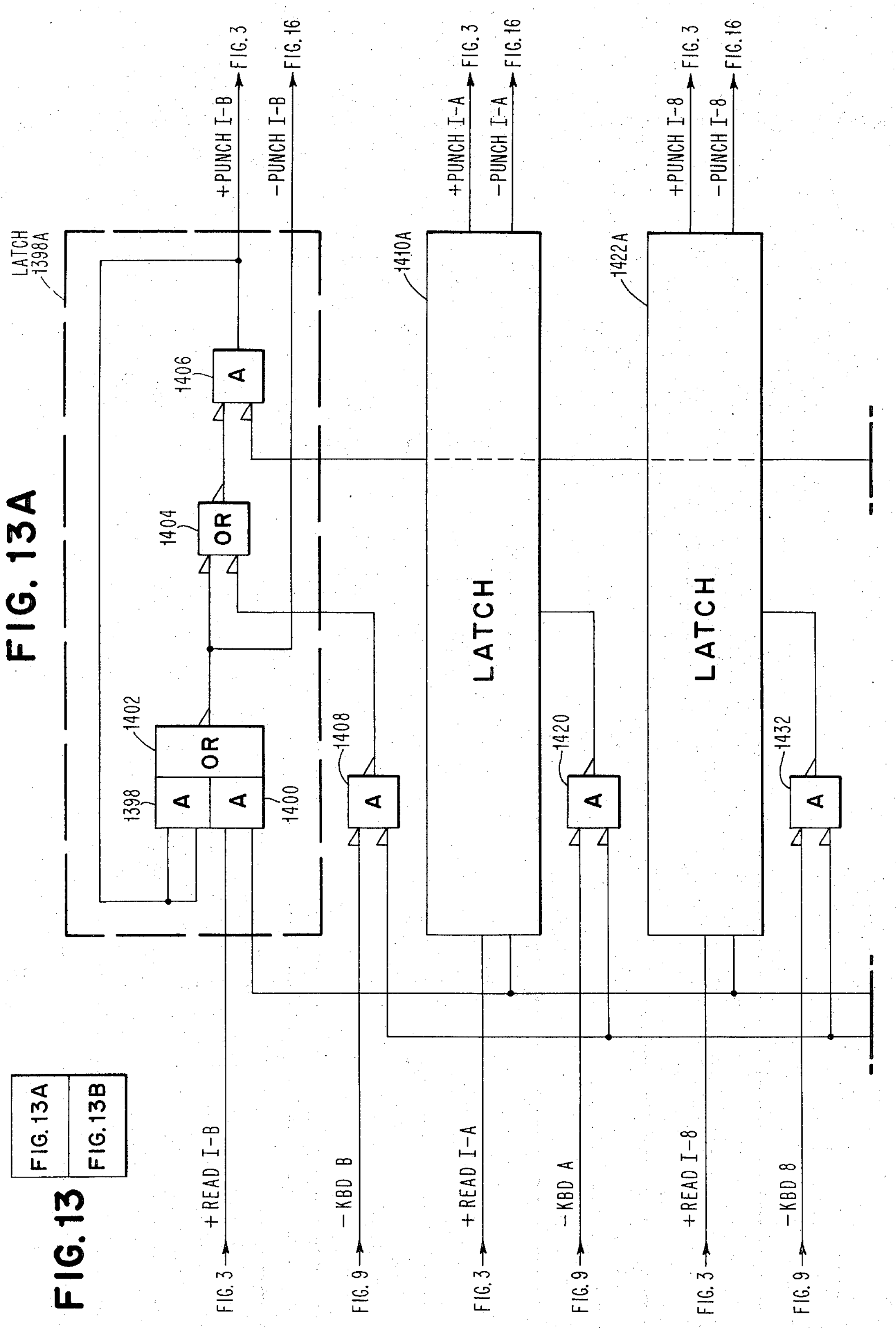
Figure 13B:
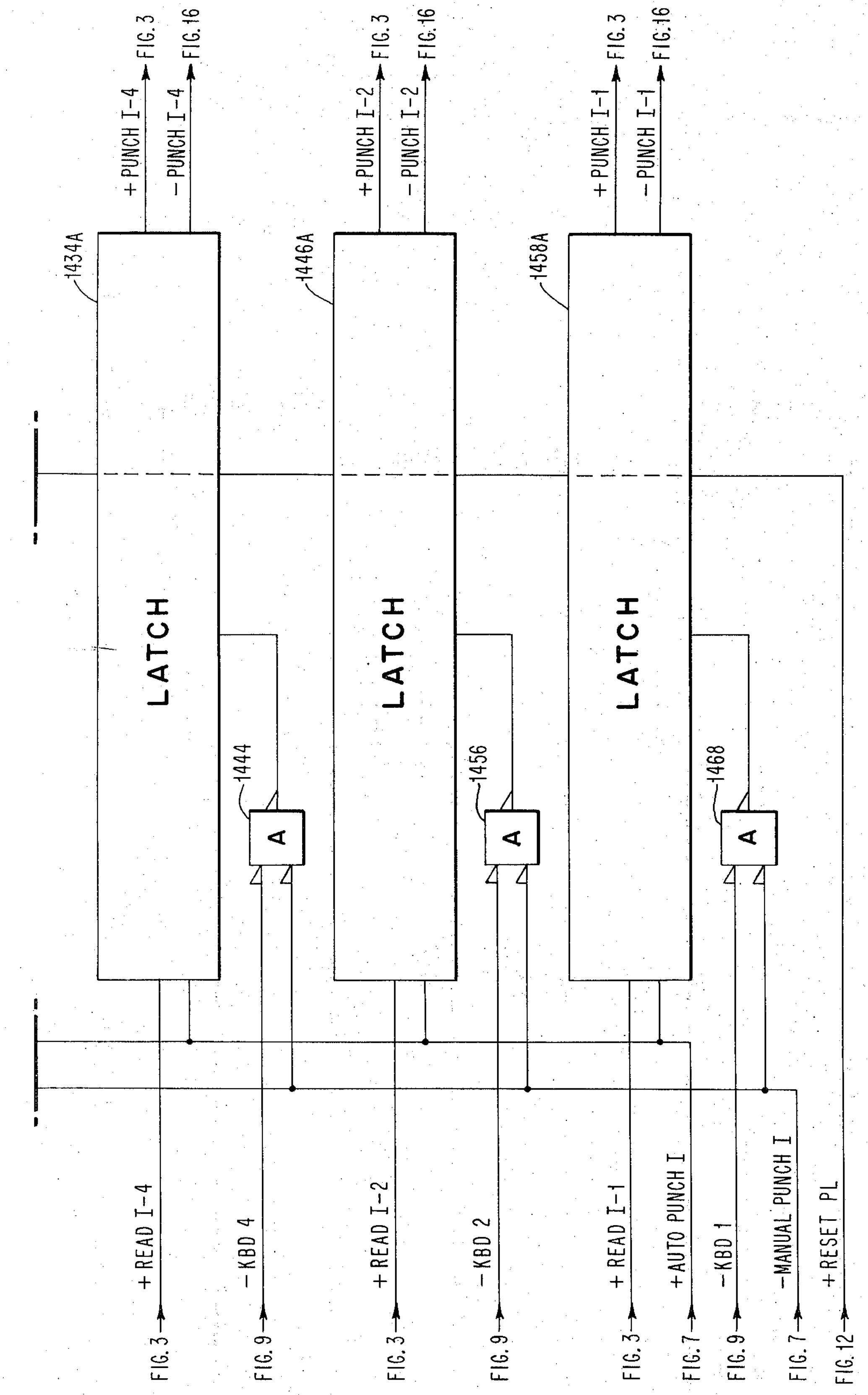

The punch latch (tier 1) pneumatic logic is shown in FIG. 13. The logic includes AND circuits 1398 and 1400 applied onto OR circuit 1402, and the AND circuit 1400 has the + READ I-B input signal applied to it. The output of OR circuit 1402 is applied onto OR circuit 1404 which in turn has its output applied onto AND circuit 1406. The circuits 1398, 1400, 1402, 1404 and 1406 together form a latch 1398A. An AND circuit 1408 has the input signal − KEYBOARD B applied to it, and the output of AND circuit 1408 is applied onto OR circuti 1404. Latches 1410A, 1422A, 1434A, 1446A and 1458A, which are identical with the latch 1398A, are provided in this circuitry; and AND circuits 1420, 1432, 1444, 1456 and 1468 are provided in connection with the latches 1410A, 1422A, 1434A, 1446A, and 1458A, respectively, The connections of the AND circuits 1420, 1432, 1444, 1456 and 1468 with respect to their respective latches are basically the same as the connections between AND circuit 1408 and its respective latch 1398A.

Figures 14, 14A:
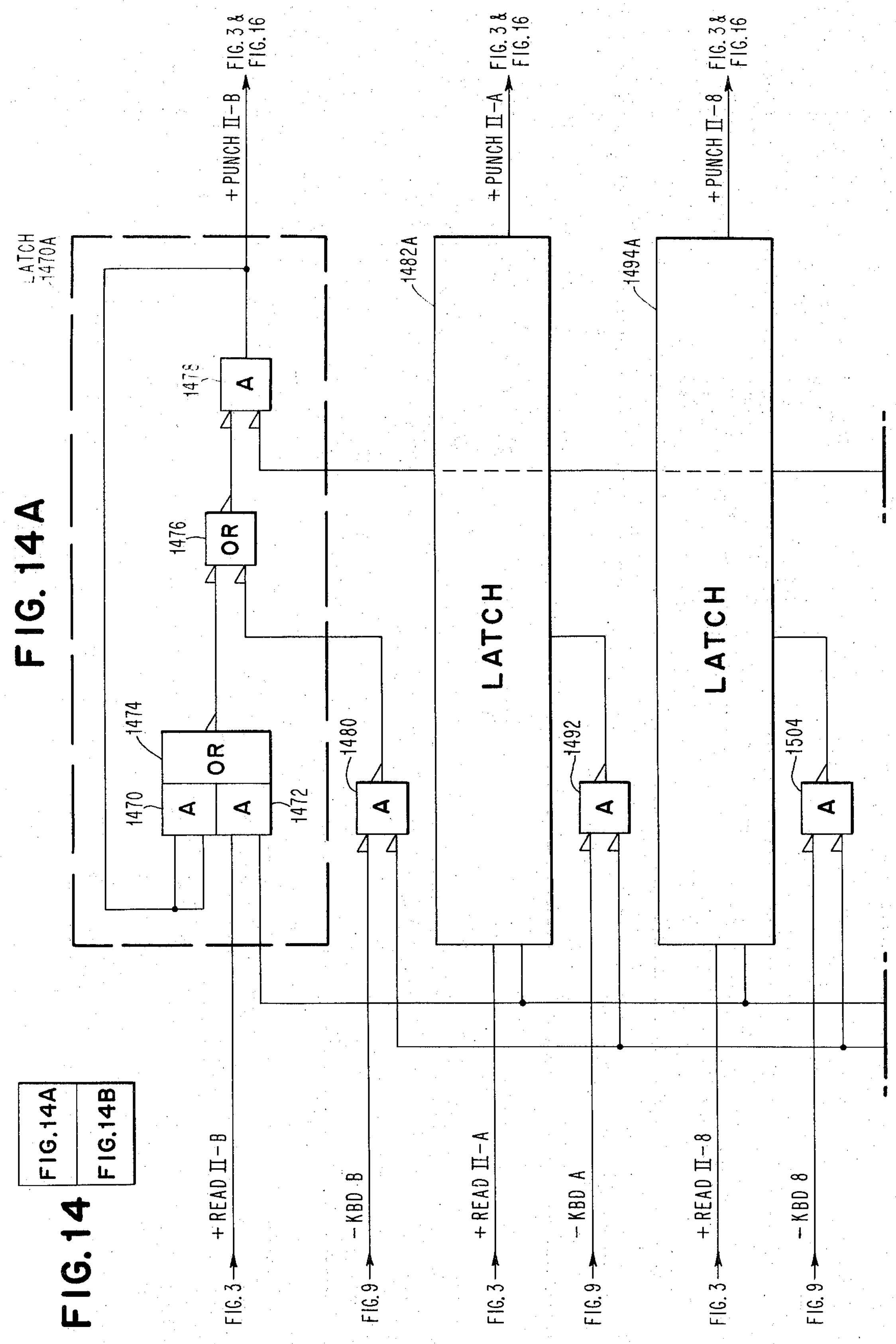
Figure 14B:
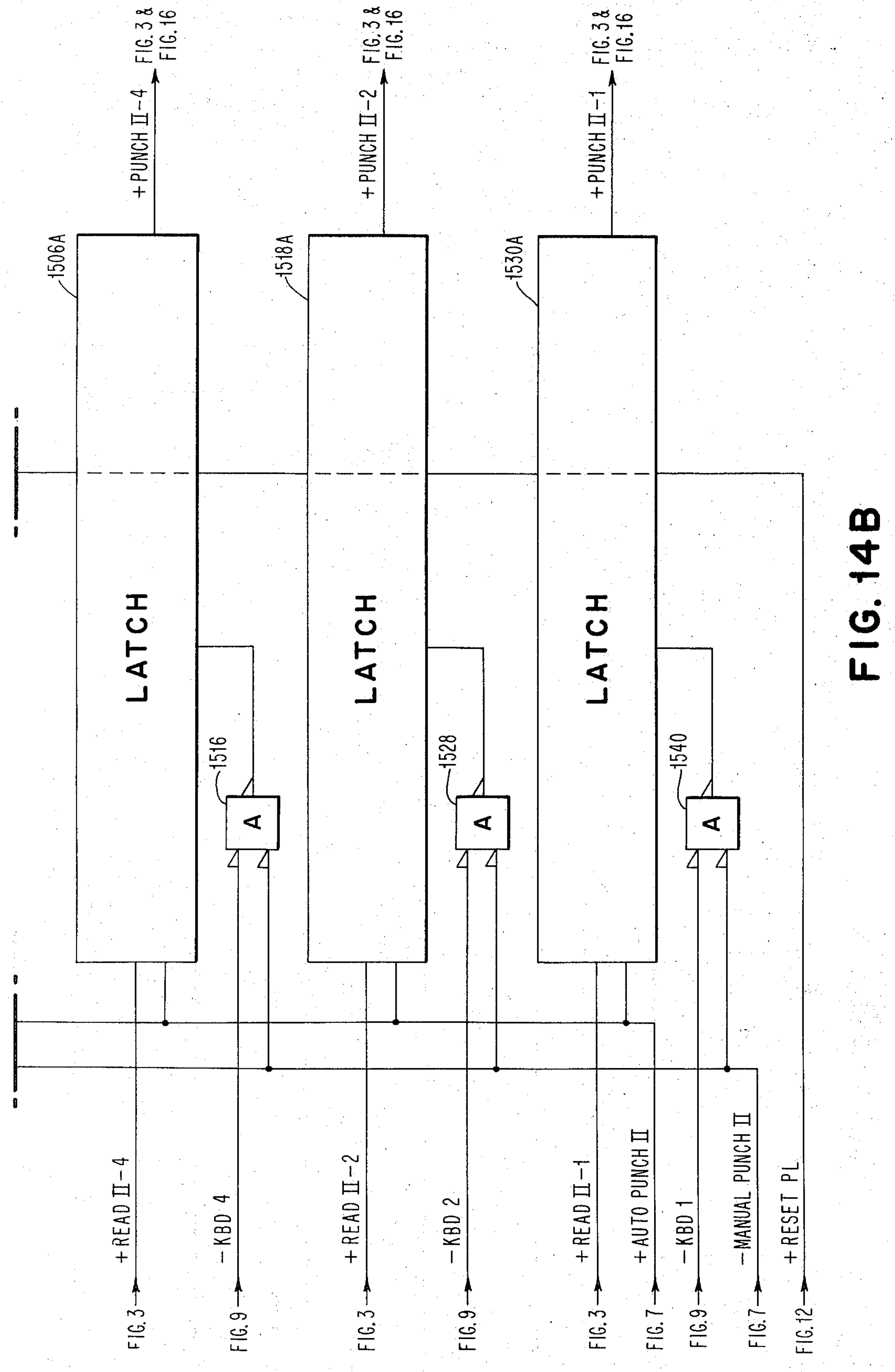

The punch latch pneumatic circuitry for tier 2 is shown in FIG. 14, and this is quite similar to the tier 1 punch latch circuitry, except that, of course, different input signals are applied, and the circuitry produces different output signals. The circuitry of FIG. 14 includes AND circuits 1470 and 1472 appended onto OR circuit 1474. OR circuit 1474 in turn drives OR circuit 1476 which in turn drives AND circuit 1478. The AND circuit 1472 has the + READ II-B input signal applied to it; and the circuits 1470, 1472, 1474, 1476 and 1478 together form a latch 1470A. An AND circuit 1480 having the − KEYBOARD B input signal applied to it has its output applied to the OR circuit 1476. Latches 1482A, 1494A, 1506A, 1518A and 1530A are provided that correspond with the latch 1470A; and AND circuits 1492, 1504, 1516, 1528 and 1540 are provided, respectively, for these latches.

Figures 15, 15A:
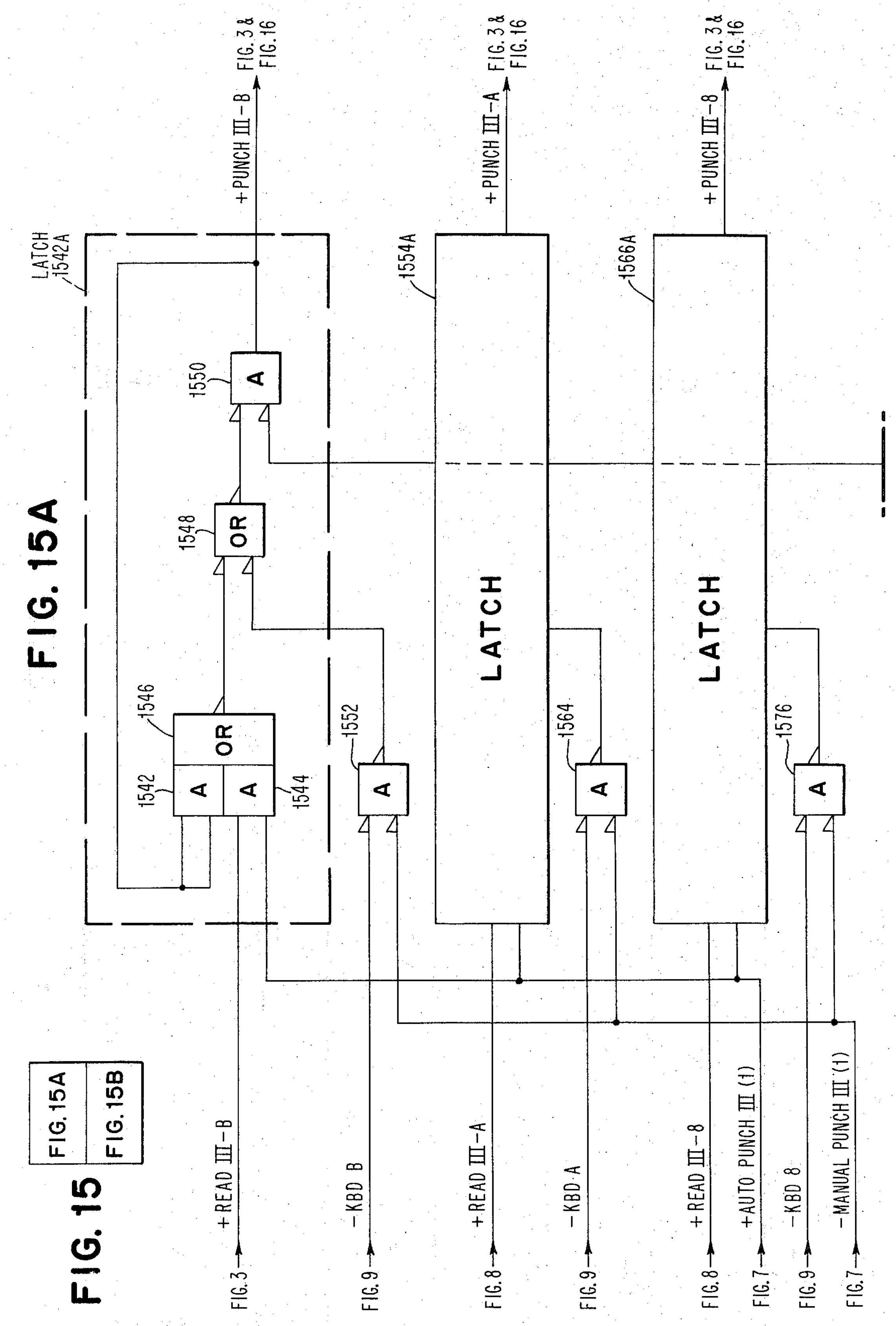
Figure 15B:
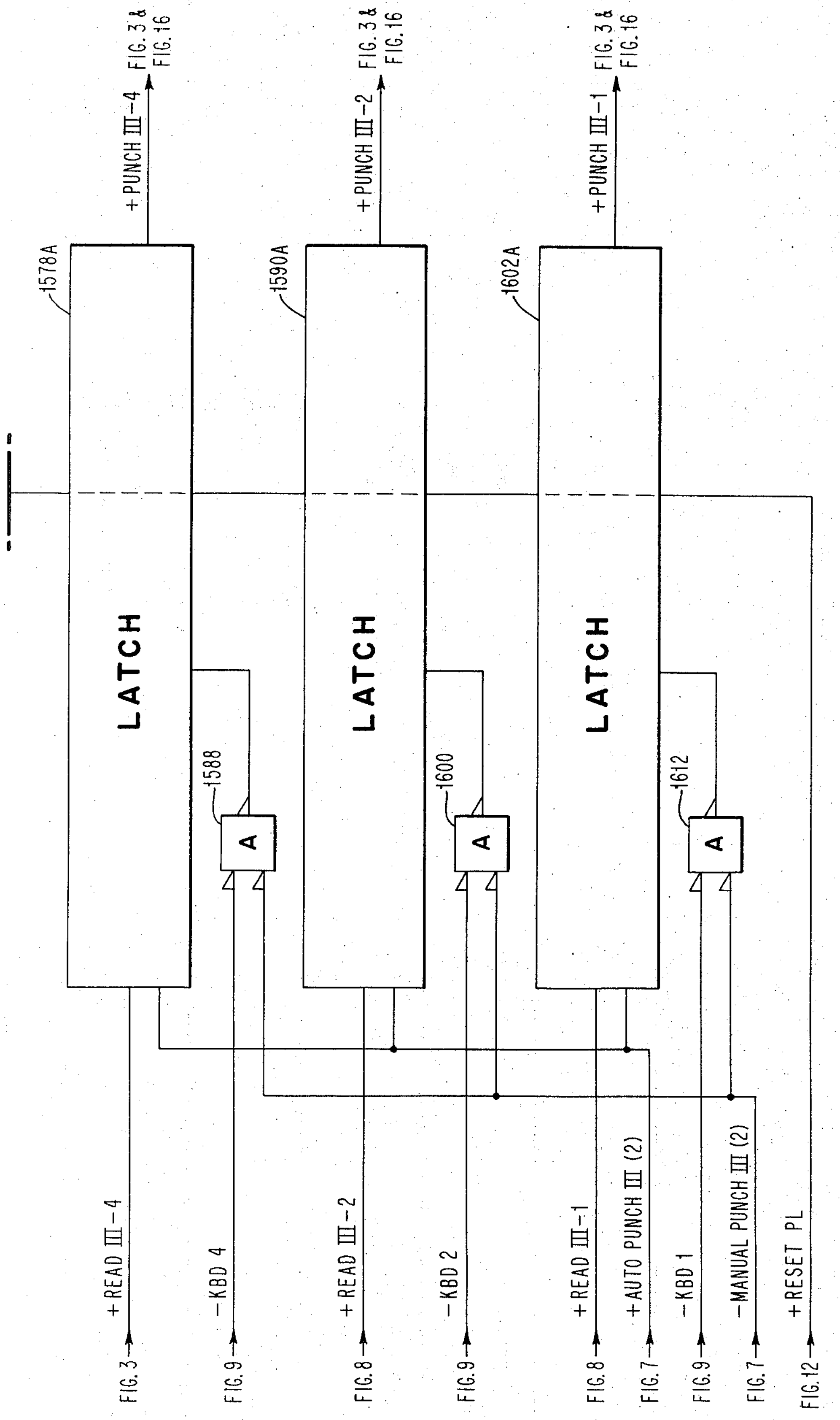

The pneumatic punch latch logic for tier 3 is shown in FIG. 15 and is quite similar to the logic for tiers 1 and 2 shown in FIGS. 13 and 14. The logic of FIG. 15 includes AND circuits 1542 and 1544 applied to OR circuit 1546, and the output of OR circuit 1546 is directed to OR circuit 1548. The output of OR circuit 1548 is applied to AND circuit 1550, and the circuits 1542, 1544, 1546, 1548 and 1550 together constitute a latch 1542A. An AND circuit 1552 has its output applied as an input to OR circuit 1548. Latches 1554A, 1566A, 1578A, 1590A and 1602A are provided that correspond with the latch 1542A; and corresponding AND circuits 1564, 1576, 1588, 1600 and 1612 are provided for these latches.

Figure 16:
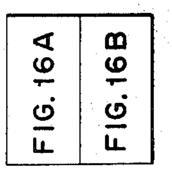
Figure 16A:
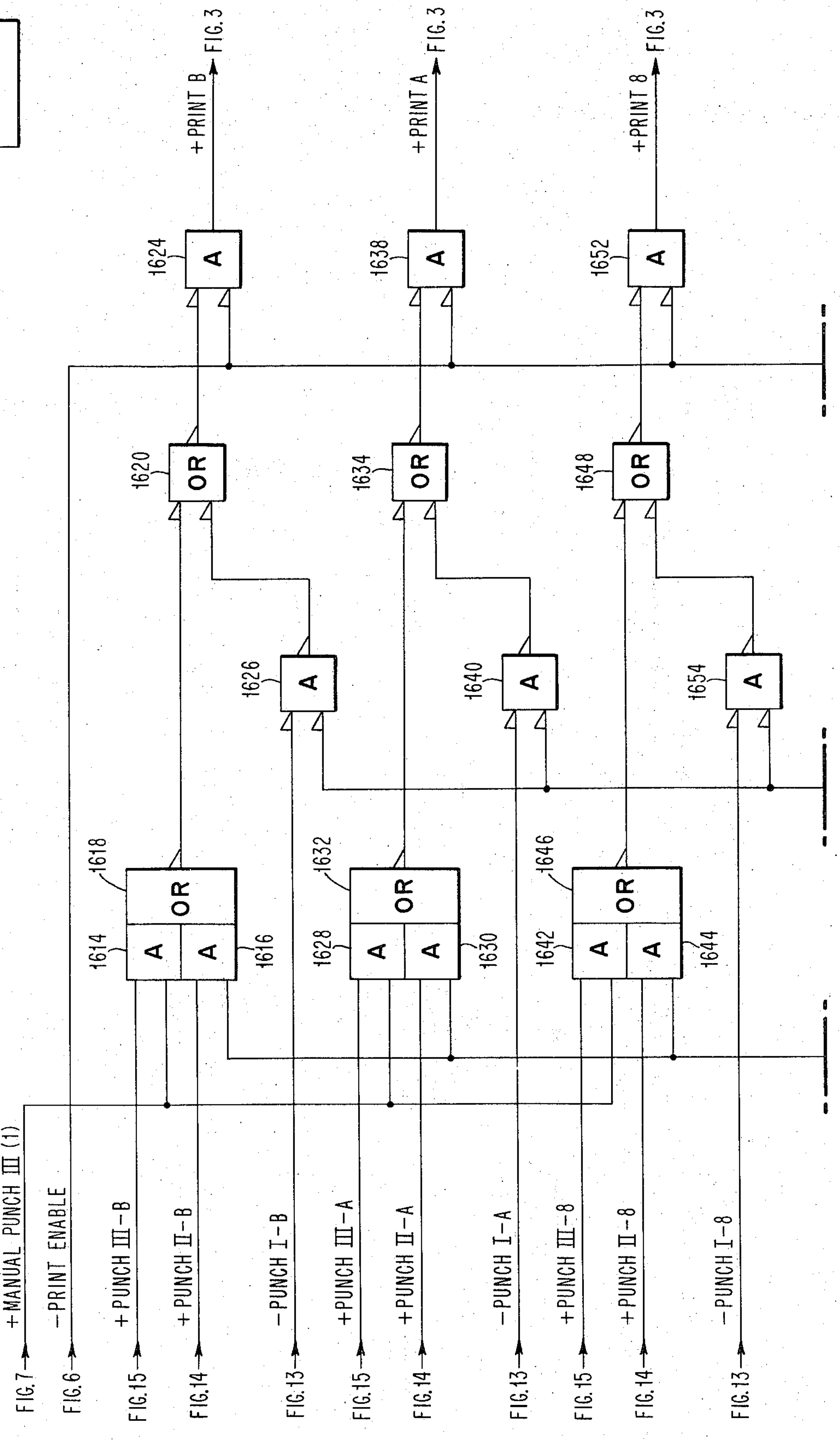
Figure 16B:
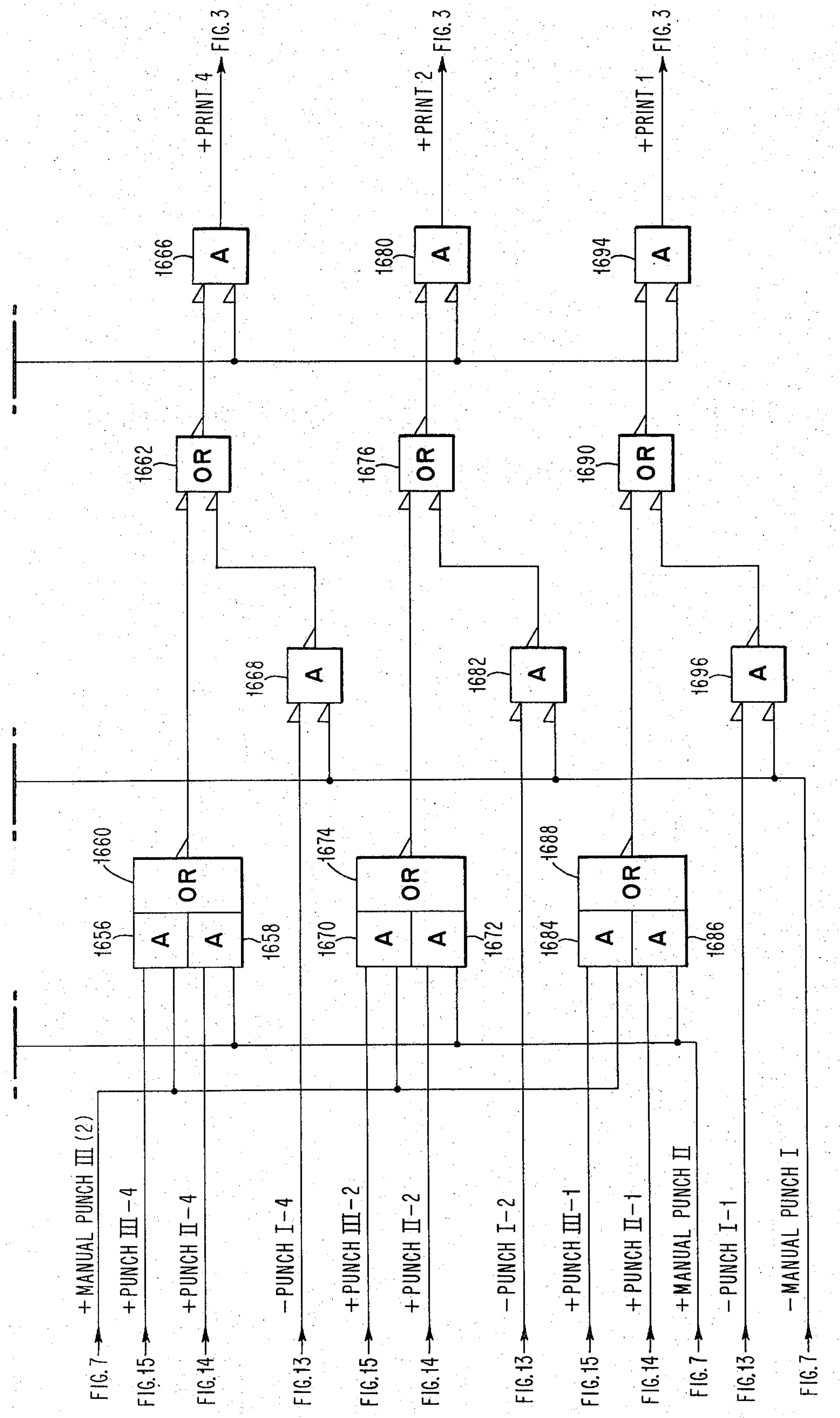

The pneumatic print portion of the control logic for the machine is shown in FIG. 16. This logic includes AND circuit 1614 having the + MANUAL PUNCH III (1) and + PUNCH III-B input signals applied to it and an AND circuit 1616 having the + PUNCH II-B and + MANUAL PUNCH II input signals applied to it. The AND circuit 1614 and 1616 are appended onto OR circuit 1618, and the output of OR circuit 1618 is applied onto to OR circuit 1620. OR circuit 1620 applies its output onto AND circuit 1624. AND circuit 1626 has the input signal − PUNCH I-B applied thereto and has its output connected as an input to OR circuit 1620. AND circuits 1614 and 1616, OR circuit 1618, OR circuit 1620, AND circuit 1624, and AND circuit 1626 as a group provide the output signal + PRINT B as will be observed. A similar group of circuits, including AND circuits 1628 and 1630, OR circuit 1632, OR circuit 1634, AND circuit 1638 and AND circuit 1640 provide a similar print signal as an output signal but of a different stature, namely, + PRINT A signal. Other similar groups of circuits provide the + PRINT 8 signal, the + PRINT 4 signal, the + PRINT 2 signal and the + PRINT 1 signal. As will be observed, the circuits for providing the PRINT 8 signal are the circuits 1642, 1644, 1646, 1648, 1652 and 1654; the circuits for providing the PRINT 4 signal are the circuits 1656, 1658, 1660, 1662, 1666 and 1668; the circuits for providing the PRINT 2 signal are the circuits 1670, 1672, 1674, 1676, 1680 and 1682; and the circuits for providing the PRINT 1 signal are the circuits 1684, 1686, 1688, 1690, 1694 and 1696.

When the machine is in operation, each card 100 is incrementally moved from right to left as the machine is illustrated in FIG. 2, such movement being by means of a series of feed rolls including the rolls 172, 174, 180, 182, 186, 188 and 194. As will be observed from FIG. 2, the bed 198 for the cards 100 is inclined to provide optimum visibility to the operator. Punch and printer output is directly visible as a card 100 leaves the punch station 114 and printer 116. Any misfeeds or jams are evident and can be readily corrected without special operations. Cards 100 may be added or removed at any time during the operation. The cards 100 are operated on a cycle at a time, providing immediate feedback to the operator.

The hopper 112 may hold 350 of the cards 100, for example. The cards are placed in the hopper face up, and the pick roll 168 is located just above the stack of cards 100 so as to be effective on the topmost card of the stack. The pick roll 168 is constantly turning and is moved down briefly under the action of the actuator 214 to move the uppermost card in the stock between the baldes 216 and 218 so that the feed rolls 172 and 174 are then effective on the card. Cards 100 can be inserted on top of the deck of cards in the hopper 112 so that they feed first; and cards 100 can also be removed, or the whole stack of cards can be pushed down against the spring balanced plate 200 to prevent feeding.

The gate 184 registers a card 100 in the transport by moving upwardly under the action of the actuator 246 so that the card 100 is stopped by the gate 184 in free flight from the feed rolls 172 and 174. An imaginary column zero of the card 100 is then in alignment with the punches 256. The card pusher or cam 220 drops down on the rear edge of the card 100 and cams the card forwardly to hold it in place against the gate 184 under the action of the spring 224. The trailing edge of the card 100 has cleared the sensor 176 at this time, and the sensor 176 gives the signal to the logic to clamp the card between the rolls 180 and 182 and lowers the gate 184.

Once the incrementer pressure roll 182 has been lowered onto a card 100 registered in the punch station 114, the keyboard 126 is released for key entry. Card column No. zero is at this time in alignment with the punches 256. During the first portion of a punch cycle, the card 100 is incremented one column to the left by the incrementer rolls 180 and 182, while the punch unit and printer 116 are being set up. During the second portion of the punch cycle, punching and printing take place (in Col. 1 position of the card 100). Punches 256 can punch all three tiers of the card 100 in the punch station 114 with six bit code punches in each, but usually only the top or variable data tier (tier 1) is punched with an average of two punches to encode a character that is keyed on the keyboard 126. The printer 116 prints the same character at the top edge of the card 100. Any characters punched in the dup tier (tier 2) by the punches 256 automatically from the previous card 100 are not interpreted or printed, since this may have been done when the data was first entered from the keyboard 126. It is possible to interpret or print the punched information on the previous card, when it is desired, by turning the entry mode switch 162 to the dup tier (tier 2) and duping these columns manually onto a blank card 100. As will hereinafter appear, an entire previous card in the read station 118 may be duplicated by pressing the DUP key 140; and the information in all three tiers, tiers 1, 2 and 3, will automatically be duplicated in a card 100 in the punch station. Any information printed by the printer 116 on the top edge of the card 100 in the punch station 114 is determined by the position of the print switch 152 and by the position of the entry mode control switch 162 (in its first, second or third tier position).

A number of related functions take place substantially on the same center line of the card 100 at the punch station 114. The first incrementer roll 180 and its pressure roll 182 grip a card 100 just below and slightly forwardly of the print head 304 located on the same center line as the punches 256. When the cards 100 are punched, the corresponding pistons 270 for the interposers 260 are actuated under air pressure so as to move the interposers into alignment with the bail 272 to cause the corresponding punches 256 to move upwardly and punch holes through the card 100. The punch assembly is driven by the shaft 276 which causes the bail 272 to reciprocate. Each of the interposers 260 is held over the bail 272 by the corresponding piston 270 long enough to ensure that the full motion upwardly of the bail 272 is transmitted to provide a full stroke of the corresponding punch 256. During the return stroke that returns all punches, the pressure is allowed to bleed out from behind the pistons 270 that have been actuated by air pressure to provide the punching action, and the magnets 262 and 264 pull the interposers 260 out of the path of the bail 272 until the next stroke of the bail.

When a card 100 is in the punch station 114, it is at the same time under the print head 304; and, during increments of the card 100 through this station, the printer 116 is operative to print characters on the print line 110. The printer 116 is operative by actuating the proper wires 302 so that they project through the head 304 to provide the proper printed character on the card 100 in a position in alignment with the column of the card 100 that is, at the same time, being punched. In this action, the guide plate 310 for the wires 302 is stationary; and the code plate 312, which has the proper projections for axially moving the wires 302 as just mentioned, is reciprocated on an axis normal to the plane of the plate 312 for this printing action. The plate 312 is moved both vertically and horizontally by the pistons 320, 322, and 324 of the actuators 316 and 318 so that the proper character is printed by the wires 302.

The read station 118 is located 39 columns to the left or downstream of the punch station 114; and, at the beginning of a card cycle, column No. 1 of a card 100 is under the ports 284 of the read station 118. The second incrementer rolls 186 and 188 have taken over control of the card 100 from the first incrementer rolls 180 and 182, and there is enough space between the trailing edge of a preceding card 100 passing through the read station 118 and a following card registered in the punch station 114 so that the gate 184 may be inserted therebetween due to the action of the actuator 246. The holes 108 in a card 100 in the read station 118 allow air pressure to be applied to the corresponding output ports 286 so as to provide a pneumatic reading action with respect to the card. The second incrementer rolls 186 and 188 maintain control of the card 100 passing through the read station 118 until column 32 of this card has passed the ports 284 and 286.

Cards 100 which have completed their travel in the card transport (the path of card movement between the hopper 112 and the stacker 120) are stacked on end in their original sequence in the stacker 120. As soon as a card column No. 32 moves from under the read station 118 (from out of alignment with ports 284 and 286), the leading edge of the card 100 is gripped between the stacker roll 194, which is constantly turning, and the shoe 192; and the trailing edge of the card 100 is released by the incrementer rolls 186 and 188. The card is thus snatched by the roll 194 and shoe 192 and is forced down behind the last card in the stacker 120 before the card is released. The stacker-full switch 294 interrupts further card feed cycles after approximately 350 of the cards 100 have been stacked.

The machine moves the cards 100 through the punch station 114 and read station 118 a column at a time unless the program calls for a dup or a skip operation. During a manual dup operation (with key 140 being depressed), it is still possible to stop the duping operation at any column by releasing the key 140 at the correct time.

The incrementer rolls 180 and 186 are driven in unison by any suitable incrementing mechanism 382. The punch shaft 276 and the rolls 172 and 194 are driven in unison with the incrementer wheels 180 and 186 but in continuous rotation and with any suitable driving mechanism.

The pneumatic logic controlling the machine operates with the format of card 100 illustrated in FIG. 1 to provide 32 columns of data entry (punching) in tier 1 directly from the keyboard 126, with printing interpretation on the print line 110. The other tiers, tiers 2 and 3, of card 100 are used to store, by automatic duplication, 32 columns of dup data in the middle tier (tier 2, columns 33–64) and two levels of program code in the third tier on the bottom of the card (columns 65–96). Prior to entering data into the card from the keyboard 126, the entry mode selector switch 162 must be turned to the desired tier, tier 1, tier 2 or tier 3. When setting up a job, the program or programs are normally entered into tier 3 of the first card 100, and then the dup data is entered into tier 2 of the second card 100. The variable data is then entered from the keyboard 126 into the top tier of the third card 100, and the other two tiers are duped automatically into the third card 100 column by column. This duping always occurs. The program codes control the fields of the first tier of the third card 100 when the program switch 160 is turned on. In particular, the program codes will provide the ability to skip over a certain fluid or to duplicate a certain field from the previous card or to enable the operator to enter lower case data into a certain field whereas it would have been uppercase data otherwise. A field is defined from one end of field program code series of punches to the next end of the field program code series of punches.

Any of the six bit alphanumeric card code characters are available from the keyboard 126. Each character punched in columns 1 to 32 may be printed on the print line 110 simultaneously with each key stroke, or characters may be duped under program control into tier 1 of the card that is being punched from a card 100 in the read station. The program codes in the third tier of each card and the data entered in the dup tier (tier 2) can also be printed as they are keyed on the leader cards (cards 1 and 2). Multiple passes of the same card 100 (by hand reinsertion) will permit more than 32 columns of variable data to be punched in the three tiers of a card 100 but only that data from one tier can be printed.

The keyboard, as above mentioned, has the alpha key 134 and numeric key 136, and these respectively provide lower and upper shifts which can be selected either manually using the keys 134 and 136 or by program control. The shift keys 134 and 136 override any program shift control punched in the card 100.

The program tier (tier three) of a card 100 is used for entering program codes in the pneumatic logic for program level 1 or program level 2 depending on the position of the program selector switch 156. The entry mode selector switch 162 must be set to its tier 3 position, and the codes are entered by keying the equivalent character key on the keyboard 126 as shown by the following table:

card in the read station. When the program switch 160 is in its ON position, a single depression of the dup key 140 causes this duplication to be on a field basis. The depression of the dup key 140 thus causes duplication from one end of field to the next end of field as defined in the above table and as punched in the preceding card 100. With the program switch 160 in its OFF position, this duplication on depression of the dup key 140 occurs on a column by column basis, as long as the dup key 140 is depressed. This manual duping operation can be used on whatever tier in the card in the punch station 114 has been selected by the entry mode selector switch 162. Any column, or the whole tier of a card 100 in the punch station 114, can thus be duped. Whatever is manually duped by the depression of the dup key 140 is being printed by the printer just as it were being entered from the keyboard 126. This feature makes it possible to interpret by printing all of the data that is punched into a card 100 by printing it on one or more blank cards 100. Tier 3 data, which is not in the program codes as is indicated by the above table, will be printed as normal characters if the program switch 160 is turned OFF.

Any data can be erased or corrected in a new card 100 by either skipping, spacing, or keying in new data with the program switch 160 and the auto skip/dup switch 158 being OFF. In order to preserve the data in the tiers of the cards in the read station 118 other than the tier designated by the entry mode selector switch 162, the pneumatic logic automatically dups the data in these tiers, column by column from card to card.

The manual dup key 140 can be used to interpret by printing the program code punches in tier 3 of a card in the read station 118 by moving the program selector switch 156 to the program level in question, and the switch 162 must be in its tier 3 position. The program codes are printed as a three bit code character as shown in the above table.

The feed key 144 is used to cause the feeding of a

PROGRAM CODES

| | CARD CODE | END OF FIELD | SKIP | DUP | ALPHA SHIFT | EOF & SKIP | EOF & DUP | EOF & ALPHA SHIFT |
|---|---|---|---|---|---|---|---|---|
| PROG 1 | B | 0 | | | | 0 | 0 | 0 |
| | A | | 0 | | 0 | 0 | | 0 |
| | 8 | | | 0 | 0 | | 0 | 0 |
| PROG 2 | 4 | 0 | | | | 0 | 0 | 0 |
| | 2 | | 0 | | 0 | 0 | | 0 |
| | 1 | | | 0 | 0 | | 0 | 0 |
| PROG 1 PRINTS AS: | | — | ¢ | 8 | Y | } | Q | H |
| PROG 2 PRINTS AS: | | 4 | 2 | 1 | 3 | 6 | 5 | 7 |
| KEY IN EITHER PROG LEVEL AS: | | M | S | 9 | , (comma) | F | ) | \| |

As previously mentioned, the machine has seven function keys on the keyboard 126; and these are the alpha key 134, the numeric key 136, the backspace key 138, the dup key 140, the release key 142, the feed key 144 and the skip key 146. These keys function as follows:

When the dup key 140 is depressed, it initiates duplication from the previous card 100 that is in the read station 118 into the card 100 that is then in the punch station 114, the latter card being punched to have the same punchings therethrough in all three tiers as the card 100 from the hopper 112 into the card transport, toward the stacker 120, if no cards 100 are then in the punch station 114. The card 100 is registered at the punch station 114 by the gate 184 in readiness to be punched with data that is keyed on the keyboard 126 in column 1. If a card 100 is already in the punch station 114, this condition is sensed by the sensor 176, and the feed key 144 becomes inoperative.

If a card 100 fails to feed from the hopper 112 when the feed key 144 is depressed, each successive depression of the key 144 causes the hopper feed roll 168 to drop onto the card 100 at the top of the stack in the hopper 112 for a fraction of a second in an attempt to feed the top-most card 100 between the blades 216 and 218. If there is a card at the read station 118, this card does not move until a card 100 has been properly registered in the punch station 114.

A single depression of the release key 142 causes cards 100 in the transport to advance to the next station (i.e., a card 100 at the punch station 114 will advance to the read station 118, and a card at the read station 118 will advance to the stacker 120). To prevent a release cycle from occurring while another cycle is in progress, the release key 142 is interlocked until the clutch 340 latches up. During a release operation, the data in tiers 2 and 3 of a card 100 in the read station 118 are always duplicated by punching into a card 100 in the punch station. If the machine is under program control, with the switch 160 being on; and, if the release operation as just described encounters an auto dup field in tier 1 the auto dup field is punched. Thus, when a card 100 is released because of a keying error, the common information is not lost.

The release key 142 is also used to restore the keyboard 126 after the power has been turned on. If the auto feed switch 154 is ON, the release key 142 will also cause a card 100 to be fed to the punch station 114 to start the operation.

When the program switch 160 is in the ON position, a single depression of the skip key 146 initiates a skip on a field basis. The skipping operation thus discontinues when an end of field code is encountered in the card at the read station 118. When the program switch 160 is in its OFF position, skipping occurs on a column by column basis, as long as the skip key 146 is held depressed.

The upper shift or numeric key 136 is depressed to override a lower shift condition. A lower shift condition exists whenever (1) the program switch 160 is OFF or (2) the program switch 160 is ON but the program codes in a card 100 in the read station 118 call for a lower shift in that column. The shift key 136 is held down while keying the character that is being entered at the time.

The machine is normally in the lower or alphabetic shift when the program switch 160 is OFF. Most key punched data is numeric and is programmed. In the program mode the program switch 160 is ON, and the pneumatic logic is switched to accept only the numeric or upper case codes.

In order to punch a lower shift character, it is necessary to override the upper shift condition by depressing the alpha or lower shift key 134 while keying the character. The machine reverts back to the upper case when the alpha key 134 is released. If both shift keys are depressed inadvertently, the numeric or upper shift key 136 takes precedence over any other shift instruction.

A depression of the space bar 132 causes a single column advance of the cards 100 in the transport and particularly in the punch and read stations 114 and 118. Similar to the release key 142, the space bar 132 does not have a coded output, does not punch a code, and is acted on by the disk interlock bail restore cycle. The space bar 132 functions like the release key 142 when the cards in the punch station 114 and read station 118 are in their column 32 positions.

As previously described, there are six function switches on the panel 148, these being the print switch 152, the auto feed switch 154, the entry mode selector switch 162, the auto skip/dup switch 158, the program on-off switch 160 and the program 1-2 switch 156. In brief, these switches function to produce the following results.

When the auto skip/dup switch 158 is in its ON position, all fields in the variable data tier that are programmed for auto dup or skip by means of the program tiers of a card 100 in the read station 118 will be operated upon in accordance with the program code provided the program control switch 160 is ON. When the auto skip/dup switch 158 is in its OFF position, automatic duping and/or skipping are suspended for the variable data tier (normally tier 1) of a card 100 in the punch station 114, and all fields (such as a skip field or a dup field) are considered as "manual entry fields". The auto skip/dup switch 158 has no effect on the data being repetitively duplicated in tier No. 2 of a card 100 in the punch station 114.

The program control switch 160 suspends program control when the switch is in its OFF position; however, the program data contained in tier 3 of a card in the read station 118 continues to be duplicated into a card 100 in the punch station 114 on a card to card basis. When the switch 160 is in its ON position, program control of tier No. 1 is active, and the machine is normally in the upper shift mode. When the switch 160 is turned OFF, active program control is immediately suspended, and the keyboard 126 reverts back to the lower shift mode.

The program control switch 160 also assigns two modes to tier 3. When the switch 160 is set to its OFF position, tier 3 can be used to enter data when remaking one of the cards 100. The data is printed on the card 100 being remade while keying in the data or when manually duping tier 3. Each of the columns in tier 3 of the card being remade is treated as a six bit coded character even though as is apparent from the above table, tier 3 actually utilizes the upper three bits for program 1 and the lower three bits for program 2.

When the program control switch 160 is set to its ON position (this is its usual position), tier 3 of a card in the read station 118 is treated as two independent program levels for entering or reading three bit program codes. These levels are apparent from a consideration of the above table. Under these conditions, the program selector switch 156 becomes active to define which of the two program levels is being used.

Program codes are entered directly from the keyboard 126 when the entry mode selector switch 162 is in its tier 3 position and the program selector switch 156 has been set in either its program 1 or program 2 position. The three bits of the level not selected are suppressed from being punched.

When the auto feed switch 154 is in its ON position, as a card 100 passes its column 32 position over the punches 256 in the punch station 114, a new card 100 is fed out of the hopper 112 and is registered automatically with the gate 184. When the switch 154 is in its OFF position, it is necessary to press the feed key 144 to initiate the feed of a card 100 out of the hopper 112. The machine will always continue to cycle after column 32 has been passed in the punch station 114 and latch up (with clutch 340 being disengaged) with column No. 1 of a card 100 under the read head 190.

When the print switch 152 is in its ON position, all characters being keyed from the keyboard 126 or duped from the preceding card 100 in the read station 118 in the particular tier selected by the entry mode selector switch 162 will print on the print line 110 at the top or the card 100 in the punch station 114. Printing is suspended by turning the print switch 152 to its OFF position.

The entry mode selector switch 162 has three positions in which the switch portions 162*a*, 162*b* and 162*c* are respectively ON. In its three positions, the switch 162 denotes the No. 1 tier with switch portion 162*a* being ON, denotes the dup data or NO. 2 tier with switch portion 162*b* being ON, and in its third position denotes the two program levels of three bits each (with switch portion 162*c* being ON).

When entering or changing the program codes, either program level is selected by means of the program selector switch 156, and program codes are keyed from the keyboard 126 in either program level using the common character for each code as is shown in the above table.

The entry mode selector switch 162 directs the data being manually entered from the keyboard 126 to the proper tier punches 256 and to the printer 116. The entry mode selector switch 162 also indicates what tier is being printed when the manual duping operation is taking place.

The program selector switch 156 indicates which program level the machine is addressing. The switch 156 can be switched back and forth at any time in the middle of the card 100 between column cycles. As is indicated in the above table, the same bit pattern is used for both program level 1 and program level 2; and program level 1 is developed using bits 8, A and B and program level 2 is developed using bits 1, 2 and 4.

It will be observed from the above table that the capability and various combinations of functions for programs 1 and 2 are the same. By the program coding as set forth in this table, the machine has four programmed functions, and these functions may be used as follows:

1. End of Field — Used in last column of field.
2. Automatic Skip — Used at the beginning of the field.
3. Automatic Dup — Used at the beginning of the field.
4. Lower Shift — Used in every column to be shifted.

The backspace key 138 permits the operator to override the incrementing drive to the transport and reverse the shafts controlling the card 100 and the card cycle emitters 476, 472 and 470 simultaneously. In particular, the actuator 380 changes the drive reversal mechanism 354 from a forward drive condition to a reverse drive condition; and, when the column indicator 164 shows that the desired column has been reached, machine operation can resume. During this backspacing operation, the drive reversal mechanism 354 causes the cards 100 in the read station 118 and in the punch station 114 to be incremented rearwardly.

In describing the operation of the pneumatic controls shown in FIGS. 3–16, FIG. 3 will initially be referred to. The pick roll actuator 214 functions to push the pick roll 168 downwardly when air under pressure is supplied from the power supply 1000 to the actuator 214. The pick roll 168 is then effective to feed the uppermost card 100 from the stack of cards in the card hopper 112. The actuator 214 has three inputs or ports, namely, ports 464, 466 and 468. Supply pressure is always supplied to the port 464 from the power supply 1000; and movement of the piston 454 is controlled by the air pressure supplied to the ports 466 and 468, which constitute control parts. The pressure applied to the port 466 is always the inverse of that applied to the port 468 and vice versa; and the pressure applied to these control ports operates on the diaphragm type valves, including diaphragm 460 and ridges 458 and 462 that permit the air to come into the cavity 448 and onto the diaphragm 456 and permit the air to leave the cavity 448. For example, if the air pressure supplied to port 466 is positive or high, this high pressure seals the diaphragm 456 down against the ridge 462. This, in effect, closes the port 464 with respect to the cavity 448 so that air pressure does not exist against the diaphragm 456 tending to move the piston 454 forwardly. Since the air pressure applied to port 466 was positive or high, the pressure on port 468 is negative or is low, and the down stream valve including the diaphragm 460 and ridge 458 opens to permit the air that was inside of the cavity 448 and effective on the diaphragm 456 to escape to atmosphere. The actuator 214 is under these conditions de-energized, and the pick roll 168 raises. Similarly, if the pressure applied to port 466 is negative or low, the upstream valve including the diaphragm 460 and ridge 462 is open, permitting supply pressure from port 464 to pass to the diaphragm 456 and behind the piston 454 to move the piston outwardly. At the same time, the pressure applied to port 468 is positive or high, and this closes the downstream valve which includes the diaphragm 460 sealing on the ridge 458, so that air is trapped inside the cavity 448 and on the face of diaphragm 456. The actuator 214 is now energized so as to move pick roll 168 downwardly to engage a card 100 in hopper 112.

The construction of the other actuators 240, 280, 246, 352, 380, 440 and 444 is the same as that of the actuator 214, and these other actuators work in the same manner. When the actuator 240 is energized so as to move the piston 454 out of the actuator body 446, the pressure roll 182 is moved upwardly against spring 242 out of a pressure nip relationship with the incrementally driven roll 180. When actuator 240 is de-energized, spring 242 causes a card 100 to be gripped between the rolls 182 and 180 so that the card 100 is incremented through the punch station 116. The actuator 280 acts with respect to the roll 188 in the same manner to grip a card 100 and cause the card to be incremented through the read station 118. When the gate actuator 246 is energized, it pushes the gate 184 upwardly into the path of cards 100 so as to stop a card 100 and register it at the position of gate 184. The cycle clutch actuator 352, when energized, releases the spring clutch 344 and permits the drive shaft 346 to drive the shaft 348 through one revolution or more. When the backspace actuator 380 is actuated, it brings into operation the reverse gear arrangement 354 so that, when the cycle clutch 344 is operative, it causes the incrementing rolls 180 and 186 to be driven in a direction reverse from normal. The keyboard restore left actuator 440 and the keyboard restore right actuator 444 both are energized at the same time, and their purpose is to restore the bail 442 to a non-coded condition. This constitutes a reset operation for the keyboard.

Regarding the switches which control the machine and referring to FIG. 3, the print toggle switch 152 when placed in its uppermost position passes air under pressure through the switch and enables the printer 117 to be effective for printing on a card 100. The switches 162*a*, 162*b* and 162*c* shown in FIG. 3 are actually the one toggle switch 162 shown in FIG. 2 which has three positions and has one air input from the power supply 1000 and three air outputs. These outputs are the outputs of the switches 162*a*, 162*b* and 162*c* as they are shown in FIG. 3 which pass an under pressure when up or ON. When the auto feed switch 154 is in ON position passing fluid pressure through the switch, it causes a card 100 to be fed from the hopper 112, as soon as the previous card 100 has left the punch station 114. The program control switch 160 determines whether or not the machine is under program control or is under manual control and passes air pressure when the switch is up or ON. The program select switch 156 determines which program level is effective and passes fluid pressure through it when up or in Prog. II position. Regarding the auto skip/dup switch 158, this switch when in the ON position passes air under pressure through it. The switch 294 is actuated by the cards 100 that enter the stacker 120, and the switch 294 is opened when the stacker 120 is full.

Regarding the sensors 191, 178 and 176, the card in read sensor 191 is blocked by a card 100 in the read station 118 and indicates whether or not a card 100 is in this position. The card in punch sensor 178 acts in the same manner to indicate whether or not a card 100 is in the punch station 114. The card in transport sensor 176 is immediately downstream of the hopper 112 and functions in basically the same manner as the other sensors to indicate whether or not there is a card 100 on its way from the hopper 112 to the punch station 114.

The emitters 470, 472 and 476 provide a positive or high air pressure at their outputs if the cutouts 478*a* and 484*a* are effective to pass jets of air through the emitters. The end of card emitter 470 provides an output air pressure when column 32 of a card 100 is reached in the stations 116 and 118, and the output signal proceeds to various logic parts to indicate that another card 100 should be fed or to set various pneumatic switches in the logic. The start of card emitter 472 provides an output air pressure when a card 100 in the punch station 114 is in its column 2 position, and this serves the function of enabling a backspace. No backspace is permitted with the illustrated machine embodiment if a card 100 in the punch station is in its column 1 position — a backspace is permitted only if the card 100 has its column 2 or some later column in alignment with the punches 256. A card 100 may thus not be backspaced all of the way out of the punch station 114. The cycle emitter 476, being fixed to the punch shaft 276 turns ON and OFF once every cycle or revolution of the punch shaft 276 and serves the purpose of gating punch interposer air pulses.

In order to start the machine in operation, the feed key 144 is depressed. This has the effect of lowering the MANUAL FEED signal (see FIG. 4) applied to AND circuit 1074. In this connection, the acutely extending flags on the two inputs to the AND circuit 1074 indicate that the AND circuit 1074 is satisfied when both of its inputs are low. The flag on the output line of AND circuit 1074 indicates that when the two inputs are satisfied, a low output signal is provided by AND circuit 1074. The flags on the input lines and output lines of all of the other circuits in the pneumatic logic are indicative of the same conditions as just described in connection with the AND circuit 1074.

The − sign appended to the manual feed signal in FIG. 4 indicates that the manual feed signal is low when the manual feed key 144 is depressed. Likewise, referring to FIG. 3, the −STACKER FULL signal indicates that this signal is low when the stacker full switch 294 is actuated as the cards 100 fill the stacker 120 completely. The logic also contains a number of + signals such as the +PRINT signal in FIG. 3, and the + sign indicates that the signal is high in this case when the print switch 152 is in its ON position. Likewise, there are many other + and − signals in the logic; and generally there is a − signal for each + signal, simply indicating the state of the signal when it is active, namely, that the signal is high or + when the signal is active, or − or low when the signal is active.

For the machine to start, two other conditions in addition to depression of feed key 144 must also be true, namely, there must be no card 100 in the punch station 114, and there must be no card 100 in the transport just downstream of the hopper 112. The + CARD IN PUNCH signal applied to AND circuit 1074 must thus be low (when there is no card 100 in the punch station) and the − CARD IN TRANSPORT signal applied to OR circuit 1086 must be high (when there is no card in the transport). Since both lines J06 and H06 carrying the signals + CARD IN PUNCH and − MANUAL FEED are low, AND circuit 1074 is satisfied and its output goes low. This sets the latch 1080A and provides a + FEED signal at the output of latch 1080A.

The latch 1080A functions as follows: the connection between AND circuit 1074 and OR circuit 1076 goes low when AND circuit 1074 is satisfied, and this causes the output of OR circuit 1076 to go low also. Line F06 applied to AND circuit 1078 is already low; so when the connection between circuits 1076 and 1078 goes low, the output of AND circuit 1078 goes high. The pressure in line J09 applied to AND circuit 1082 was already high; so when the output of circuit 1078 goes high, this satisfies the AND condition of circuit 1082 which in turn satisfies the OR condition of circuit 1084. This provides a low output from circuit 1084 on its output line G10. Line G10 is connected with line G06 applied to OR circuit 1076, and OR circuit 1076 is thus locked in a low output condition and the latch 1080A is thus locked in a set condition.

The output of latch 1080A (on line G07) is the + FEED signal above mentioned, and this signal operates later on the keyboard restore circuitry. The output of the OR circuit 1084 is a − FEED signal and this operates on pick roll actuator circuitry as will be described. The latch 1080A may also be operated in an automatic mode as when the auto feed switch 154 is ON; and, under these conditions, the latch 1080A is set by the + AUTO FEED signal applied to the AND circuit 1080 and a positive signal applied to line F09 coming from AND circuit 1070. AND circuit 1070 will have a positive output, that is, be satisfied, when all of its inputs are low that is to say, the +END OF CARD signal applied to lines B14 and C14 and the −END OF CARD signal applied to line D14 after a 15 millisecond time delay. Thus, when the end of the card is reached, the output of AND circuit 1070 will go positive for 15 milliseconds. Thus, lines F09 and G09 of AND circuit 1080 will be satisfied for 15 milliseconds and so satisfy OR circuit 1084 causing the output G10 of OR circuit 1084 to drop low, setting the latch 1080A. The + AUTO FEED signal comes from the toggle switch 154.

Referring further to FIG. 4, the +CARD IN PUNCH signal is also effective on AND circuit 1088 through line J11. The +START OF CARD EMITTER signal is also effective on AND circuit 1088 through line H11, and the +START OF CARD EMITTER signal occurs positive or high when a card 100 is in its column 1 position, directly over the punches 256. Lines J11 and H11 serve as interlock lines on AND circuit 1088 and AND circuit 1088 will be satisfied when the pressure in line F11, which comes from the feed latch 1080A, goes low. At this time, AND circuit 1088 will be satisfied; and line G12, which is the output of AND circuit 1088, goes high in pressure, and this pressure is applied to the input side of AND circuit 1090. Therefore, as soon as the pressure in line G12 goes high, the AND condition of circuit 1090 is satisfied, and the output pressure of AND circuit 1090 in line G14 goes low. AND circuit 1090 is simply used as an inverter for the output of circuit 1088, and it will be noted that the outputs of 1088 and 1090 are respectively the signals + PICK ROLL and −PICK ROLL. The +PICK ROLL and the −PICK ROLL signals are applied to the valves of the pick roll actuator 214, and the pick roll 168 is then lowered so as to engage the uppermost card 100 in the hopper 112. The output of AND circuit 1090 also goes through the delay circuit 1092 which may delay the signal for 100 milliseconds for example, back to latch 1080A, serving as a reset for latch 1080A. In the process of resetting latch 1080A, since latch 1080A was the means of raising the −PICK ROLL signal, the −PICK ROLL signal is returned to its original condition when latch 1080A is reset. The pick roll 168 then is returned to its uppermost position, out of contact with the stack of cards 100 in the hopper, the pick roll having been in its lowermost position for 100 milliseconds.

The other means for resetting latch 1080A is by means of the −CARD IN TRANSPORT signal applied onto OR circuit 1086. As soon as the − CARD IN TRANSPORT signal goes low, the OR condition of circuit 1086 is satisfied so as to supply a positive reset signal to AND circuit 1078 thus resetting latch 1080A.

Therefore, when a card 100 is fed through the card transport from the hopper by depression of the feed key 144, the − CARD IN TRANSPORT signal will serve to turn off the feed latch 1080A so as to thereby return the −PICK ROLL and +PICK ROLL signals to original conditions and allow the pick roll 168 to move upwardly from the stack of cards in the hopper 112. If a card 100 is not fed for any reason, the feed latch 1080A will be turned OFF 100 milliseconds after the manual feed key 144 is depressed or after latch 1080A has been set in a positive state by the auto feed circuitry which occurs if the auto feed switch 154 has been turned ON and the end of the previous card 100 had been reached. This turning off of latch 1080A is due to the action of the time delay circuit 1092. The −PICK ROLL signal then goes high, and the +PICK ROLL signal returns to its low condition.

The incrementer roll actuator circuitry is embodied in circuits 1094, 1096 and 1098 and works in substantially the same manner as the pick roll actuator circuitry. The +PICK ROLL signal is one of the inputs to OR circuit 1094 and the other input is the output of OR circuit 1086 which is the reset circuit for latch 1080A. When either of these signals is high, the output of OR circuit 1094 will be high. Since line G02 is high normally, the output of AND circuit 1096 will go low when the output of OR circuit 1094 goes high. This will satisfy the OR condition of circuit 1098 and produce a + INCREMENTER ROLL signal. The − INCREMENTER ROLL signal is the output of circuit 1096 and is the inverse of the +INCREMENTOR ROLL signal. When the + INCREMENTOR ROLL signal thus goes high and the − INCREMENTOR ROLL signal goes low accordingly, these signals being applied on to the actuator 240 causes the pressure roll 182 to ascend so that a card 100 may be thrust by the rolls 172 and 174 between the rolls 180 and 182. The + INCREMENTER and − INCREMENTER signals have the same action with respect to the actuator 280 for the rolls 186 and 188 so that the gate 184 when it raises moves a card 100 fully between the rolls 186 and 188.

Still referring to FIG. 4, the latch 1058A controls the + RELEASE signal which prevents punches 256 from operating while a card is being ejected into the stacker 120 and a new card 100 is being fed from the hopper 112 in addition to other functions which will be subsequently described. The latch 1058A is set by means of AND circuit 1068. Input line A10 to AND circuit 1068 will be low when the +INCREMENTER ROLL signal is low because the output of circuit 1098 is low and no pressure is being applied to the incrementer actuators 240 and 280. Line B10, the other input line to AND circuit 1068, goes low when the release key 142 is depressed. The AND condition of circuit 1068 is then satisfied, and this serves to set the release latch 1058A.

The release latch 1058A can also set by means of the +END OF CARD signal which is branched into inputs C12 and D12 of AND circuit 1060. The reason for this use of the +END OF CARD signal is that it will be desired in automatic feed mode to release a card 100 when the punches 256 reach the end of a card 100 and feed another card 100. The signal − SR which is applied onto the AND circuit 1058 is an interlock signal and will be described in greater detail hereinafter. The latch 1058A which includes the circuits 1058, 1060, 1062, 1064 and 1066 functions essentially much the same as the latch 1080A.

The latch 1058A is reset due to the action of the AND circuit 1070. The +END OF CARD signal and the − END OF CARD signal are both applied to the AND circuit 1070 for this purpose. The − END OF CARD signal passes through the delay circuit 1072, and this signal goes to the input D14 of circuit 1070. The +END OF CARD signal is low on inputs B14 and C14 of circuit 1070 until column 32 of a pair of cards 100 reaches the center line of the rolls 186 and 188 and the center line of the rolls 180 and 182. At this time, the emitter 470 provides a high output pneumatic pressure, and the − END OF CARD signal goes low. However, because of the 15 millisecond delay by means of circuit 1072, the inputs to AND circuit 1070 remain in the same condition for 15 milliseconds, and the AND circuit 1070 provides a 15 millisecond pulse to circuit 1066 of latch 1058A. Thus, latch 1058A is reset when the +END OF CARD signal goes low which will occur when an imaginary column 39 of two cards 100 is in alignment with the center lines of rolls 186 and 188 and the rolls 180 and 182. The card thus has moved seven more columns with respect to the positions of the cards just mentioned; and the +END OF CARD signal is, as before mentioned, under the control of the emitter 470.

The operation of the keyboard circuitry will now be described; and, in this connection, FIG. 9 may be referred to. Referring to the input signals for this circuitry, the signals LC-B and UC-B are respectively lower case B and upper case B signals. Correspondingly, the LC-A and the UC-A are lower case and upper case A signals. The other signals just below these correspond to 8, 4, 2 and 1 signals, and all of these signals come from the various keys on the keyboard 126.

For the purpose of illustration, it may be assumed that the data key 130 for the letter "A" is keyed in. The code for the letter A may be a 1 bit, an A bit and a B bit. The depression of the "A" key will thus provide low signals as follows: LC-8, LC4 and LC-2 for Alpha shift. It is desired that a lower case A be punched and/or printed; and, therefore, the machine should be in ALPHA shift as opposed to numeric shift. If the machine is operating in program control, the machine is automatically in numeric shift; and, in order to be in ALPHA shift, the ALPHA key 134 is depressed or else a program ALPHA must be read in the program tier of the card 100 in the read station 118. If the machine is not in program control, the keyboard 126 will automatically be in its ALPHA shift condition.

The purpose of AND circuit 1260 in the FIG. 9 logic, is to permit the machine to be in its ALPHA shift condition when it is under program control, providing the ALPHA key 134 is depressed. The output of AND circuit 1260 is high if the machine is under program control and if the ALPHA key 134 is not depressed. Under all other conditions, the output of AND circuit 1260 is low. If the machine is under program control, line H06 will be low; and it may be assumed at this time that line J06, to which the signal + PROGRAM ALPHA is applied, is low; and the output of circuit 1262 is low. This is applied as an input to OR circuit 1264 and also thereby to AND circuit 1266. The other input to the AND circuit 1266 is the output of AND circuit 1270, as shown. The output of AND circuit 1270 goes low when the + READ STROBE signal and the − AUTO PUNCH signal are high or positive. The + READ STROBE signal, as will be hereinafter apparent, is mainly controlled by the punch cycle emitter 476, and the − AUTO PUNCH signal is high whenever the machine is not under program control and is not skipping or duping. Since both the inputs B14 and C14 to AND circuit 1270 are high, the output of circuit 1270 will be low so as to satisfy the AND condition of circuit 1266. The output of AND circuit 1266 is then high and is connected to the circuitry of the keyboard output signals, in particular to the AND circuits 1224, 1230, etc. for the purpose of conditioning these AND circuits.

The output of AND circuit 1266 is also connected to AND circuit 1268 as an input, as shown. The other input to AND circuit 1268 is the output of circuit 1270 (which was previously set and is low since the machine is neither duping nor skipping). The output of AND circuit 1270 pulses low every time a card 100 increments; every time the punch shaft 276 makes a revolution, the + READ STROBE signal pulses high and thus satisfies the AND condition of circuit 1270. Therefore, once every cycle, the inputs to AND circuit 1268 satisfy this circuit and provide a high output on line G12, and the line G12 is connected to the keyboard output circuitry and particularly to AND circuits 1224, 1230, etc. Incidentally, the input G11X to AND circuit 1268 is simply a source of pneumatic pressure to physically make the AND circuit 268 function as an AND circuit with two working inputs F11 and J11, and this same explanation applies to other inputs to other components of the logic not shown to be supplied with the output from another logic component. The outputs of the AND circuits 1266 and 1268 are inverses of each other; in other words, only one of these outputs is high at any one time while the other is low. The output of circuit 1268 causes the keyboard output circuitry to pay attention only to lower case bits from the keyboard, and the output of AND circuit 1266 causes the keyboard output circuitry to be responsive to the upper case outputs from the keyboard. Thus, with any combination of keyboard outputs, only the upper case or the lower case outputs will be effective, depending on whether the output of circuit 1266 is high or the output of circuit 1268 is high.

In the particular case under consideration, for punching and/or printing the lower case A character, the output signals from the FIG. 9 logic should be as follows: a low − KEYBOARD B output, a low − KEYBOARD A output, a high − KEYBOARD 8 output, a high − KEYBOARD 4 output, a high − KEYBOARD 2 output, and a low − KEYBOARD 1 output. With respect to the input signals, only the lower case bits are effective, these being, the LC-1, LC-A and LC-B bits.

For the purpose of illustration, the keyboard circuitry pertaining to the 1 bit and the 2 bit will be taken as examples of the manner in which the FIG. 9 circuitry functions. The − KEYBOARD 2 signal should be high implying that no output from the keyboard 2 contact is desired. In order for the output of circuit 1252 to be high, the AND condition of circuit 1248 must not be satisfied and the AND condition of circuit 1250 must not be satisfied. When data key A was depressed, the lower case 1 contact remained closed. This provided a high pressure at input G13 to AND circuit 1254. The output of AND circuit 1268 is also high, and this output is connected to line F13 of AND circuit 1254. AND circuit 1254 is thus satisfied, and this in turn satisfies the OR condition of circuit 1258, thereby providing a low output on the − KEYBOARD 1 signal line. When the A key was depressed, the lower case 2 bail contact was opened which provides a low pressure at input G09 of AND circuit 1248. In addition, since AND circuit 1266 is high; AND circuit 1268 will be low, causing input J09 to AND circuit 1250 to be unsatisfied. The AND conditions of neither of the circuits 1250 and 1248 are thus satisfied, and this prevents the OR condition of circuit 1252 from being satisfied, resulting in a high output on the − KEYBOARD 2 line. A high output on the − KEYBOARD 2 line implies that the keyboard 2 signal does not exist while, as described, the low condition on the − KEYBOARD 1 line implies that the keyboard 1 signal does exist. The remainder of the keyboard output signals are provided in the same way as just described for the keyboard 2 and keyboard 1 signals.

As above described, the + READ STROBE signal goes positive once every revolution of the punch shaft 276, this signal coming originally from the punch cycle emitter 476. The − AUTO PUNCH signal is positive at all times except when the machine is skipping and/or duping. Therefore, AND circuit 1270 is satisfied once every revolution of the punch shaft 276 and provides a low output to circuits 1266 and 1268. The keyboard strobe signal passes through the 12 millisecond delay circuit 1272 and from thence to OR circuit 1276. The other two inputs to circuit 1276 are the + FEED and the + AUTO PUNCH signals, as will be noted. The origin of the + FEED SIGNAL has been previously noted, and the origin of the keyboard strobe signal is the any key contact thus, when any key is depressed on the keyboard 126, the any key contact will be tripped; and through suitable circuitry, a + KEYBOARD STROBE signal will be generated. The + AUTO PUNCH signal is negative at all times other than when the machine is duping and/or skipping. The + FEED SIGNAL will only be positive when a card 100 is being fed through the transport. The + KEYBOARD STROBE, + FEED, and + AUTO PUNCH signals are effective on the circuits 1272 and 1276; and, therefore, any one of these signals will satisfy the OR condition of circuit 1276 and provide a low output to the − KEYBOARD RESTORE line. The output of the OR circuit 1276 also passes through the inverter 1274 to provide the + KEYBOARD RESTORE signal. The + KEYBOARD RESTORE and the − KEYBOARD RESTORE signals are applied to the two keyboard restore actuators 440 and 444 which have the function of restoring the latches 404 to a reset condition and also preventing a key 130 from being depressed while these actuators 440 and 444 are energized. The actuators 440 and 444 will be energized at any time when the machine is in an auto punch condition (duplicating or skipping) and also when the machine is feeding a card 100 and further also after 12 milliseconds have expired after a key 130 on the keyboard 126 has been depressed. The input C10X to OR circuit 1276 is merely one of the constant pressure inputs, in particular to make the OR circuit 1276 function physically as an OR circuit.

Referring now to FIG. 5, the operation of the gate 184 will be described. The origins of the − PICK ROLL signal and the + PICK ROLL signal have been described previously, and these signals in conjunction with the − CARD IN PUNCH signal serve to set and reset the gate latch 1106A. Due to the action of the time delay circuit 1100, 200 milliseconds after the − PICK ROLL signal goes high, the input line G02 on the AND circuit 1104 goes high. The − CARD IN PUNCH signal is high whenever there is no card in the punch station 114, this being due to the action of the sensor 178. Whenever a card 100 is fed through the transport, however, the card 100 coming into the punch station 114 changes the signal from the sensor 178 to a low state. The time delay circuit 1102 provides a time delay of 50 milliseconds after a change in the − CARD IN PUNCH signal, and, therefore, the pressure at line H02 constituting an input to AND circuit 1104 remains high for 50 milliseconds after a card 100 reaches the punch sensor 178. Therefore, for these 50 milliseconds, the output of AND circuit 1104 is low. The − SR signal applied to the latch 1106A is normally high. Therefore, the line G04 on the AND circuit 1106 and the line H04 on AND circuit 1108 will be at high pressure. When the + PICK ROLL signal is high, the AND condition of circuit 1106 is satisfied, and this in turn satisfies the OR condition of circuit 1110 and causes its output to go low. The pressure in line G06 constituting an input to OR circuit 1112 thus goes low, and the OR condition of circuit 1112 is satisfied and provides a low output applied to the AND circuit 1114.

As previously mentioned, the output of AND circuit 1104 is negative for 50 milliseconds; and therefore, the AND condition of AND circuit 1114 is satisfied thus providing a high + GATE signal which is the output from circuit 1114. This high signal also is applied onto the AND circuit 1108, and this locks the latch 1106A in actuated condition. However, 50 milliseconds after the card 100 has reached the punch station 114, the AND condition of circuit 1104 is no longer satisfied, thus giving a high input on line F06 to AND circuit 1114. The AND circuit 1114 is thus no longer satisfied so that it changes state, and its output, which is the + GATE signal, goes low.

Whenever the + GATE signal is high and the − GATE signal is low, the actuator 246 is active so as to raise the gate 184 into the path of card movement for the purpose of stopping a card 100. When the + GATE signal is low and the − GATE signal is high, the gate actuator 246 is not operative; and the gate 184 is then returned to its inactive position.

The − COLUMN INDICATOR RESET signal which is an output signal from the FIG. 5 circuitry is generated as follows. The − SR signal is normally high, and is applied onto line F09 which constitutes an input to AND circuit 1116. Once each revolution of punch shaft 276, the + CYCLE EMITTER signal from emitter 476 goes high, and this satisfies the AND condition of circuit 1116. Circuit 1116 thus in turn provides a low output satisfying the condition of OR circuit 1118. Also, once each cycle or revolution of shaft 276, the + CYCLE EMIT signal goes low. This is connected through the 20 millisecond time delay circuit 1120 to AND circuit 1122. Thus, for 20 milliseconds each punch cycle, the AND condition of circuit 1122 is satisfied, and this in turn satisfies the AND condition of circuit 1124, providing the − COLUMN INDICATOR RESET signal. The − COLUMN INDICATOR RESET signal is connected to the column indicator 164, particularly on top of the diaphragm of the W. P. Bakken column indicator apparatus previously mentioned; and, the function of this signal is to reset the numerals of the column indicator 164 to complete blanks once each cycle.

The operation of the logic which controls the operation of the clutch 340 and which is illustrated in FIG. 11 will now be described. The clutch 340 operates in two modes. One mode is that of single cycling in which the clutch 340 operates or engages once per depression of keys 130. The other mode is an automatic mode in which the clutch 340 remains engaged for a longer time. In single cycle mode, the + KEYBOARD STROBE signal goes positive when a key 130 is depressed. The OR condition of circuit 1352 is thus satisfied, and the output of this circuit is one of two inputs to the AND circuit 1354. When the gate 184 is not being actuated, the − GATE signal, which is one of the two inputs of the AND circuit 1354, is high. The AND condition of circuit 1354 is then satisfied, and the output of AND circuit 1354 satisfies circuit 1356 and provides a low − CYCLE CLUTCH output signal. The output of OR circuit 1356 is also connected to OR circuit 1350 which at this time provides a high + CYCLE CLUTCH signal.

The + CYCLE CLUTCH signal and the − CYCLE CLUTCH signal are connected to the cycle clutch actuator 352 for operating the actuator 352. The + KEYBOARD STROBE signal occurs for a short time after a key 130 is depressed; and the + CYCLE CLUTCH and − CYCLE CLUTCH outputs also occur for only as long as the KEYBOARD STROBE pulse occurs. This permits the cycle clutch 340 to be operated or engaged in a single cycle mode: once every time any key 130 is depressed.

The cycle clutch 340 when operated in its automatic mode is held engaged for a time, and when the cycle clutch 340 is engaged, cards 100 are incremented through the transport. This occurs in a skip condition, a dup condition, and a release condition of the machine. The release signal has been previously described in connection with FIG. 4, and this signal is applied onto OR circuit 1346. When the + RELEASE signal is high, this signal satisfies the OR condition of circuit 1346, and this signal is thus in turn applied to OR circuit 1348 and is inverted. The output of OR circuit 1348 is applied as one of the two inputs to OR circuit 1352 so that when the + RELEASE signal is high throughout the circuitry, it serves the same purpose as the + KEYBOARD STROBE signal did in operating the cycle clutch circuitry. The cycle clutch 340 remains engaged as long as the + RELEASE signal remains high, and this occurs when the release key 142 is depressed or when the machine is in its automatic feed mode until the end of a card 100 is reached at the punch station 114. The release operation occurs automatically, and the cycle clutch 340 remains engaged whenever the + RELEASE signal remains high. The cycle clutch 340 is also engaged when the machine is in a skip or a dup condition as occurs when the skip key 146 or the dup key 140 are depressed or when, under program control, a program skip or a program dup signal is read in the read station 118 from the previous card 100 traveling along the card transport.

Still referring to FIG. 11, the origin of the skip key signals will be described. When the skip key 146 is depressed the − SKIP KEY signal applied to OR circuit 1330 and to AND circuit 1316 goes low. The OR circuit 1330 is thus satisfied providing a high output from this circuit. This output proceeds through the 15 millisecond time delay circuit 1332 and from thence the output proceeds into AND circuit 1328 and AND circuit 1316. Thus, when the skip key 146 is depressed, both of the inputs of AND circuit 1316 go low for 15 milliseconds, and the AND condition of circuit 1316 is satisfied. As this time, the output of AND circuit 1316 is applied onto OR circuit 1312, and this serves to set the latch 1306A which may be termed a skip latch. The latch 1306A when set provides the SKIP signal as an output.

The skip latch 1306A may also be turned ON when the machine is under program control and when a program skip signal is read from the previous card 100 traveling through the transport. The + PROGRAM SKIP signal is applied to the AND circuit 1308 along with the RESET PL signal, and both of these signals are high at this time satisfying the AND condition of circuit 1308. This serves to set latch 1306A. The skip latch 1306A thus can be set either by depression of the skip key 146 or by sensing a skip code in the program tier of the previous card 100 passing through the card transport, when the machine is under program control.

The latch 1318A, which may be termed a dup latch, is set by depressing the dup key 140 and operates in a manner similar to that of the latch 1306A for a skip condition. When the dup key 140 is depressed, the signal − DUP KEY goes low and passes through OR circuit 1330 to the time delay circuit 1332 which delays the signal for 15 milliseconds. This delayed signal is applied to AND circuit 1328, and the output signal from AND circuit 1328 serves to set the dup latch 1318A.

The high output of the skip latch 1306A (the + SKIP signal) and the high output of the dup latch 1318A are both applied to OR circuit 1346, and either of these two signals, the + SKIP signal or the + DUP signal when going high will satisfy the OR condition of circuit 1346, causing its output to go low. This low output of OR circuit 1346 is termed the − AUTO PUNCH signal and the application of this signal to OR circuit 1348 causes an inversion of the signal, providing the + AUTO PUNCH signal. As has been previously described, the output of the OR circuit 1348 is applied to the OR circuit 1352 as an input, and the result of this application of signal to OR circuit 1352 is to turn on or engage the cycle clutch 340, and the cycle clutch 340 is held engaged as long as the skip or the dup signals are positive.

The skip latch 1306A and the dup latch 1318A are reset as follows. If the machine is not under program control, a skipping or a duping condition may be initiated only by depression of the skip key 1346 or the dup key 140, and the actions of these keys in setting the skip latch 1306A and the dup latch 1318A have just been described. The output of OR circuit 1330, as will be noted, is connected to the AND circuit 1334 as an input, and the + PROGRAM CONTROL signal is also connected to AND circuit 1334. When the machine is not under program control, the + PROGRAM CONTROL signal is negative or low. Therefore, as soon as the skip key 146 or the dup key 140 is released, the output of OR circuit 1330 drops to a low pressure, and thus AND circuit 1334 will have its AND condition satisfied. The output of the AND circuit 1334 is an input to AND circuit 1336, and the other input to the AND circuit 1336 is the + CYCLE EMIT signal which becomes high once every revolution of the punch shaft 276. Therefore, when the skip key 146 or the dup key 140 are released, the next time that the + CYCLE EMIT pulse occurs, the AND condition of the AND circuit 1336 is satisfied. This in turn satisfies the OR condition of OR circuit 1340, causing its output to go low; and this in turn satisfies the OR condition of circuit 1342. The output of OR circuit 1342 is connected to both of the latches 1306A and 1318A, and the output of OR circuit 1342 serves as the reset pulse for both of the latches 1306A and 1318A.

OR circuit 1342 can also be operated under program control for resetting the latches 1306A and 1318A, and this occurs when an END OF FIELD signal is detected in the read station 118. If the machine is under program control, the signal − PROGRAM CONTROL is low or negative, and when an end of field bit is detected in the read station 118, the − END OF FIELD signal is also low. Under these conditions, the AND condition of circuit 1344 is satisfied, and this in turn satisfies the OR condition of circuit 1342, giving a reset pulse from circuit 1342 to the skip latch 1306A and the dup latch 1318A.

There is another method for operating or engaging the cycle clutch 340, and this is by depression of the backspace key 138. Depression of the backspace key 138 causes the + BACKSPACE SET signal to go high or positive, and this signal is applied to OR circuit 1356. The OR condition of circuit 1356 is thus satisfied, so that this circuit gives a negative or low output, this being the − CYCLE CLUTCH signal which in turn satisfies OR circuit 1350, the output of which is a high + CYCLE CLUTCH signal. These two signals operate the cycle clutch actuator 352 and engage cycle clutch 340. The depression of the backspace key 138 or the depression of any data key 130, thus has the effect of engaging the cycle clutch 340 for one revolution of the clutch shaft, incrementing a card 100 in the transport one column.

The timing of the punches 256 will now be described with reference to FIG. 12. The + KEYBOARD STROBE signal applied to OR circuit 1358 goes low when any key 130 is depressed; and, on this change in the + KEYBOARD STROBE signal, OR circuit 1358 is satisfied. If the − PUNCH READY signal is negative or low which occurs if the punches 256 are ready to punch (as will be described), OR circuit 1360 is satisfied; and, when both circuits 1358 and 1360 are satisfied, AND circuit 1362 is also satisfied. The output of AND circuit 1362 passes through the inverter 1364 and the time delay circuit 1366 to AND circuit 1368. The inverted output of AND circuit 1362 is delayed by the circuit 1366 for 10 milliseconds, and, at the end of this delay, AND circuit 1368 is satisfied so as to thereby satisfy OR circuit 1372. Thus, when a key 130 is depressed for a time of 10 milliseconds, OR circuit 1372 produces its output.

The output of OR circuit 1372 is connected as an input to OR circuit 1378 which in turn is connected to provide an input to AND circuit 1380. The + CYCLE EMIT signal, which goes high once every revolution of the punch shaft 276, is applied to inverter circuit 1382 and is also applied as an input to AND circuit 1386. The output of the inverter circuit 1382 passes through the 10 millisecond time delay circuit 1384 and from thence becomes one of the inputs to AND circuit 1386. Therefore, for 10 milliseconds for each revolution of the punch shaft 276, the AND circuit 1386 is satisfied and this in turn satisfies OR circuit 1390. The output of OR circuit 1390 is connected to OR circuits 1392 and 1396 as inputs; and, when the output of OR circuit 1390 becomes negative, both of these two OR circuits 1392 and 1396 are satisfied. The outputs of OR circuits 1392 and 1396 are connected to OR circuit 1394 to satisfy OR circuit 1394. At this time, a high + RESET PL signal is generated from OR circuit 1394, and this signal is also connected to the other input of AND circuit 1380. So, for the time during the cycle that OR circuit 1394 is not satisfied, AND circuit 1380 will be satisfied, generating a high + READ STROBE signal.

The + RESET PL signal may also be generated by depressing the backspace key 138. When this key is depressed, the − BACKSPACE signal goes low; and this low signal is applied as an input to OR circuit 1392 and OR circuit 1396. As has been described, the outputs of either of these circuits 1392 and 1396 satisfies the OR condition of circuit 1394 so as to generate the + RESET PL signal which, as will be described, has the effect of holding the punch latches 1398A, etc. reset when the backspace key 138 is depressed.

The + READ STROBE signal can also be generated when the machine is in an auto punch condition, in other words, when the machine is either skipping or duping. The − AUTO PUNCH signal is applied to AND circuit 1376; and, as will be observed, the other input to AND circuit 1376 is the output of inverter 1382, which is the inverse of the + CYCLE EMIT signal. Thus, when the machine is in an auto punch mode, that is, when the machine is skipping or duping, AND circuit 1376 is satisfied to provide a low output once every revolution of the punch shaft 276. The output of AND circuit 1376 is in turn connected to OR circuit 1378, satisfying this circuit, to provide a low output to circuit 1380. When the auto punch condition becomes active, there is a 10 millisecond delay due to the action of the time delay circuit 1374; and this has the effect of holding the + AUTO PUNCH signal and the − AUTO PUNCH signal applied as inputs to AND circuit 1370 at the same level for 10 milliseconds. The OR condition of circuit 1372 is thus satisfied for 10 milliseconds, and the output of OR circuit 1372 is connected to the OR circuit 1378 satisfying the latter circuit. The output of OR circuit 1378 is connected to AND circuit 1380 so that, when the machine is in an auto punch mode, a + READ STROBE signal will be generated once each punch shaft revolution. Thus, the + READ STROBE signal and the + RESET PL signal can be generated either by depressing a data key 130 or during a skipping or duping operation (auto punch condition of the machine). As will be described more fully hereinafter, the + KEYBOARD STROBE signal, the + READ STROBE signal, and the + RESET PL signal are in general for the purpose of controlling the punch timing and gating punch interposer pulses.

The operation of the punch mode control circuitry shown in FIG. 7 will now be described. When the three position punch mode control selector switch 162 is in the manual punch tier 1 position (in which the switch portion 162*a* is the actuated portion of the switch) the + MANUAL PUNCH I signal will be high, the + MANUAL PUNCH II signal will be low and the + MANUAL PUNCH III signal will be low. The + MANUAL PUNCH I signal is applied to OR circuit 1156, and the other input to the OR circuit 1156 is the − DUP signal, the origin of which has been described previously. If the machine is not in a duplicating mode, the signal − DUP will be positive or high. Since the + MANUAL PUNCH I signal is high and since the signal − DUP is high, OR circuit 1156 will not be satisfied, and it provides a high input to AND circuit 1158. The other input to the AND circuit 1158 is the output of AND circuit 1172. The inputs to AND circuit 1172 are the + READ STROBE signal and the + CARD IN READ signal. The + READ STROBE signal goes high once every revolution of the punch shaft 276, and the + CARD IN READ signal is high as long as there is a card under the read station 118. Thus, the output of AND circuit 1172 goes low once every revolution of the punch shaft 276, and the pressure in input line F02 applied to AND circuit 1158 goes low correspondingly for each punch shaft revolution. The other input of the AND circuit 1158 remains high, however, since the + MANUAL PUNCH I signal is high and the − DUP signal is high. Therefore, as long as the tier selector switch 162 is in its manual punch I position, AND circuit 1158 will never be satisfied and its output will remain low, its output being the + AUTO PUNCH I signal. Therefore, as long as the switch 162 is in its tier selector I position and as long as the machine is not duplicating (in other words, when the DUP key 140 is not depressed), the machine is in a not auto punch I condition.

If the tier selector switch 162 is in its tier 1 position, then, as has been mentioned, the +MANUAL PUNCH II signal is low. This signal is connected to OR circuit 1160 which is thus satisfied and which provides a low signal to AND circuit 1162. As has been mentioned previously, the output of AND circuit 1172 goes low once for each revolution of the punch shaft 276; and, therefore, once for each punch shaft revolution, the output of AND circuit 1162 goes high. This output is termed + AUTO PUNCH II and goes high once for each punch shaft revolution.

If the tier selector switch 162 is in its tier 1 position, the +MANUAL PUNCH III signal is also low. Therefore, the AND circuit 1176 is not satisfied and provides a high output. This output is connected to the OR circuit 1178, which is, therefore, not satisfied, so as to give a low output from OR circuit 1178. The output of OR circuit 1178 is termed + MANUAL PUNCH III (1), and this output is also connected to OR circuit 1164 which, in turn, under these conditions, provides a low output to AND circuit 1166. The other input to the AND circuit 1166 is the output of AND circuit 1172 which goes low once each revolution of the punch shaft 276. Therefore, once every revolution of punch shaft 276, AND circuit 1166 is satisfied giving a positive output called +AUTO PUNCH III(1).

As has been previously mentioned, under these conditions described, the +MANUAL PUNCH III signal is low. This signal is also connected to AND circuit 1186; and, since this input is low, the AND condition of circuit 1186 cannot be satisfied thus giving a high output of AND circuit 1186. This high output prevents the OR condition of circuit 1188 from being satisfied, making the output of circuit 1188 low. This output is called +MANUAL PUNCH III(2) and is applied to OR circuit 1168. The OR condition of circuit 1168 is thus satisfied, making its output low. This output is connected to AND circuit 1170, and the other input to AND circuit 1170 is the output of AND circuit 1172 which goes low once for each revolution of the punch shaft 276. Therefore, the AND condition of AND circuit 1170 is satisfied once every revolution of punch shaft 276, causing the output of AND circuit 1170 to go high once every punch shaft revolution, this output being termed + AUTO PUNCH III(2).

With the tier selector switch 162 being in its tier 2 position, the + MANUAL PUNCH I signal is low; the + MANUAL PUNCH II signal is high and the +MANUAL PUNCH III signal will still be low. If the +MANUAL PUNCH I signal is low, OR circuit 1156 is satisfied; and this, in turn, provides a low input to AND circuit 1158. The other input to the AND circuit 1158 is the output of the AND circuit 1172 which goes low once every revolution of the punch shaft 276. Therefore, once every revolution of shaft 276, the AND condition of AND circuit 1158 is satisfied, giving a positive output once every punch shaft revolution. This output is called + AUTO PUNCH I. In other words, with the tier selector switch 162 being in its tier 2 position, an auto punch condition exists in tier 1. Since the +MANUAL PUNCH II signal is positive and the − DUP signal is positive assuming that the machine is not duping, the OR condition of circuit 1160 is prevented from being satisfied. Therefore, the output of circuit 1160 is positive, and this is an input to AND circuit 1162. The fact that one of the inputs to AND circuit 1162 is positive prevents the AND condition from being satisfied; and, therefore, there is a low output from circuit 1162. This output is called + AUTO PUNCH II. Therefore, when the tier selector switch 162 is in its tier 2 position, and assuming that the machine is not duping, an auto punch condition cannot exist for tier 2. The AUTO PUNCH and MANUAL PUNCH signals for tier 3 (previously mentioned) remain as they were previously.

When the tier selector switch 162 is in its tier 3 position, the + MANUAL PUNCH I signal is low, the + MANUAL PUNCH II signal is low, and the +MANUAL PUNCH III signal is high. For the reasons previously described, the + AUTO PUNCH I signal is high; the + AUTO PUNCH II signal is high; and the − MANUAL PUNCH I signal is high. The + MANUAL PUNCH III signal is connected to AND circuit 1176 and to AND circuit 1186. The other input to AND circuit 1176 is the output of OR circuit 1174, and one of the inputs to OR circuit 1174 is the signal from the program level selector switch 156. When switch 156 is in its program I position, the +PROGRAM I signal will be high and the + PROGRAM II signal is low. The high program I signal satisfied OR circuit 1174, and the resulting signal causes AND circuit 1176 to be satisfied, providing a low output therefrom. This output is connected to OR circuit 1178, satisfying this circuit, and providing the high output which is called + MANUAL PUNCH III(1). This output is also applied to OR circuit 1164. The signal − DUP also applied to OR circuit 1164 is high assuming that the machine is not duplicating. OR circuit 1164 thus is not satisfied under these conditions and provides a high output therefrom which is an input to AND circuit 1166. This prevents the AND condition of circuit 1166 from being satisfied, causing its output to remain low, this output being called + AUTO PUNCH III(1). The + PROGRAM II signal is low, and this signal is connected to OR circuit 1184; and the other input to OR circuit 1184 is the signal − PROGRAM CONTROL SWITCH. If the machine is not under program control, the signal − PROGRAM CONTROL SWITCH is high; and, therefore, OR circuit 1184 is satisfied. The output of OR circuit 1184 is an input to AND circuit 1186, and the other input to AND circuit 1186 is a + MANUAL PUNCH III signal from the tier selector switch 162 which is high. Therefore, the AND condition of circuit 1186 is satisfied, providing a low output. This, in turn, is connected to OR circuit 1188, satisfying OR circuit 1188 and providing a high + MANUAL PUNCH III(2) output signal.

Thus, if the machine is not in program control and if the switch 162 is in tier 3 position, normal data may be entered by depression of the data keys 130 in tier 3; and the position of the program level control switch is immaterial. If the machine is under program control, however, the position of the program level control switch 156 is important, since the machine under these conditions will normally be entering data from the keyboard into three bits of the program tier, the other three bits being duplicated.

This operation in detail is as follows: It may be assumed that the program level selector switch 156 is in its program I position. Therefore, the + PROGRAM II signal is low. If the machine is under program control, that is, if the program control switch 160 is ON, then the − PROGRAM CONTROL SWITCH signal is low. Therefore, both inputs to OR circuit 1184 are low, providing a low output from that circuit which prevents the AND circuit 1186 from being satisfied. Therefore, the output from circuit 1186 is high, and the inputs to OR circuit 1188 are high, causing the output of circuit 1188 to be low. This output is the + MANUAL PUNCH III(2), and the same general operation also occurs with respect to the + MANUAL PUNCH III(1) signal and the associated circuitry.

The punching operation will now be described, particularly with reference to FIG. 13 which refers to punching in tier 1. The punch latches 1398A, 1410A, 1422A, 1434A, 1446A and 1458A have previously been described; and the inputs to these latches may come from two sources, one source being the information detected in the read head 190 and the other source being the output from the keyboard 126. The punch latches 1398A, 1410A, etc. are set by the information detected in the read head 190 when the particular punch tier (tier 1) is in the auto punch mode. The print latches, on the other hand, are set by the output of the keyboard 126 when the particular punch tier is in the manual punch mode.

As an example, the operation of punch latch 1398A will be described; and it will be understood that the other latches 1410A, 1422A, 1434A, 1446A and 1458A operate in the same manner. It may be assumed that the machine is in manual punch mode, that is, the machine is entering information to the tier 1 punches 256 from the keyboard 126. Therefore, the + AUTO PUNCH I signal is low or negative, and the − MANUAL PUNCH I signal is also low or negative. The − MANUAL PUNCH I signal is one of the two inputs to AND circuit 1407 which constitutes a set circuit for the latch 1398A. The other input to the AND circuit 1408 is the − KEYBOARD B signal, the origin of which has been previously described. When both of these signals are low, the output of AND circuit 1408 is also low; and this low output from AND circuit 1408 causes the latch 1398A to be set. The + PUNCH I-B signal is high or positive under this condition and is applied to the corresponding punch interposer piston 270. The + AUTO PUNCH I signal is an input to the AND circuit 1400; and, if the machine is in the manual punch mode, this signal is low. The other input to the AND circuit 1400 is the signal + READ I-B, and this signal is high when there is a high B bit punched in tier 1 of the card 100 that is then in the read station 118. However, since the + AUTO PUNCH I signal is low, the AND condition of circuit 1400 cannot be satisfied. Therefore, the detection of a B bit in tier 1 by the read head 190 will not set the latch 1398A (which may be termed the I-B latch) if the machine is in manual mode. It will be apparent that only a low − KEYBOARD B signal allows a setting of the punch I-B latch 1398A.

If the machine is in an auto punch mode, that is, if the machine is duping or skipping or is manually entering data into tiers 2 and/or 3 and thus is duping information into tier 1; in this case the +AUTO PUNCH I signal is high, and the − MANUAL PUNCH I signal is also high. If the − MANUAL PUNCH I signal is high, this high signal prevents AND circuit 1408 from having a low output; and, therefore, AND circuit 1408 is not able to cause a setting of latch 1398A. Since the + AUTO PUNCH I signal is high and since it is an input to AND circuit 1400, and if a B bit exists in tier 1 of the card 100 presently in the read station 118, in this case the AND circuit 1400 is satisfied and will satisfy the OR circuit 1402 and set the latch 1398A. The + PUNCH I-B signal is applied to the corresponding punch interposer piston 270, and this piston thus can be actuated either by detection of the proper bit in the card 100 read station 118 or by keying the proper bit from the keyboard 126.

The punch latches 1398A, 1410A, etc., are reset as follows: the + RESET PL signal is applied to AND circuit 1406 of the latch 1397A; and when this signal goes positive, the AND condition of AND circuit 1406 cannot be satisfied, making its output negative or low. Therefore, the + PUNCH I-B signal is low; and, the latch 1398A remains OFF until is can be set again, either from the keyboard 126 or the read head 118. The other five latches 1410A, 1422A, etc., in tier 1 function in the same manner as just described in connection with latch 1398A, and the corresponding + PUNCH signals actuate the corresponding punch interposers 260. As will be hereinafter more specifically mentioned, the + PUNCH output signals control the printer logic.

The punching in tiers 2 and 3 occurs in the same manner as just described in connection with tier 1. Specifically, the punch logic for tier 2 shown in FIG. 14 and the punch logic for tier 3 shown in FIG. 15 function is substantially the same manner as just described in connection with the logic for tier 1 shown in FIG. 13.

The print operation will now be described making reference to the print logic shown in FIG. 16. The outputs of the print circuitry shown in this figure are used to operate the pneumatic actuators 316 and 318 which in turn move the code plate 312. The inputs to the print circuitry shown in this figure is the information from the punch latches 1398A, 1410A, etc., shown in FIGS. 13, 14 and 15 plus gating information which refers to the particular tier in which punching is occurring. The information in any tier can be printed, but normally the information that is printed is the same information that is being keyed into a particular tier of a card 100. By pressing the dup key 140, the information in whichever tier the tier selector switch 162 is positioned will be duplicated using the printer 116.

As an example, it will be assumed that the tier selector switch 162 is in its tier 1 position in which the switch portion 162*a* is open. At this time, the − MANUAL PUNCH I signal is low; the + MANUAL PUNCH I signal is high; the − MANUAL PUNCH II, − MANUAL PUNCH III(1), and − MANUAL PUNCH III(2) are high; and the + MANUAL PUNCH II, + MANUAL PUNCH III(1), and + MANUAL PUNCH III (2) will be low.

It will further be assumed that a one bit is being punched in tier 1 of a card 100. Therefore, the − MANUAL PUNCH I signal will be low, and the − PUNCH I-1 signal will be low. These two signals control the AND circuit 1696; and, since both of these signals are low, AND Circuit 1696 is satisfied, providing a low output. This low output is applied to OR circuit 1690, satisfying it and providing a low output; and this low output in turn is applied onto AND circuit 1694. The other input to AND circuit 1694 is the signal − PRINT ENABLE; and, if the print selector switch 152 is ON, the signal − PRINT ENABLE is low. Since both inputs to AND circuit 1694 are low, its output is high, this output signal being termed + PRINT 1. This signal goes directly to the piston 324 of actuator 318 for moving piston 324.

If the tier selector switch 162 is in its tier 2 position, so that the switch portion 162*b* is open, then the + MANUAL PUNCH II signal is high or positive. If a one bit is also being punched in tier 2, then the + PUNCH II − 1 signal is also positive or high. These two signals are applied onto the AND circuit 1686 which thus has its AND condition satisfied, and the signal output therefrom satisfies OR circuit 1688. Tis provides a negative output which is an input to OR circuit 1690. The OR circuit 1690 thus provides a negative output which is applied onto AND circuit 1694. Again, assuming that the print switch 152 is ON, the signal − PRINT ENABLE is low. OR circuit 1694 is thus satisfied, and again the + PRINT 1 signal output is provided and is applied to the printer 116. It should be noted that with the tier selector switch 162 being in its tier 2 position, the signal − MANUAL PUNCH I is high which prevents AND circuit 1696 from being satisfied, but OR circuit 1690 is satisfied by the signal from OR circuit 1688. The + PRINT 1 signal is thus provided but in a different way for the two cases.

If the tier selector switch 162 is in its tier 3 position, with the switch portion 162*c* being open, and if a 1 bit is to be punched, AND circuit 1684 must be satisfied. This can only happen if the + MANUAL PUNCH III (2) signal is high or positive, and this occurs when the tier mode selector switch 162 is in its tier 3 position and when the program mode switch 156 is in its program II position. Under these conditions, AND circuit 1684 is satisfied, and this results in the output of a high + PRINT 1 signal.

The other print outputs, namely, + PRINT 2, + PRINT 4, + PRINT 8, + PRINT A and + PRINT B are provided in exactly the same way as has been described in connection with the PRINT 1 output signal.

The interlock circuitry shown on FIG. 6 operates principally for preventing the printer 116 from printing and the punches 256 from punching when, for various reasons, these actions should not take place. The print enable circuitry includes AND circuits 1126 and 1128 and OR circuit 1130. When the print switch 152 is turned ON, the + PRINT SW signal is high, and this signal goes to both the AND circuits 1126 and 1128. Another input to the AND circuit 1126 is the − AUTO PUNCH signal; and, if information is being entered from the keyboard 126 in manual mode, the signal − AUTO PUNCH is high. Therefore, AND circuit 1126 is satisfied and will in turn satisfy or circuit 1130, providing a negative or low output therefrom. This negative output is applied to inverter 1132 which thus provides a positive or high + PRINT ENABLE signal as an output. The output of OR circuit 1130 also is tapped off therefrom as the − PRINT ENABLE signal. When printing is appropriate, the + PRINT ENABLE signal is high and the − PRINT ENABLE signal is low.

When the machine is duplicating, the + DUP signal is high; and, if the print switch 152 is ON, the signal + PRINT is high. Both the + PRINT and the + DUP signals are applied onto the AND circuit 1128 and under these conditions, these signals satisfy circuit 1128 which in turn satisfies OR circuit 1130. The conditions of the + PRINT ENABLE and the − PRINT ENABLE signals are thus the same as when information is being entered into the machine from the keyboard 126.

It should be noted that if the print switch 152 is OFF, neither of the AND blocks 1126 and 1128 may possibly be satisfied; and, under these conditions, printing will thus be prevented. It should be noted also that, during a skipping operation, the printer 116 is not operative.

The + END OF CARD signal operates as another type of interlock. To obtain the − END OF CARD signal, the + END OF CARD signal is inputted into AND circuit 1134 which acts merely as an inverter and the signal is outputted from AND circuit 1134 as the inverse, namely as the − END OF CARD signal. Also, the + END OF CARD signal is one of the inputs to the AND circuit 1136 which is part of the circuitry for producing the − PUNCH READY output signal.

There are three conditions when the punches 256 should not be operative. These are: (1) when the end of a card 100 is reached in the punch station 114 and in particular, when the last columns of the card are over punches 256; (2) when there is no card 100 in the punch station 114; and (3) when the signal + SR, which is an output signal from the FIG. 6 circuitry, is low or minus (the effect of and reason for this signal will be explained hereinafter).

As has been mentioned, the + END OF CARD signal is one of the inputs to and circuit 1136, and another of the inputs to AND circuit 1136 is the + SR signal. If both of these inputs are low, the AND function of circuit 1136 will be satisfied, providing a positive output. This output is applied to the AND circuit 1138, and the other input to the AND circuit 1138 is the output of the inverter 1140. The input to the inverter 1140 is the − CARD IN PUNCH signal. When the − CARD IN PUNCH signal is high, one of the inputs to the AND circuit 1138 will be low which will prevent it from being satisfied. The AND circuit 1138 when satisfied at this time provides a positive or high output which is the signal − PUNCH READY. Also, if either the + END OF CARD signal is high or the + SR signal is high, the AND circuit 1136 cannot be satisfied and thus provides a low output to the AND circuit 1138 which at this time provides a positive or high − PUNCH READY signal.

The SR circuitry including the latch 1148A, serves to reset many of the latches in the pneumatic logic to a certain state when the machine is turned on from a cold start or when a stacker full condition has been reached. Due to the two second delay circuit 1144, the latch 1148A is always in a known state when the machine is turned ON from a cold start. The switch 1142 is automatically turned ON to provide a high pressure output when the machine is turned ON, and this output is impressed on the delay circuit 1144 as an input. The output of the delay circuit 1144 and the + STACKER FULL signal are the two inputs which are applied onto the OR circuit 1146 and which set the latch 1148A. If either of these signals is low, this will cause the output of OR circuit 1146 to go high which will set the SR latch 1148A. The latch 1148A is reset by a depression of the release key 142 which provides a low + RELEASE signal applied to OR circuit 1152.

The operation of the backspace logic will now be described, referring to FIG. 10. There are three conditions in which there should be no backspacing by the machine. One of these conditions is when a card 100 has just registered in the punch station 114. This would amount to an attempt to backspace the card back up into the hopper 112. The second condition is when a card 100 has reached its end in the punch station, with column 32 of the card being located over the punches 256. The third condition in which no backspacing is appropriate is when the machine is auto punching, that is, skipping or duping.

The − START OF CARD signal and the − END OF CARD signal are the two inputs to the AND circuit 1278; and, so long as both of these signals are high, the AND condition of circuit 1278 will be satisfied, providing a low output from the AND circuit 1278. This output is one of the three inputs to the AND circuit 1280, and the second input to the AND circuit 1280 is the − BACKSPACE KEY signal which is delayed 12 milliseconds by the delay circuit 1286 after initial application of this signal and which goes low or minus when the backspace key 138 is depressed. The third input to the AND circuit 1280 is the output of the OR circuit 1288, which has been delayed 10 additional milliseconds by the delay circuit 1284. The two inputs to the OR circuit 1288 are the − BACKSPACE KEY signal, which has been delayed 10 milliseconds and the output of the OR circuit 1294. The output of the OR circuit 1294 goes low or minus if either the + CYCLE EMIT signal goes high or if the + KEYBOARD STROBE signal goes high. The signal + CYCLE EMIT goes high once every revolution of the punch shaft 276. The + KEYBOARD STROBE goes high once any key 130 is depressed on the keyboard 126. When all of the three inputs to the AND circuit 1280 are low, the output of this AND circuit becomes high. The output of AND circuit 1280 is directed through the time delay circuit 1282, and the signal + BACKSPACE SET is the output of the circuit 1282. The output of the AND circuit 1280 is applied without a delay as an input to the AND circuit 1296, and the other input to the AND circuit 1296 is the signal − AUTO PUNCH. If the machine is not auto punching, the − AUTO PUNCH signal will be high. Thus, the AND condition of AND circuit 1296 is satisfied which in turn satisfies the OR circuitry 1300 providing a negative output therefrom. This output is called − BACKSPACE as a signal and is applied to the backspace actuator 380. The backspace latch 1296A has thus been set. The latch 1296A is reset by either the + SR signal going negative or by the + CYCLE EMIT signal. The + CYCLE EMIT signal passes through the 35 millisecond delay circuit 1304 and then is applied to the AND circuit 1302 which then serves to reset the latch 1296A. The cards 100 in the punch and read stations, due to the action of this circuitry, back up one column for each depression of the backspace key.

Referring to FIG. 8, a description of the operation of the program control logic will be set forth. The program control switch 160 determines whether or not the machine is operating under program control. If the switch 160 is in its ON condition; in this case, the program select switch 156, by either being in its No. I or No. II position, determines the program level on which the machine operates. The program level may also be determined by a reading of tier 3 of a card 100 in the read station 118. Specifically, in order for the machine to be under program control, the + PROGRAM CONTROL signal (which is the output of AND circuit 1220) must be positive or high. In order for this to occur, the three inputs to AND circuit 1220 must all be low. One of these inputs is the − PROGRAM CONTROL SW signal, which is low when the program control switch 160 is ON. Another of these inputs is the − MANUAL PUNCH I signal. This must be low in order for the machine to be under program control and assures that the machine cannot be under program control if data is not being entered at the time manually into tier 1. The third input to AND circuit 1220 is the − CARD IN READ signal. It is necessary that there be a card 100 in the read station 118 for the machine to be under program control, and the − CARD IN READ signal at this time is low. If all three of the signals applied to AND circuit 1220 are low under the conditions just mentioned, the machine can be under program control, and the + PROGRAM CONTROL signal which is the output of AND circuit 1220, is high. The signal + PROGRAM CONTROL is applied to the AND circuit 1218 for the purpose of inverting the signal and providing the signal − PROGRAM CONTROL.

The signal from the program level selector switch 156 called + PROGRAM II is applied to the inverter 1216, and the output of inverter 1216 is the signal + PROGRAM I. Therefore, if the selector switch 156 is in its program I position, in this case the signal + PROGRAM II will be low or negative, providing an output from inverter 1216 which is a high + PROGRAM I signal.

Referring to the above table, program level 1 operation is dictated by the existence of a B bit, an A bit, or an 8 bit in the third tier of a card 100 in the read station 118; and program level 2 is dictated in the same manner by the existence of a 4 bit, a 2 bit, or a 1 bit in tier 3 of a card 100 in the read station 118. In the same manner, either an B bit or a 4 bit in such a card indicates the end of a field during program control.

If a B bit is sensed in tier 3 of the card 100 in the read station 118, and assuming the machine is under program control in program level 1, then the + PUNCH III-B signal will be high. The + PROGRAM II signal applied to the inverter 1216 causes the output of circuit 1216 to be high so that the AND circuit 1190, having the output of inverter 1216 and the signal + PUNCH III-B applied thereto, is satisfied. The output of the OR circuit 1194 at this time is low, and the signal from the OR circuit 1194 is the + END OF FIELD signal.

If the machine is in program level 2 and a 4 bit is sensed in tier 3 of the card 100 in the read station 118, the + PUNCH III-4 signal is high or positive; and, at the same time, the + PROGRAM II is high so that the AND circuit 1192 is satisfied. OR circuit 1194 thus also is satisfied, providing a low − END OF FIELD signal as an output.

The output signal + PROGRAM ALPHA is in control for determining whether upper case or lower case keyboard bits are controlling. If program ALPHA is coded in tier 3 in program 1 level of the card 100 in the read station 118, an A bit and an 8 bit will be sensed in tier 3 of the card 100 in the read station 118. The A bit is one of the inputs to the AND circuit 1196, and the other input to the AND circuit 1196 is the output of the inverter 1216 which is high since the machine is in program I and the + PROGRAM II signal is low. Therefore, the AND function of the AND circuit 1196 is satisfied; and the OR function of OR circuit 1200 is likewise satisfied, providing a low output from the circuit 1200. The output of OR circuit 1200 is applied to the two AND circuits 1202 and 1204, and there are three inputs to these AND circuits. The second input to the AND circuit 1202 is the output of the OR circuit 1210 which will be negative if either the AND circuit 1206 is satisfied or the AND circuit 1208 is satisfied. AND circuit 1206 is satisfied at this time, since an 8 bit has been sensed in tier 3 at the read station 118; and the output of inverter 1216 is positive since the machine is in program level 1. Therefore, the output of the OR circuit 1210 is negative at this time. The third input to the AND circuit 1202 is the output of the AND circuit 1218, which in turn is under the control of the AND circuit 1220. The AND circuit 1220 is controlled by the signals − PROGRAM CONTROL SW, − MANUAL PUNCH I, and − CARD IN READ. The two signals − PROGRAM CONTROL SWITCH, and − CARD IN READ are both low, since the machine is under program control; and the signal − MANUAL PUNCH I is also low, since at the time data is being entered into tier 1. Since the three inputs of the AND circuit 1220 are low, the AND condition of circuit 1220 is satisfied; and it provides a positive output, this being the signal + PROGRAM CONTROL. The positive output of circuit 1220 is applied to the AND circuit 1218 which thus provides a negative output. This negative output is applied onto the AND circuit 1202; and, since the other two inputs to the circuit 1202 are also low, the AND circuit 1202 provides a high + PROGRAM ALPHA signal as an output.

The high + PROGRAM ALPHA signal is applied to AND circuits 1204 and 1212. In order for these two AND circuits 1212 and 1204 to be satisfied, all of their inputs must be low or negative; but, since the output of the AND circuit 1202 is positive, this prevents AND circuits 1204 and 1212 from being satisfied, making their outputs low. The outputs of circuits 1204 and 1212 are the signals + PROGRAM SKIP and + PROGRAM DUP. Thus, an A bit and an 8 bit in tier 3 of a card 100 being read provide the program code for program alpha and not program skip or program dup.

The A bit alone causes the program skip operation to be effective. The AND circuit 1196 is satisfied at this time, since an A bit in tier 3 of the card 100 being read is sensed and since the machine is in program level I. Therefore, OR circuit 1200 provides a low output. At this time, however, an 8 bit is not sensed in tier three in card 100 being read which prevents the AND circuit 1206 from being satisfied. The signal + PROGRAM II is low, since the machine is in program level I; therefore, AND circuit 1208 is not satisfied. The output of the OR circuit 1210 therefore is high, and this high output is applied as an input to the AND circuit 1202 and the AND circuit 1212. Inasmuch as all of the inputs to these AND circuits must be negative for their outputs to be high, the outputs of AND circuits 1202 and 1212 at this time are low, since the machine has not sensed an 8 bit and is in program level I. Therefore at this time, the signal + PROGRAM ALPHA will be low or negative and the signal + PROGRAM DUP will also be low or negative.

In order for the + PROGRAM SKIP signal to be high, all of the inputs to the AND circuit 1204 must be negative. The output of the OR circuit 1200 and the output of the AND circuit 1202 remain low as just described; and, therefore, in order that the + PROGRAM SKIP signal may be high, the output of the AND circuit 1214 must also be low. This occurs if both of the inputs of the AND circuit 1214 are positive. It is assumed in this case that the auto skip/dup switch 158 is ON, and this setting of switch 158 provides a high + AUTO SKIP/DUP signal applied to AND circuit 1214 for satisfying circuit 1214 at this time. The output of the AND circuit 1220 must be positive for program skip to occur, and this condition will obtain if all of the inputs to circuit 1220 are negative. One of these inputs, the signal − PROGRAM CONTROL SWITCH, is negative at this time since the program control switch 160 is on. The second input, the signal − MANUAL PUNCH I, is negative at this time since the machine entering data in tier 1. The third input, the − CARD IN READ signal, is negative at this time since there is a card 100 in the read station 118. Since the inputs to circuit 1220 are all negative, the output of AND circuit 1220 is positive. The signal + AUTO SKIP/DUP is also positive at this time; and, therefore, the output of AND circuit 1214 having these two signals applied thereto as inputs is negative. Thus, all three inputs to the AND circuit 1204 are negative at this time, providing a high + PROGRAM SKIP signal.

The operation of the machine in program level 2 is exactly the same as program level 1 except only the bits III-4, III-2 and III-1 are active, and bits III-B, III-A, and III-8 are ignored.

The following will briefly recapitulate with respect to the operation of the pneumatic logic: As has been previously explained, a card 100 in the read station 118 may have, in its tier 3, any of the card code bits 1, 2, 4, 8, A and B. The bits 8, A and B refer to program 1, and these bits are effective for their function when the switch 156 is in its program I position. To refer first to the skip bit A for program 1, this bit causes the following operation: Sensing of the A bit in tier 3 affects the circuitry in FIG. 8 resulting in an output + PROGRAM SKIP signal. This output is applied to the clutch control circuitry shown in FIG. 11 resulting eventually in the outputs + CYCLE CLUTCH and − CYCLE CLUTCH. These outputs, in turn, are applied to the cycle clutch actuator 352, turning it ON, resulting in the cycle clutch 340 engaging. The cards 100 in the transport then all start to move forwardly and continue their movement until an end of field bit is sensed in tier 3 of the card 100 in the read station.

In brief, the end of field bit (the B bit for program 1) has the following operation. The B bit in tier 3 affects a different portion of the circuitry shown in FIG. 8, resulting in an output which is a low − END OF FIELD signal. This output, in turn, is an input to the clutch control circuitry shown in FIG. 11. The result of this low − END OF FIELD input will be to change the state of the + CYCLE CLUTCH and − CYCLE CLUTCH outputs of the FIG. 11 circuitry which in turn will result in turning the clutch actuator 352 OFF thus disengaging the clutch 340 and hence stopping the cards 100 in the transport from moving. As will be noted from the above table, certain bits also provide a duping function and an ALPHA shift function, and the end of field bit when provided from tier 3 of the card 100 being read in the read station 118 has the same function of stopping the duping function and stopping the ALPHA shift function, this action also being by changing the state of the − CYCLE CLUTCH and + CYCLE CLUTCH signals as just mentioned.

The skip bit, namely the A bit for program 1 level, also has the function of preventing the punches 256 in tier I from punching while the cards 100 are moving in skipping condition through the transport, this function being as follows The output + PROGRAM SKIP signal from the circuitry shown in FIG. 8 is supplied to the circuitry shown in FIG. 11 which will result in a high + AUTO PUNCH signal and a low − AUTO PUNCH signal. These two signals, in turn, are inputs to the circuitry shown in FIG. 9 and result in the output signals, + KEYBOARD RESTORE and − KEYBOARD RESTORE, being in their high and low states, respectively. These signals, in turn, are applied to the keyboard restore actuators 440 and 444 and turn these ON. This action locks the keyboard 126 so that no data may be entered by means of the keyboard.

When a dup bit (bit 8 for program 1) is encountered in the read station 118, this causes a duplication of this particular column and the following columns until an end of field bit (B bit in tier 3) is sensed in the read station 118 at which time the duplication process will end. The data duplicated is the data in tier 1 of the preceding card, that is, the card in the read station 118. The sensing of an 8 bit in tier 3 in the program 1 mode will affect the circuitry shown in FIG. 8 and result in a high + PROGRAM DUP output. This, in turn, will affect the clutch control circuitry shown in FIG. 11 in exactly the same way as the + PROGRAM SKIP signal affected that circuitry as described above. This results in a high + CYCLE CLUTCH and a low − CYCLE CLUTCH output from the circuitry shown in FIG. 11 which, in turn, turns the cycle clutch actuator 352 ON, thus engaging the cycle clutch 340. The cycle clutch 340 will remain On until an end of field bit (B bit in tier 3) is encountered in the card 100 being incremented through the read station 118. In addition, the + PROGRAM DUP output will affect the keyboard control circuitry shown in FIG. 9 again in the same way as the + PROGRAM SKIP output affected it, resulting in the keyboard being locked up, preventing any entrance of data from the keyboard. Thirdly, the + PROGRAM DUP output will affect the punch mode control circuitry shown in FIG. 7, resulting in a high + AUTO PUNCH I output. This, in turn, will affect the punch latch circuitry shown in FIG. 13, causing the punch latched to be set by the information that comes from the read head 190, from the tier 1 bits in the card 100 in the read station 118.

As shown in the above table, if both the A bit and the 8 bit exist in tier 3 of a card in the read station, the circuitry is in its ALPHA shift condition. This occurs as follows. These two inputs affect the program control circuitry shown in FIG. 8, resulting in a high + PROGRAM ALPHA output. This output, in turn, affects the keyboard control circuitry shown in FIG. 9, so that only the lower case inputs to this circuitry from the keyboard contacts have effect. The upper case keyboard contact inputs to this circuitry are ignored. This, in turn, results in the output signals from the FIG. 9 circuitry being the coding for a lower cast character. These signals, in turn, go to the punch latch circuitry shown in FIGS. 13, 14 and 15, resulting in the punching of a lower case character. It will be noted that the + PROGRAM ALPHA output of the circuitry shown in FIG. 8 does not affect the operation of the cycle clutch 340. Therefore, the ALPHA shift coding in tier 3 of the card 100 in read station 118 must exist in every column for which an ALPHA shift is desired in the following card, that is, the card in the punch station 114.

The combination of the end of field and skip conditions provided by A and B bits for program 1 are simply additive with respect to the end of field and shift functions previously described. The same is true of the end of field and dup functions shown in the sixth column of the above table and the end of field and ALPHA functions shown in the seventh column of the above table. The functioning in program level 2 is the same as that just described in connection with program level 1 except that the program level switch 156 is in its program II position; and, in this case, bits 4, 2 and 1 have respectively the same effect as bits B, A and 8 as just described.

For the particular machine described, again referring to the above table, if an "M" is keyed on keyboard 126, with switch 160 ON, switch 156 in its program I position and switch portion **162*a* being ON, a punching will be made in the B position, third tier, of a card 100 in the punch station 114. In addition, if the print switch 152 is ON, a minus sign will be printed. If the keys "S", "9", ",", "F", ")", and "|" are actuated, correspondingly the other punchings will be made in tier 3 of a card 100 in the punch station, indicated by the above table. Correspondingly, if the program level switch 156 is in its program II position, actuation of these keys on keyboard 126 will cause the punchings in the 4, 2 and 1 positions of tier 3 of the card 100 in the punch station 114** to be made as indicated by the above table.

As will be apparent, data may be punched into a card 100 in tier 2, in the same way as in tiers 1 and 3, with the tier selector switch 162 being in its **162*b* position. The data in the second tier of a card 100 in the read station 118 is duplicated into tier 2 of a succeeding card in the punch station 114 as follows. As described previously, if data is being entered from the keyboard 126 either to tier 1 or to tier 3, the + AUTO PUNCH II signal input to the circuitry shown in FIG. 14 will be high, and the − MANUAL PUNCH II signal will be high also. This will enable the punch latches shown in FIG. 14 to be set only by the information obtained from the read head 190 in tier 2 of the card 100 in the read station 118. This duping of data from tier 2 of a prior card 100 into tier 2 of a succeeding card in the punch station 114 always takes place except when data is being entered from the keyboard 126 in tier 2 of a card 100 in the punch station 114. In this case, the + AUTO PUNCH 2 input to the circuitry shown in FIG. 14 is low, and the − MANUAL PUNCH 2 input is low also. This enables the punch latches shown in FIG. 14** to be set only from the − KEYBOARD inputs.

During operation of the machine, the program data in tier 3 of a prior card 100 in the read station 118 is automatically duped and punched into tier 3 of the succeeding card 100 in the punch station 114 as follows: If the data from the keyboard is being entered into tier 2 or tier 1, then the + AUTO PUNCH III (1) and the + AUTO PUNCH III (2) and the − MANUAL PUNCH III (1) and − MANUAL PUNCH III (2) inputs to the circuitry shown in FIG. 15 all will be high. This enables the punch latches shown in FIG. 15 to be set only by the +READ inputs, and the − KEYBOARD inputs will be ignored. This duplicating action of the program data from a preceding card to a succeeding card always occurs except when the switch portion **162*c* is open and the keyboard is used to enter data into the third tier of a card in the punch station 114. In this case, the + AUTO PUNCH III inputs and the − MANUAL PUNCH III inputs all will be low, enabling the punch latches of FIG. 15** to be set only by the − KEYBOARD inputs; and the + READ inputs will be ignored.

The action of the 8 and 1 bits in tier 3 of a preceding card 100 in the read station for causing duplication action has just previously been described, and the action of the dup key 140 is approximately the same, as follows. When the dup key is depressed, the signal − DUP key shown as an input to the circuitry in FIG. 11 will be low. This will affect the circuitry to provide a high + DUP output and also a high + AUTO PUNCH and + CYCLE CLUTCH outputs and low − AUTO PUNCH and − CYCLE CLUTCH outputs. The two CYCLE CLUTCH outputs go to the cycle clutch actuator 352, turning it ON, and thus engaging the cycle clutch 340. The cycle clutch 340 will remain engaged until the dup key 140 is released. The − DUP signal also is an input to the circuitry shown in FIG. 7 and will affect the circuitry shown in FIG. 7 in such a way as to provide a high + AUTO PUNCH output for whichever tier that has been selected on the entry mode selector switch 162. This, in turn, will affect the circuitry of the punch latches shown in FIGS. 13, 14 and 15, depending on which tier has been selected by the entry mode switch 162. This will permit the punch latches on that tier to be set only by the information from the read head 190 in that tier of the card 100 in the read station 118.

The action of the auto skip/dup switch 158 is as follows. The output of this switch is an input to the circuitry shown in FIG. 8 and has the effect, if this switch is OFF, of preventing the machine from automatically skipping or automatically duping when under program control, because the outputs + PROGRAM SKIP and + PROGRAM DUP will be inhibited. This is due to the fact that the + AUTO SKIP/DUP input signal is low when the switch 158 is OFF.

The release key 142 functions as follows. The release key 142 when depressed provides a low − RELEASE KEY input to the circuitry shown in FIG. 4. This sets the "release latch" 1058A and gives a high + RELEASE output. It has already been described how the latch 1058A is reset. This high + RELEASE output is applied to the circuitry shown in FIG. 6 and has the effect of resetting latch 1148A, thus providing a positive + SR and a low −SR output. The + RELEASE output from the circuitry shown in FIG. 4 also is applied to the clutch control circuitry shown in FIG. 11 and affects that circuitry to provide a positive + AUTO PUNCH and a positive + CYCLE CLUTCH outputs and low − AUTO PUNCH and low − CYCLE CLUTCH outputs. The CYCLE CLUTCH outputs are applied to the cycle clutch actuator 352 turning it on, thus engaging the clutch 340. The AUTO PUNCH outputs are applied to the circuitry shown in FIG. 9 and have the effect of providing from that circuitry a positive + KEYBOARD RESTORE output, and a negative − KEYBOARD RESTORE output, thus locking the keyboard 126 so that no data may be entered from the keyboard while a release operation is occurring. The − AUTO PUNCH signal also goes to the circuitry shown in FIG. 6 and provides a positive + PRINT ENABLE and a negative − PRINT ENABLE signal provided that the print switch 152 is turned ON. Therefore, the data in whichever tier has been selected by the entry mode selector swtich 162 will be printed out on the card 100 in the punch station 114 during a release operation. The + and − AUTO PUNCH signals are also inputs to the circuitry shown in FIG. 12 and have the same effect on the outputs of that circuitry (punch timing) as the skip or dup functions have. Thus, during a release operation the data in all three tiers of the card 100 in the punch station will be duplicated with the data of the card 100, if any, that is in the read station 118. If there is no card 100 in the read station 118, there will be no punching accomplished.

The action of the release key 142 in causing the feeding of a card 100 to the punch station 114 is as follows. As has been previously mentioned, the depression of the release key 142 causes the cycle clutch 340 to engage and to increment a card 100 down the transport. The end of card emitter 470 which is attached to the incrementer wheel 186 driven by the clutch 340 rotates as the card moves down the transport until an imaginary column 39 of a card 100 is aligned with the centers of the wheels 188 and 186 or the wheels 182 and 180. Then the cutout 484a in the disk 484 in sensor 470 is aligned with the sensing hole 488 and provides a high + END OF CARD signal. This signal passes through appropriate circuitry and serves to turn OFF the release latch 1058A, giving a low + RELEASE output. This, in turn, will disengage the clutch 340, allowing the drive train to stop at this time. The end of card signals also serve to trigger the feed latch as has been described previously, provided that the auto feed switch 154 is turned ON, giving a positive + AUTO FEED signal on the feed latch circuitry shown in FIG. 4. Thus when the auto feed switch 154 is ON and the release key 142 is depressed, a card 100 will be fed after the previous card 100 has been released; and the machine latches up.

The machine advantageously constitutes an off-line, stand alone, operator oriented data recorder for punching, printing and reading machine fed document cards of the three tier type. The machine can be used on a table top and can simultaneously process 32 columns of variable data in one tier, one tier of dup data, and two levels of program codes on each document 100. The keyboard 126 can selectively enter variable data, dup data or program codes in the desired columns. The dup data and program codes can be automatically duplicated from card to card. All data entered from the keyboard 126 or manually duplicated by pressing the dup key 140 can be simultaneously punched and interpreted by printing. All logic and control functions are provided by fluidic signals switched by diaphragm logic to pneumatic actuators, the machine may be powered by a motor driven compressor. Sixty-four characters can be punched in coded hole patterns and printed on a card 100 serially from an interlocked keyboard 126.

In addition, the machine can simultaneously punch and print variable data and can at the same time duplicate dup data and program code punchings. The dup data is stored in a separate tier of the card 100, and dual program levels are stored in code in another tier of a card 100. There is automatic duplication of data stored in the tiers of the card which are not being entered from the keyboard, utilizing the selector switch 162. There may be manual duplication of any data or code and simultaneous interpretation of each column.

This is possible for each of three selected tiers of a card 100 for each program level in tier 3 of the card 100.

What is claimed is:

1. A machine for recording encoded data on record media comprising, a read mechanism for reading encoded data on a record medium located in the read mechanism, an encoding mechanism for encoding data on a record medium located in the encoding mechanism, a transport for transporting a record medium first through said encoding mechanism and from thence to and through said read mechanism, means operatively connecting said read mechanism with said encoding mechanism so that encoded data read by said read mechanism from a record medium in said read mechanism influences the data which is encoded by said encoding mechanism on a record medium in said encoding mechanism, said record media constituting a series of document cards, said encoding mechanism constituting a punch for punching holes in said cards, and said read mechanism constituting means for reading the punched holes in the document cards, each of said document cards being divided into a plurality of adjacently arranged data recording columns into which said holes are punched, said transport including gripping rolls for gripping said document cards, a drive element, incrementing mechanism in a drive train with said drive element and said gripping rolls for incrementing said document cards a column at a time through said encoding mechanism and simultaneously through said read mechanism whereby each column of data read by said read mechanism is effective to influence a column of data punched by said punch in a document card in said encoding mechanism, a reversing drive device in said drive train for changing the direction of rotation of said gripping rolls, a manually actuatable backspace control, and means interconnecting said backspace control and said reversing device so as to reverse the rotation of said document card gripping rolls for backwardly moving said document cards in said encoding mechanism and in said read mechanism for one of said data columns when said backspace control is actuated.

2. A machine for recording encoded data on record media comprising, a read mechanism for reading encoded data on a record medium located in the read mechanism, an encoding mechanism for encoding data on a record medium located in the encoding mechanism, a transport for transporting a record medium first through said encoding mechanism and from thence to and through said read mechanism, and means operatively connecting said read mechanism with said encoding mechanism so that encoded data read by said read mechanism from a record medium in said read mechanism influences the data which is encoded by said encoding mechanism on a record medium in said encoding mechanism, each of said record media being divided into separate tiers each including a plurality of adjacently arranged data recording columns, said means operatively connecting said read mechanism with said encoding mechanism being so constructed that the data read by said read mechanism in one of the tiers of a record medium in the read mechanism influences the data encoded by said encoding mechanism by causing the encoding mechanism to duplicate in the same tier of a record medium in the encoding mechanism the data read by said read mechanism, said machine including means for controlling said encoding mechanism under the control of a source of data exclusive of said read mechanism for causing said encoding mechanism to encode the data from said data source exclusive of the read mechanism into still another tier of the record medium in said encoding mechanism.

3. A machine for recording encoded data as set forth in claim 2, said data source exclusive of the read mechanism constituting a manually operated keyboard.

4. A machine for recording encoded data as set forth in claim 3 and including, a manually operated skip control, and means interconnecting said skip control with said transport and with said means operatively connecting said read mechanism and encoding mechanism so that a record medium is transported through both said encoding mechanism and said read mechanism with no duplication of data in the said tier and data recording columns which would be encoded under the control of said keyboard as long as said skip control is actuated.

5. A machine for recording encoded data on record media comprising, a read mechanism for reading encoded data on a record medium located in the read mechanism, an encoding mechanism for encoding data on a record medium located in the encoding mechanism, a transport for transporting a record medium first through said encoding mechanism and from thence to and through said read mechanism, and means operatively connecting said read mechanism with said encoding mechanism so that encoded data read by said read mechanism from a record medium in said read mechanism influences the data which is encoded by said encoding mechanism on a record medium in said encoding mechanism, each of said record media being divided into separate tiers each including a plurality of adjacently arranged data recording columns said means operatively connecting said read mechanism with said encoding mechanism being so constructed that the data read by said read mechanism in one of the tiers of a record medium in the read mechanism influences the data encoded by said encoding mechanism in a different tier of a record medium in said encoding mechanism.

6. A machine for recording encoded data as set forth in claim 5, said machine including a manually operated keyboard, means operatively connecting said keyboard and said encoding mechanism so that the keyboard is effective to cause the encoding mechanism to encode data on a certain tier of the record medium in the encoding mechanism as determined by operation of the keyboard, means for selectively rendering said keyboard ineffective to encode data in said certain tier, and means under control of said last named means for simultaneously rendering inoperative said means connecting said read mechanism with said encoding mechanism influencing the encoded data by the data that is read.

7. A machine for recording encoded data on record media as set forth in claim 5, said means operatively connecting said read mechanism with said encoding mechanism being so constructed that, when certain data is present in said one tier of a record medium located in the read mechanism, data is encoded by said encoding mechanism into said different tier of the record medium located in the encoding mechanism which is a duplicate of the data in the corresponding tier of the record medium located in and read by said read mechanism.

8. A machine for recording encoded data on record media as set forth in claim 7, said means operatively connecting said read mechanism with said encoding mechanism being of such construction that it is also responsive to unique end of field data read by said read mechanism in said one tier of the record medium in said read mechanism to terminate the duplicating action by said encoding mechanism on the record medium in said encoding mechanism when end of field data is so read.

9. A machine for recording encoded data on record media as set forth in claim 5, said tier being read by said read mechanism constituting a program tier and said tier being encoded by said encoding mechanism under the control of said read mechanism being a data entry tier, a manually operated keyboard, means connecting said keyboard with said encoding mechanism for causing the encoding mechanism to be operative under the control of the keyboard to encode in the data entry tier of the record medium in said encoding mechanism, and control means under the control of data read by said read mechanism and effective on said means connecting said keyboard and said encoding mechanism for causing the encoding mechanism to be operative to alternately encode in two different encoding patterns in accordance with data read by said read mechanism from said program tier of the record medium in said read mechanism for causing one or the other of said encoding patterns to be operative under the control of said keyboard.

10. A machine for recording encoded data as set forth in claim 9, said means operatively connecting said read mechanism with said encoding mechanism being of such construction that it is also responsive to unique end of field data read by said read mechanism in said program tier of a record medium in said read mechanism so as to discontinue the encoding action of said encoding mechanism in one of said encoding patterns when said end of field data is encountered by said read mechanism whereby said other encoding pattern then becomes operative.

11. A machine for recording encoded data on record media as set forth in claim 5, said means operatively connecting said read mechanism with said encoding mechanism being of such construction that the encoding of data by said encoding mechanism is prevented into said different tier of a record medium in said encoding mechanism when unique skip data is read by said read mechanism in said one tier of a record medium in the read mechanism, and means effective on said transport and under the control of data read by said read mechanism for transporting the record media in said read mechanism and in said encoding mechanism therethrough in a skipping action and without encoding by said encoding mechanism when said skip data is in said one tier of the record medium in said read mechanism.

12. A machine for recording encoded data on record media as set forth in claim 11, said means operatively connecting said read mechanism with said encoding mechanism being of such construction that it is also responsive to unique end of field data read by said read mechanism in said one tier of a record medium in the read mechanism whereby the skipping action of said transport and encoding mechanism is terminated when the unique end of field data is read by said read mechanism in the record medium in said read mechanism.

13. A machine for punching holes in document cards comprising, a punching mechanism located at a punch station and having a series of reciprocable punches, a source of air under a pressure other than atmospheric, a piston in connection with each of said punches and connectable with said source for causing the punch to reciprocate when a connection is made between the piston and said source, a card reading mechanism at a card read station for reading holes in said cards and having a pair of opposite ports for each of said document card holes, one of the ports of each of said pairs being connected with said source, a card transport for transporting a document card from one of said stations to the other of said stations, and means under the control of the pressure in the other of said ports of each of said pairs of ports for changing the connection of one of said pistons and said source so as to cause a card punching action under the control of the changed air pressure in said last named port due to air passed through a document card hole in registry therewith.

14. A machine for punching as set forth in claim 13, said source including air under a pressure greater than atmospheric, each of said pistons being so arranged in connection with a corresponding reciprocable punch so that, when air under pressure is applied to the piston, the punch is caused to reciprocate in a hole punching action, said means under the control of the pressure on the other of said ports of each of said pairs of ports being so arranged that, when air under pressure is within said other port of each pair due to the existence of a document card hole in registry with the port, the corresponding piston has air under pressure applied to it for causing a hole punching reciprocation of the corresponding punch, said card transport being so arranged to transport a document card from said punch station to said read station so that holes are punched in a document card in the punch station that are controlled by the document card holes in registry with a pair of said ports.

* * * * *